(12) United States Patent
Kitagawa

(10) Patent No.: US 10,694,688 B2
(45) Date of Patent: Jun. 30, 2020

(54) HYDROPONIC CULTIVATION SYSTEM, AND PLANT FACTORY COMPRISING HYDROPONIC CULTIVATION SYSTEM AND EXPANDED POLYSTYRENE FOAM GREENHOUSE

(71) Applicant: YUGENKAISHA JAPAN TSUSYO, Kaga-shi (JP)

(72) Inventor: Katsuyuki Kitagawa, Kaga (JP)

(73) Assignee: YUGENKAISHA JAPAN TSUSYO, Ishikawa (JP)

( * ) Notice: Subject to any disclaimer, the term of this patent is extended or adjusted under 35 U.S.C. 154(b) by 193 days.

(21) Appl. No.: 14/911,961

(22) PCT Filed: Aug. 14, 2014

(86) PCT No.: PCT/JP2014/004191
§ 371 (c)(1),
(2) Date: Feb. 12, 2016

(87) PCT Pub. No.: WO2015/022782
PCT Pub. Date: Feb. 19, 2015

(65) Prior Publication Data
US 2016/0192607 A1    Jul. 7, 2016

(30) Foreign Application Priority Data

Aug. 14, 2013  (JP) .................................. 2013-168614
Aug. 14, 2013  (JP) .................................. 2013-168615

(51) Int. Cl.
*A01G 31/04*      (2006.01)
*A01G 24/44*      (2018.01)
(Continued)

(52) U.S. Cl.
CPC ............. *A01G 31/042* (2013.01); *A01G 9/14* (2013.01); *A01G 9/143* (2013.01); *A01G 9/1438* (2013.01);
(Continued)

(58) Field of Classification Search
CPC ...... A01G 31/042; A01G 31/02; A01G 31/06; A01G 9/14
(Continued)

(56) References Cited

U.S. PATENT DOCUMENTS 1,463,223 A * 7/1923 Newport ................. A01G 31/06
                                                         114/74 A
3,935,673 A * 2/1976 Robins .................... A01G 31/06
                                                         47/58.1 R
(Continued)

FOREIGN PATENT DOCUMENTS

CA    2497936 A1 *  3/2003   ............... A01G 7/02
CA    2768264 A1 *  8/2012   ............. A01G 31/04
(Continued)

OTHER PUBLICATIONS

Translation of Masayoshi et al., provided JPS6287031 (Year: 1987).*
(Continued)

*Primary Examiner* — Magdalena Topolski
*Assistant Examiner* — Morgan T Barlow
(74) *Attorney, Agent, or Firm* — Snell & Wilmer L.L.P.

(57) ABSTRACT

In order to provide an efficient hydroponic cultivation system, the disclosure provides a hydroponic cultivation system comprising a plurality of vessels extending in a predetermined direction; a plant holding plate that holds a plant and is disposed to span across the plurality of vessels; and a support mechanism provided between vessels adjacent to each other among the plurality of vessels, wherein each of the plurality of vessels is configured to contain a culture
(Continued)

solution required for the growth of the plant, and the support mechanism supports the plant holding plate above the plurality of vessels.

11 Claims, 35 Drawing Sheets

(51) Int. Cl.
*A01G 9/14* (2006.01)
*A01G 31/06* (2006.01)
*E04B 1/32* (2006.01)

(52) U.S. Cl.
CPC .............. *A01G 24/44* (2018.02); *A01G 31/06* (2013.01); *E04B 1/3205* (2013.01); *E04B 1/3211* (2013.01); *Y02A 40/252* (2018.01); *Y02P 60/216* (2015.11)

(58) Field of Classification Search
USPC .......................................................... 47/62 E
See application file for complete search history.

(56) References Cited

U.S. PATENT DOCUMENTS

| | | | |
|---|---|---|---|
| 4,028,847 A * | 6/1977 | Davis | A01G 31/042 165/59 |
| 4,068,405 A | 1/1978 | Campbell | |
| 4,216,618 A | 8/1980 | Haub | |
| 4,379,375 A * | 4/1983 | Eisenberg | A01G 31/02 47/65 |
| 4,476,651 A * | 10/1984 | Drury | A01G 31/042 47/65 |
| 4,565,723 A | 1/1986 | Hirsch | |
| 4,879,840 A * | 11/1989 | den Daas | A01G 31/02 47/58.1 R |
| 4,916,856 A * | 4/1990 | Bourgogne | A01G 31/042 47/62 R |
| 4,965,962 A | 10/1990 | Akagi | |
| 5,007,135 A * | 4/1991 | Rigsby | A01G 9/029 47/73 |
| 5,042,196 A * | 8/1991 | Lukawski | A01G 31/02 47/62 C |
| 5,323,567 A | 6/1994 | Nakayama et al. | |
| 6,105,309 A | 8/2000 | Takayanagi | |
| 9,775,330 B1 * | 10/2017 | Chen | A01K 63/003 |
| 9,848,544 B2 * | 12/2017 | Hessel | A01G 31/00 |
| 2006/0201058 A1 * | 9/2006 | Ripatti | A01G 31/042 47/1.1 |
| 2006/0218862 A1 * | 10/2006 | Dyas | A01G 9/143 47/86 |
| 2007/0113472 A1 * | 5/2007 | Plowman | A01G 31/02 47/62 A |
| 2009/0145870 A1 * | 6/2009 | Tagawa | A01G 31/06 211/190 |
| 2009/0260282 A1 * | 10/2009 | Hashimoto | A01G 9/045 47/20.1 |
| 2012/0060416 A1 * | 3/2012 | Brusatore | A01G 31/06 47/62 A |
| 2014/0325910 A1 * | 11/2014 | Faris | A01G 31/06 47/62 R |
| 2015/0150202 A1 * | 6/2015 | Hessel | A01G 31/00 47/62 R |
| 2018/0027747 A1 * | 2/2018 | Yoshida | A01G 9/0299 |
| 2018/0035624 A1 * | 2/2018 | Itoh | A01G 9/0299 |

FOREIGN PATENT DOCUMENTS

| | | | |
|---|---|---|---|
| CN | 101237768 | 8/2008 | |
| EP | 0937385 | 8/1999 | |
| JP | 6255028 | 3/1987 | |
| JP | 6287031 | 4/1987 | |
| JP | 62275628 | 11/1987 | |
| JP | 3160933 | 7/1991 | |
| JP | 3160933 | 10/1991 | |
| JP | 11137107 | 5/1999 | |
| JP | 11-289871 | 10/1999 | |
| JP | 2000106774 | 4/2000 | |
| JP | 2002272282 | 9/2002 | |
| JP | 2012034686 | 2/2012 | |
| JP | 2012255268 | 12/2012 | |
| JP | 2012255272 A * | 12/2012 | .............. A01G 7/02 |
| KR | 20080028995 | 4/2008 | |
| RU | 2010499 | 4/1994 | |
| RU | 95966 | 7/2010 | |
| RU | 2426302 | 8/2011 | |
| RU | 2487527 | 7/2013 | |
| SU | 547189 | 2/1977 | |
| WO | 9856236 | 12/1998 | |
| WO | 2011125965 | 10/2011 | |

OTHER PUBLICATIONS

International Search Report and Written Opinion dated Nov. 18, 2014 in Application No. PCT/JP2014/004191.
Saudi Arabian Patent Office, Substantive Examination Report dated Mar. 20, 2018 in Application 516370570.
Japanese Patent Office, Office Action dated May 15, 2018 in Japanese Patent Application No. 2015-531728.
Examination Report No. 2 dated Sep. 4, 2017 in Australian Application No. 2014307556.
Russian Federal Institute of Industrial Property, Russian Search Report dated May 28, 2018 in Application No. 2016108316/13.
Russian Federal Institute of Industrial Property, Russian Office Action dated May 30, 2018 in Application No. 2016108316/13.
The State Intellectual Property Office of China, First Office Action dated Apr. 3, 2018 in Chinese Application No. 201480056697.2.
Examination Report No. 3 dated Dec. 1, 2017 in Australian Application No. 2014307556.
Examination Report dated May 3, 2017 in Australian Application No. 2014307556.
Official Action dated Mar. 4, 2017 in Kazakhstan Application No. 2016/0190.1.
Office Action dated Dec. 5, 2018 in Japanese Application No. 2015-531728.
Office Action dated Nov. 29, 2018 in Chinese Application Serial No. 20140056697.2.
CIPO Non-Fina Office Action dated Jun. 3, 2019 in CN Application No. 201480056697.2.
Official Action dated Jul. 24, 2019 in Brazilian Application No. BR112016002932-1.
IPO; Examination Report dated Nov. 18, 2019 in IN Application No. 201617008546.

* cited by examiner

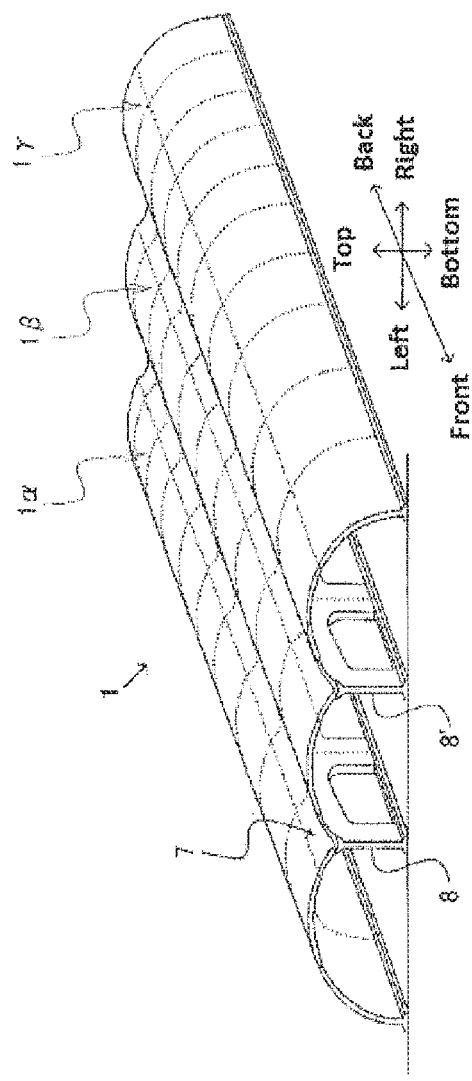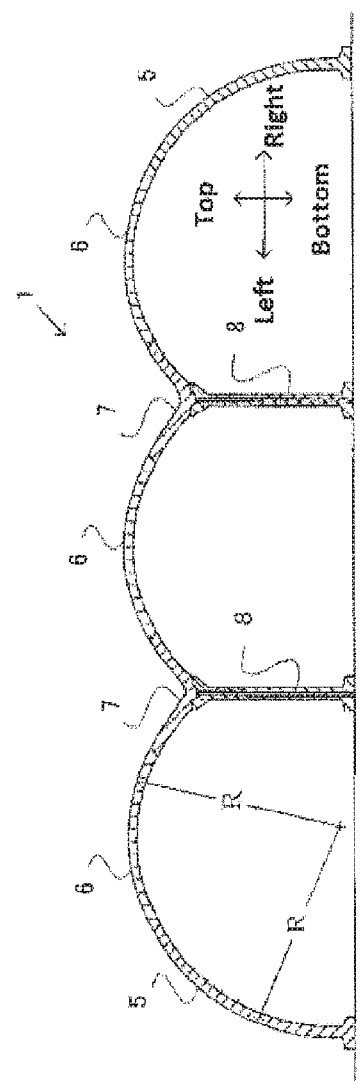
FIG. 26A
FIG. 26B

HYDROPONIC CULTIVATION SYSTEM, AND PLANT FACTORY COMPRISING HYDROPONIC CULTIVATION SYSTEM AND EXPANDED POLYSTYRENE FOAM GREENHOUSE

CROSS-REFERENCE TO RELATED APPLICATIONS

This application is a U.S. national phase filing under 35 U.S.C. § 371 of PCT/JP2014/004191 filed Aug. 14, 2014, which claims priority to and the benefit of Japanese Application No. 2013-168614 which was filed on Aug. 14, 2013 and Japanese Application No. 2013-168615 which was filed on Aug. 14, 2013. All of the aforementioned applications are incorporated herein by reference in their entirety.

FIELD

The present invention relates to a hydroponic cultivation system.

BACKGROUND

Plants have long been cultivated outdoors. However, outdoor cultivation is susceptible to the effects of weather such as water shortage due to extreme weather conditions. For this reason, facility cultivation, which enables more stable planned cultivation of plants, has drawn interest in recent years. For instance, Patent Literature 1 describes a technique for cultivating plants with a hydroponic cultivation system Patent Literature 1: Japanese Laid-Open Publication No. 9-37664

SUMMARY

The problem to be solved is, a culture solution vessel would be relatively heavy in the hydroponic cultivation system described in Patent Literature 1 because a large quantity of culture solution is required. For this reason, the strength required for a frame body supporting the vessel would be high. Further, a pump for circulating a large quantity of culture solution would require high performance. Thus, the aforementioned hydroponic cultivation system would require equipment, such as high performance frame body and pump, a large space, and as a result considerable equipment cost.

The present invention has been conceived in view of such a circumstance. The objective of the present invention is in providing a hydroponic cultivation system that can reduce the amount of culture solution. Another objective of the present invention is to provide a system capable of efficient hydroponic cultivation in a smaller space than conventional hydroponic cultivation systems.

In order to solve the above-described problem, a hydroponic cultivation system according to one embodiment of the present invention provides a hydroponic cultivation system comprising:

a plurality of vessels extending in a predetermined direction; and a plant holding plate that holds a plant and is disposed to span across the plurality of vessels thereabove, wherein each of the plurality of vessels is configured to contain a culture solution required for the growth of the plant.

The hydroponic cultivation system according to a certain embodiment of the present invention comprises a first vessel, a second vessel, a support mechanism provided between the first vessel and the second vessel, and a plant holding plate, which is disposed to span across the first vessel and the second vessel thereabove and is supported by the support mechanism to be movable in a predetermined direction.

In the hydroponic cultivation system of the present invention, a plurality of vessels extending in a predetermined direction are disposed and plants are disposed at positions corresponding to the vessels on a plant holding plate supported thereabove.

Thus, a plurality of vessels would be disposed below a plant holding plate in the present invention. Below the plant holding plate are the vessels and a space between two adjacent vessels. The plant holding plate holds plants only where there is a vessel therebelow. As a result, a culture solution is present only under a region where plants are held on the plant holding plate.

Meanwhile, one or more plant holding plates were floated in one large vessel in conventional hydroponic cultivation systems. Such conventional hydroponic cultivation systems have a large vessel filled with a culture solution therein under the entire plant holding plates, regardless of whether the site held a plant. As a result, a culture solution was present under a region on a plant holding plate where a plant is not held.

Thus, the hydroponic cultivation system of the present invention is able to significantly reduce the amount of culture solution required for the growth of plants by having a configuration in which a vessel and a culture solution are present only below a plant holding region on a plant holding plate. This is extremely advantageous when a hydroponic cultivation system is utilized, for example, in a region experiencing water shortage. Further, since a vessel in the hydroponic cultivation system of the present invention has a smaller capacity than a vessel in conventional hydroponic cultivation systems, a culture solution can be circulated rapidly, such that a fresh culture solution can be successively provided to plants. Growth of plants is promoted and diseases can be prevented thereby. Furthermore, since the overall amount of culture solution is reduced, the required level of strength of a frame body supporting the solution and performance of a pump or the like associated with circulation of the culture solution would be lower, leading to reduction in cost.

For the present invention, a support mechanism for a plant holding plate, conveyor mechanism, piping or the like can be disposed in the space between vessels under a region on the plant holding plate where a plant is not held. Since every region below a plant holding plate in a conventional system was occupied by a vessel, the space under a region where a plant is not held on a plant holding plate is utilized effectively in the present invention, whereby reduction in space for the entire hydroponic cultivation system was accomplished. Furthermore, strength of a plant holding plate is no longer required by disposing a support mechanism for the plant holding plate, such that the plant holding plate can be a low-cost, light material (e.g., expanded polystyrene foam). Since a light-weight cultivation system comprising a vessel and a plant holding plate is materialized thereby, the system can be disposed above or below in multiple rows with a simple mechanism. In addition, light from an irradiation source passes through the space between vessels, such that light can be efficiently irradiated onto plants held by a plant holding plate from multiple directions. As a result, the level of growth of cultivated plants can be improved to enhance productivity.

Furthermore, a space is created between a plant holding plate and a culture solution in a vessel by having a configuration where the plant holding plate spans across above a plurality of vessels. For this reason, the root of plants held by the plant holding plate is in contact with not only the culture solution but also air. Plant growth is promoted by supplying air to the room in this manner. This could not be accomplished by a conventional hydroponic cultivation system that allows a plant holding plate to float in a large vessel containing a culture solution.

For example, the present invention provides the following items.

Item 1 is a hydroponic cultivation system comprising:
a plurality of vessels extending in a predetermined direction; and
a plant holding plate that holds a plant and is disposed to span across the plurality of vessels thereabove,
wherein each of the plurality of vessels is configured to contain a culture solution required for the growth of the plant.

Item 2 is the hydroponic cultivation system of item 1, wherein there is a space between the plant holding plate and the culture solution.

Item 3 is the hydroponic cultivation system of item 1, further comprising at least one support mechanism provided between vessels adjacent to each other among the plurality of vessels.

Item 4 is the hydroponic cultivation system of item 1, further comprising a conveyor mechanism for conveying the plant holding plate along the predetermined direction.

Item 5 is the hydroponic cultivation system of item 4, wherein the support mechanism comprises the conveyor mechanism.

Item 6 is the hydroponic cultivation system of item 1, wherein the system is configured such that the culture solution flows inside the vessels.

Item 7 is the hydroponic cultivation system of item 6, wherein the vessel further has a turbulence generating section configured to generate turbulence in a flow of the culture solution.

Item 8 is the hydroponic cultivation system of item 1, further comprising a discharge section for discharging the culture solution from the vessels.

Item 9 is the hydroponic cultivation system of item 1, further comprising a supplying section for supplying the culture solution to the vessels.

Item 10 is the hydroponic cultivation system of item 1, wherein the vessels are configured such that a width of the vessels is adjustable in a direction that is approximately orthogonal to the predetermined direction.

Item 11 is the hydroponic cultivation system of item 1, further comprising a cutting section for cutting a root of the plant.

Item 12 is the plant factory comprising the hydroponic cultivation system of item 5 and a foamed resin greenhouse for accommodating the hydroponic cultivation system.

Item 13 is the plant factory of item 12, wherein a plurality of the hydroponic cultivation systems are disposed in a vertical direction.

Item 14 is the plant factory of item 12, wherein the foamed resin greenhouse has an arched roof.

Item 15 is the plant factory of item 14, wherein the foamed resin greenhouse is composed of a plurality of divided fragments.

Item 16 is the plant factory of item 15, further comprising a binding means for binding the plurality of divided fragments at an outer surface of the greenhouse.

Item 17 is the plant factory of item 15, wherein the foamed resin greenhouse comprises a divided circumferential wall composed of a plurality of the divided fragments.

Item 18 is the plant factory of item 17, wherein the foamed resin greenhouse comprises a plurality of the divided circumferential walls.

Item 19 is the plant factory of item 18, wherein the foamed resin greenhouse has a reinforcing member between two of the divided circumferential walls that are adjacent to each other.

Item 20 is the plant factory of item 19, wherein at least a portion of the divided circumferential wall has a rib.

Item 21 is the plant factory of item 20, wherein the rib is integrally molded with the divided circumferential wall.

Item 22 is the plant factory of item 20, wherein the rib is present at an engaging section of two of the divided circumferential walls that are adjacent to each other.

Item 23 is the plant factory of item 20, wherein the rib protrudes out toward the inside space side of the foamed resin greenhouse.

Item 24 is the plant factory of item 17, wherein the foamed resin greenhouse comprises a divided roof composed of a plurality of the divided fragments.

Item 25 is the plant factory of item 24, wherein the divided roof comprises an eaves section at one end.

Item 26 is the plant factory of item 25, wherein the one end is a portion having the maximum thickness of the divided roof.

Item 27 is the plant factory of item 12, further comprising another construct, wherein the construct comprises an interior space in communication with an interior space of the foamed resin greenhouse.

Item 28 is the plant factory of item 27, wherein the construct is a domed construct.

Item 29 is the plant factory of item 14, wherein the foamed resin greenhouse is an arched building comprising a first structure having a first arched roof and a second structure having a second arched roof, wherein the first structure and the second structure share at least a portion of a partition wall partitioning the first structure and the second structure.

Item 30 is the plant factory of item 29, wherein
the first arched roof comprises a divided fragment of the first arched roof,
the second arched roof comprises a divided fragment of the second arched roof, and
the partition wall comprises a divided fragment of a partition wall leg section,
wherein the divided fragment of the first arched roof, the divided fragment of the second arched roof, and the divided fragment of the partition wall leg section are connected through a divided fragment of a partition wall top section, such that the first structure and the second structure share at least a portion of the partition wall.

Item 31 is the plant factory of item 29, wherein the arched building further comprises a third structure having a third arched roof, and the second structure and the third structure share at least a portion of a partition wall partitioning the second structure and the third structure.

Item 32 is the plant factory of item 30, wherein the divided fragment of the partition wall top section is rotatably connected to the divided fragment of the partition wall leg section.

Item 33 is the plant factory of item 32, wherein the first structure and the second structure are constructed on an inclined surface.

Item 34 is the plant factory of item 27, the plant factory configured such that a first divided fragment in the greenhouse has a first opening and a first convex section surrounding the first opening and protruding outwardly, a second divided fragment in the construct has a second opening and a second convex section surrounding the second opening and protruding outwardly, and the first convex section and the second convex section are connected such that the first opening is in communication with the second opening.

Item 35 is the plant factory of item 15, wherein the divided fragment comprises a reinforcing member.

Item 36 is the plant factory of item 35, wherein the reinforcing member has a through hole.

Item 37 is the plant factory of item 35, wherein the reinforcing member has a fastening member and the fastening member of the reinforcing member of the divided fragment and a fastening member of a reinforcing member of another divided fragment are fastened to connect the divided fragment and the another divided fragment.

Item 38 is the plant factory of item 35, wherein the reinforcing member comprises a web extending in a longitudinal direction, a first flange projecting out from the web toward one of transverse directions, and a second flange projecting out from the web toward the opposite direction from the first flange.

Item 39 is the plant factory of item 38, comprising a crossing member installed to intersect the reinforcing member.

Item 40 is the plant factory of item 39, wherein the foamed resin envelops the reinforcing member and the crossing member.

Item 41 is the plant factory of item 15, wherein the divided fragment is erected on a foundation.

Item 42 is the plant factory of item 41, wherein the plant factory is configured such that a base end section of at least one of the divided fragments has a protrusion section, the foundation has a concave section, and the protrusion section fits together with the concave section.

Item 43 is the plant factory of item 42, further comprising a sheet member and an application layer, wherein the sheet member is applied to cover a portion connecting two connected divided fragments, a portion rising out from the foundation of the two divided fragments, and a corresponding portion of the foundation, wherein the application layer is applied to at least a portion of the sheet member.

Item 44 is the plant factory of item 42, wherein the foundation comprises a plurality of divided substrates.

Item 45 is the plant factory of item 44, wherein the foundation has an engaging section to which a base section of the foamed resin greenhouse is engaged.

Item 46 is the plant factory of item 45, wherein the plant factory is configured such that the foamed resin greenhouse further comprises a linking plate, and the linking plate connects two adjacent divided substrates, and the divided substrate and the base section of the foamed resin greenhouse.

Item 47 is the plant factory of item 44, wherein the foamed resin greenhouse further comprises a floor forming a floor surface of the greenhouse.

Item 48 is the plant factory of item 47, wherein the floor comprises a plurality of divided floors.

Item 49 is the plant factory of item 12, wherein the foamed resin greenhouse comprises:

a plurality of support columns erected within at least a portion of a region of the floor surface in the greenhouse; and a top floor surface supported by the columns.

Item 50 is the plant factory of item 49, characterized in that the top floor surface is configured to be apart from the foamed resin greenhouse.

Item 51 is the plant factory of item 12, wherein the foamed resin greenhouse further comprises a processed plate made of foamed resin disposed on the outer surface.

Item 52 is the plant factory of item 51, wherein the processed plate is an imitation stone plate.

Item 53 is the plant factory of item 52, wherein the imitation stone plate has a convex section on a surface in contact with the foamed resin greenhouse.

Item 54 is the plant factory of item 52, wherein the imitation stone plate has a thin connection section on at least a portion of an outer circumference.

Item 55 is the plant factory of item 12, further comprising an improved ground foundation formed by disposing a round stone or a sphere in a hole having a larger outer circumference than an outer circumference of the foamed resin greenhouse to absorb shaking due to an earthquake, wherein the foamed resin greenhouse is slidably placed on the improved ground foundation.

Item 56 is the plant factory of item 12, wherein the foamed resin is expanded polystyrene foam.

Item 57 is the plant factory of item 56, wherein the expanded polystyrene foam greenhouse comprises a room temperature adjusting means.

Embodiments with any combination of the aforementioned constituent elements or embodiments with constituent elements and expression of the present invention replaced with one another among a method, apparatus, system or the like are also effective as an embodiment of the present invention.

ADVANTAGEOUS EFFECTS OF INVENTION

The present invention can provide a hydroponic cultivation system, which is capable of reducing the amount of culture solution and carrying out hydroponic cultivation more efficiently in a smaller space than conventional hydroponic cultivation systems. The present invention can further provide a plant factory that can be constructed readily at low cost in an environment with any temperature condition or land condition by accommodating such a hydroponic cultivation system in an expanded polystyrene foam greenhouse suitable for accommodating the hydroponic cultivation system.

BRIEF DESCRIPTION OF THE DRAWINGS

FIG. 14(A) is a side view of the culture system and FIG. 14(B) is a plan view of the culture system.

FIG. 26(a) is an overview of a hydroponic cultivation system accommodating greenhouse combining three arched structures. FIG. 26(b) is a cross-sectional view of the hydroponic cultivation system accommodating greenhouse combining the three arched structures.

DETAILED DESCRIPTION

The present invention is disclosed hereinafter with exemplifying Examples while referring to the appended drawings as needed. Throughout the entire specification, a singular expression should be understood as encompassing the concept thereof in a plural form unless specifically noted otherwise. Further, the terms used herein should be understood as being used in the meaning that is commonly used in the art, unless specifically noted otherwise. Thus, unless defined otherwise, all terminologies and scientific technical terms that are used herein have the same meaning as the terms commonly understood by those skilled in the art to which the present invention pertains. In case of a contradiction, the present specification (including the definitions) takes precedence.

The Embodiments provided hereinafter are provided for better understanding of the present invention. Thus, the scope of the present invention should not be limited to the following descriptions. It is apparent to those skilled in the art that the embodiments can be appropriately modified within the scope of the present invention while referring to the descriptions herein.

First Embodiment

Figure 1:
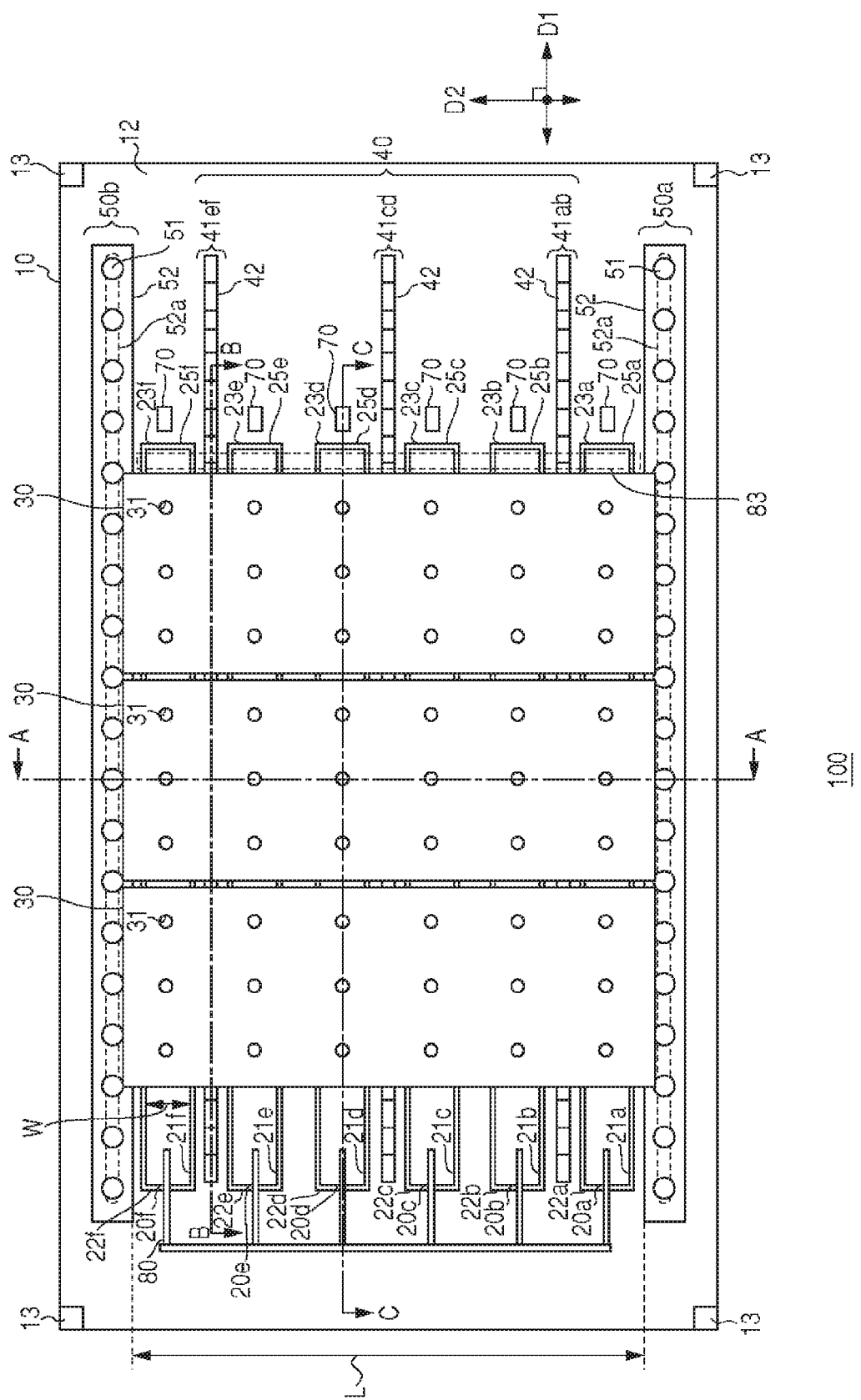
FIG. 1 is a top view showing a hydroponic cultivation system according to a first embodiment.
Figure 2:
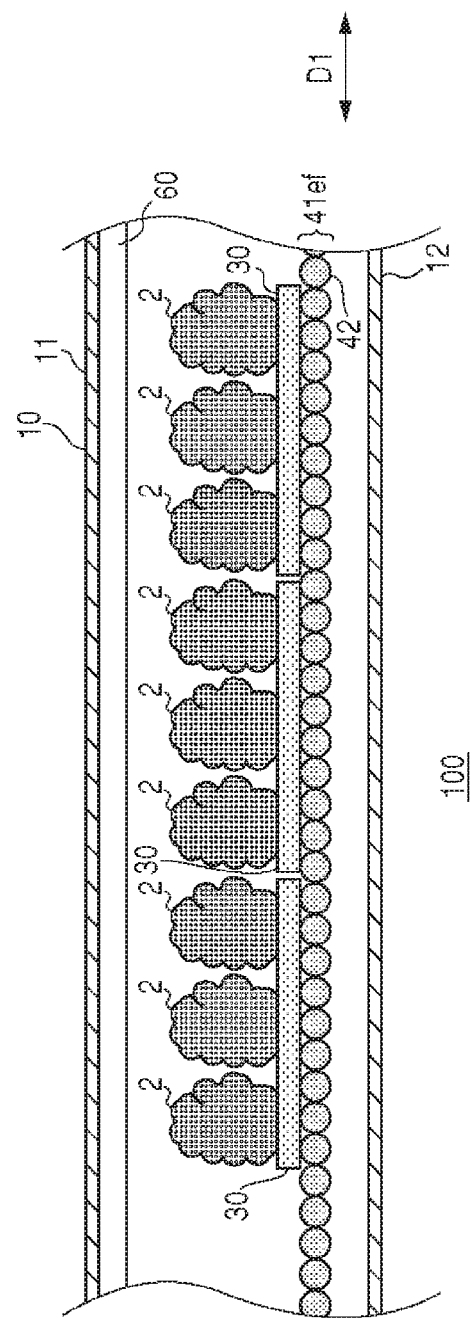
FIG. 2 is a cross-sectional view along the B-B line in FIG. 1.
Figure 3:
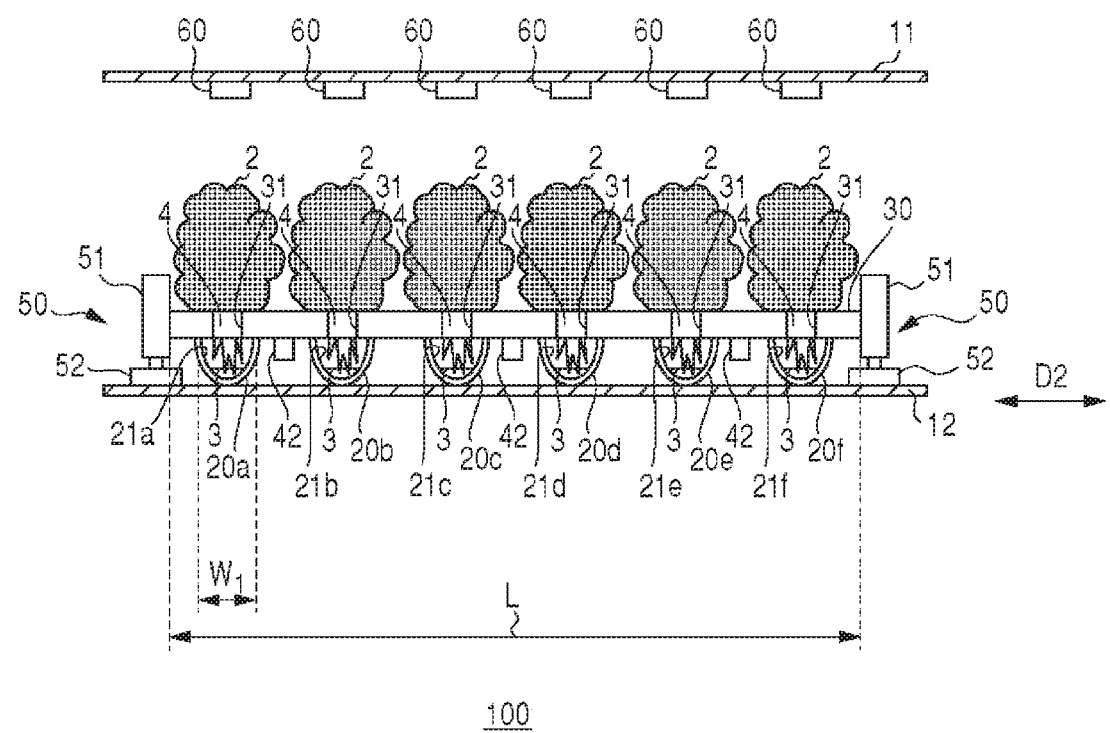
FIG. 3 is a cross-sectional view along the A-A line in FIG. 1.
Figure 4:
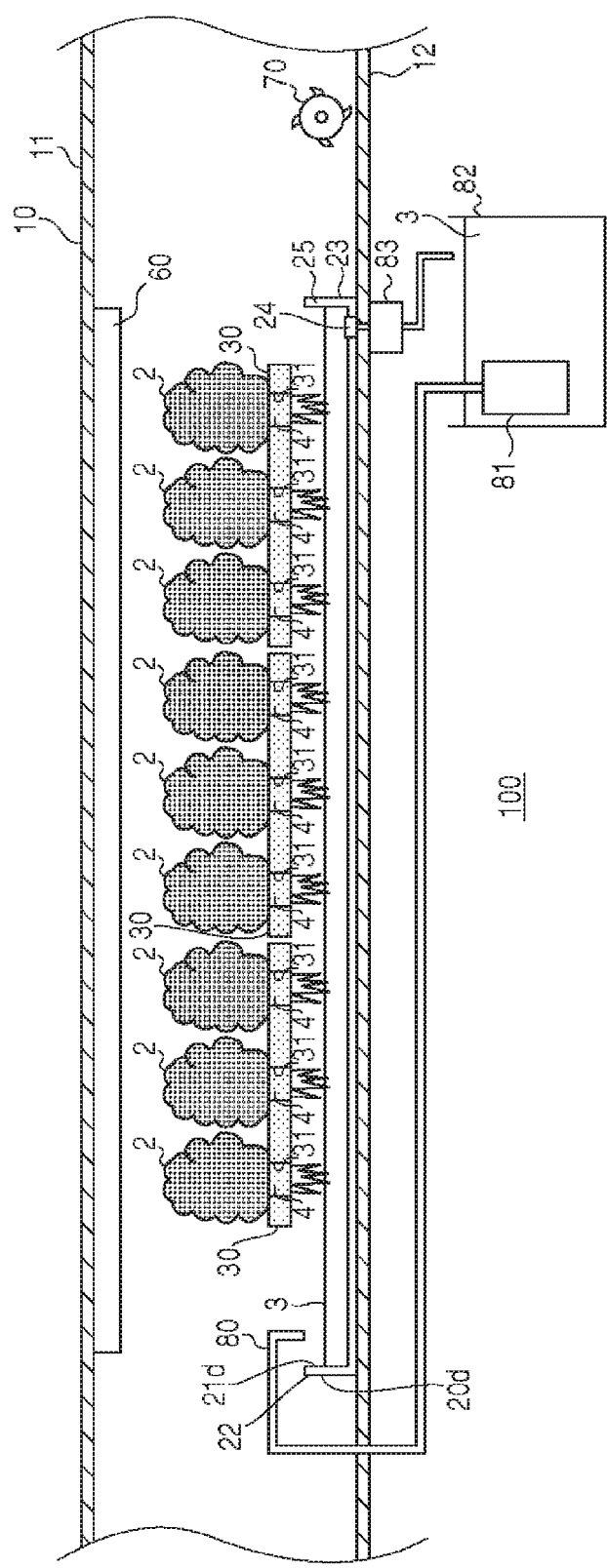
FIG. 4 is a cross-sectional view along the C-C line in FIG. 1.

FIGS. 1-4 show a hydroponic cultivation system 100 according to the first embodiment. FIG. 1 is a top view of the hydroponic cultivation system 100. FIG. 2 is a cross-sectional view along the B-B line in FIG. 1. FIG. 3 is a cross-sectional view along the A-A line in FIG. 1. FIG. 4 is a cross-sectional view along the C-C line in FIG. 1. Since FIG. 1 shows the configuration inside the hydroponic cultivation system 100, display of a top plate 11, artificial medium 4 and plant 2 is omitted.

The hydroponic cultivation system 100 grows the plants 2, such as vegetables or flowers, by hydroponic cultivation. The plants 2 may be any plant that grows on a plant holding plate 30 and is suitable for hydroponic cultivation, but is preferably an agricultural product. Examples of agricultural products intended for the system include vegetables, flowers, fruits, grains and the like that photosynthesize. Meanwhile, when an irradiation section 60 is not provided, examples of agricultural products intended for the system include bean sprouts, mushrooms that do not photosynthesize and the like. The specific types of plants grown in a hydroponic cultivation system can be appropriately determined by those skilled in the art.

The hydroponic cultivation system 100 comprises a frame body 10, vessels 20a-20f (hereinafter, collectively referred to as the "vessels 20"), a plurality of plant holding plates 30, a support mechanism 40, a pair of conveyor mechanisms 50a and 50b (hereinafter, collectively referred to as the "conveyor mechanisms 50"), a plurality of irradiation sections 60, and a plurality of root cutters 70.

The frame body 10 mainly houses the vessels 20. The frame body 10 comprises the top plate 11, a bottom plate 12, and support columns 13. The top plate 11 and the bottom plate 12 are rectangular plate members. The plurality of corner sections thereof are each equipped with the support column 13.

The long vessels 20 are disposed on the bottom plate 12. Since there are multiple vessels 20, they are denoted as 20a, 20b, 20c or the like while appropriately appending a, b, c or the like. The vessels 20a-20f are arranged in parallel in the transverse direction in this order. In particular, the vessels 20a-20f are arranged in parallel such that the longitudinal direction of each vessel is oriented in approximately the same direction. The vessels 20a-20f have accommodation troughs 21a-21f (hereinafter, collectively referred to as the "accommodation troughs 21") extending along the longitudinal direction thereof, respectively. The accommodation troughs 21 refer to the inside surface of the vessels 20. The vessels 20 and the accommodation troughs 21 may be integrally formed or separately formed. For instance, as disclosed below, the entire vessel 20 may be inclined or only the inner surface (bottom surface) of the vessels 20 may be inclined to allow a culture solution to flow within the vessels 20. When only the inner surface of the vessels 20 is inclined in this manner, this is referred to as inclining the accommodation groves 21. A culture solution 3 is housed in the accommodation groves 21. An explanation is provided hereinafter while referring to the direction parallel to the longitudinal direction of the vessels 20 and the accommodation troughs 21 as the D1 direction and the direction parallel to the transverse direction of the vessels 20 and the accommodation troughs 21 as the D2 direction.

As is clear from FIG. 3, the present invention disposes a plant holding plate above a plurality of elongated vessels 20 unlike conventional hydroponic cultivation systems in which a plant holding plate is floated on a culture solution in a single large vessel. Thus, a space would be created between the plant holding plate 30 and the culture solution 3. For this reason, the root of plants 2 is sufficiently in contact with not only the culture solution 3, but also air. Since air is sufficiently supplied to the root of plants 2 thereby, the growth of the plants 2 is promoted.

The plant holding plate 30 is a plate-like member comprising a through hole 31. The artificial medium (cultivation bed) 4 comprising the plant 2 is inserted in and held by the through hole 31. The plant holding plate 30 is disposed above the vessels 20 and supported by the support mechanism 40. In particular, the plant holding plate 30 is disposed to span across the vessel 20a to vessel 20f thereabove. That is, a plurality of vessels 20 are below a single plant holding plate 30. Conventional hydroponic cultivation systems employ a configuration in which one or more plant holding plates are disposed on a single large pool-like vessel.

The width W of the accommodation troughs 21 in the D2 direction is formed to have a breadth matching the size of the root of the grown plant 2. For instance, the width W is determined to have a breadth such that the root of the plant 2 is in contact with both side surfaces of the accommodation troughs 21. Further, the width W, for instance, is determined such that the space between the root of the plant 2 and each side surface of the accommodation troughs 21 is 50 mm or less. In either case, the width W of the accommodation troughs 21 is determined to be relatively narrow. In a preferred embodiment, the accommodation troughs 21 are configured such that the width W of the accommodation troughs 21 can be adjusted in accordance with the growth of the plant 2. The width W of the accommodation troughs 21 can be configured to be adjustable by known techniques in the art. Specifically, since the root is not spread out in the early periods of growth of the plant 2, the width W of the accommodation troughs 21 is set to be narrow, and as the root grows and spreads with the growth of the plant 2, the width W of the accommodation troughs 21 can be expanded to the extent that the another mechanism that is present between two adjacent vessels (e.g., the support mechanism 40 that is present between two adjacent vessels and support mechanism 440 in FIG. 7 disclosed below) is not in contact therewith. It is possible to provide a configuration in which the width of the accommodation troughs 21 changes in accordance with the width of the vessels 20 or a configuration in which the width is changed independently of the vessels 20 and the accommodation troughs 21.

Supplying tubes 80a-80f (hereinafter, collectively referred to as the "supplying tubes 80) are provided on the side of ends 22a-22f (hereinafter, collectively referred to as the ends 22") in the longitudinal direction of the vessels 20a-20f, respectively. The supplying tubes 80 supply the culture solution 3 pumped out from a tank 82 by a pump 81 to the vessels 20. Drainage outlets 24a-24f (hereinafter, collectively referred to as the "drainage outlets 24") configured to be openable and closable are provided on the side of ends 23a-23f (hereinafter, collectively referred to as the "ends 23") on the opposite side. The culture solution 3 supplied within the vessels 20 are drained from the drainage outlets 24 and returns to the tank 82 through a water receiving section 83 extending in the D2 direction. The culture solution 3 may be drained by providing a suction pump instead of the drainage outlets 24 to pump out the solution.

Accommodation walls 25a-25f (hereinafter, collectively referred to as the "accommodation walls 25") on the side of the ends 23a-23f of the vessels 20a-20f are configured to be detachable. This allows the root of the plant 2 to avoid contact with the accommodation walls 25 when the plant holding plate 30 is conveyed toward the root cutter 70. The accommodation wall 25 may be configured to be able to slide down or to be openable and closable to the left and right or top and bottom, as long as the accommodation wall 25 can be retracted to avoid contact with the root of the plant 2.

The support mechanism may be any mechanism that can support the plant holding plate 30 above the vessels 20. The support mechanism 40 may be disposed at an end of a plant holding plate to support the plant holding plate from left and right or disposed between adjacent vessels 20 to support the plant holding plate from below or suspended from above. Examples of such a support mechanism include, but are not limited to, a roller, belt, support column, hook and the like. As a specific embodiment of the present invention, FIGS. 1 and 2 show a case where the support mechanism 40 is a roller disposed between vessels 20. In the specific embodiment, the support mechanism 40 includes groups of support rollers 41ab, 41cd, and 41ef, which are disposed between the vessel 20a and the vessel 20b, the vessel 20c and the vessel 20d, and the vessel 20e and the vessel 20f, respectively. Each of the groups of support rollers 41ab-41ef comprises one or more support rollers 42. In FIGS. 1 and 2, the groups of support rollers 41ab-41ef comprise a large number of support rollers 42 disposed with hardly any space along the D1 direction. The support roller 42 is fixed to the frame body 10 by a support member (not shown). In particular, the support roller 42 is fixed such that the rotational axis thereof is approximately orthogonal to the D1 direction and approximately parallel with the D2 direction. The support mechanism 40 movably supports the plant holding plate 30 with the support rollers 42.

The overall space between the vessels 20 may be reduced by disposing a mechanism such as the support mechanism described above or the space may be left empty without disposing anything therein. Light can pass through between the vessels 20 by the presence of space between the vessels 20, such that light would be irradiated onto the plant 2 from multiple directions. Further, maintenance of vessels 20 is also facilitated by leaving the space between the vessels 20 empty.

The pair of conveyor mechanisms 50a and 50b oppose each other in the D2 direction with the vessels 20 therebetween. Each of the pair of conveyor mechanisms 50a and 50b comprises a plurality of driving rollers 51 and a driving apparatus 52 for rotating and driving the plurality of driving rollers 51. Each driving roller 51 is provided such that the rotational axis is oriented in the perpendicular direction and the outer peripheral surface contacts the side surface of the plant holding plate 30. The driving apparatus 52 transmits the rotation of a motor (not shown) to the driving roller 51 through a chain 52a to rotate the driving roller 51. The driving roller 51 in contact with the side surface of the plant holding plate 30 is rotated in this manner to move the plant holding plate 30. The conveyor mechanism 50a and 50b may be configured such that an interval L in the D2 direction is adjustable. The system is thereby compatible with cases where the length of the plant holding mechanism 30 in the D2 direction is changed due to a design change or the like.

A plurality of irradiation sections 60 are fixed to the top plate 11. Each irradiation section 60 is disposed to oppose the vessels 20 in a perpendicular direction. That is, each irradiation section 60 is disposed to oppose the plant 2 to be disposed on the vessel 20 in a perpendicular direction. The irradiation section 60 irradiates light, which is received by the plant 2 for photosynthesis. The irradiation section 60 does not need to irradiate light when growing a plant that does not photosynthesize.

The root cutter 70 is provided in the vicinity of each of the ends 23a-23f, on the opposite side from the ends 22 with respect to the ends 23. In this embodiment, the root cutter 70 is a disk-shaped cutter with a plurality of blades disposed at a predetermined interval in the circumferential direction. The root cutter 70 rotates about a rotational axis by a motor (not shown) to cut off the root of the plant 2 that is conveyed with the plant holding plate 30. In this manner, the root of the plant 2 can be cut off while being held by the plant holding plate 30.

The operation of the hydroponic cultivation system 100 configured as described above is explained. First, the growing stage is explained. The artificial medium 4 in which the plant 2 is planted is then fitted into the through hole 31 of the plant holding plate 30. Further, the plant holding plate 30 is disposed at a desired position above the vessels 20 by the conveyor mechanism 50. The culture solution 3 is then supplied from the supplying tube 80 and drained from the drainage outlet 24 to circulate the culture solution 3 in the accommodation troughs 21. Of course, the drainage outlet 24 may be shut off to retain the culture solution 3 in the accommodation troughs 21. Further, light is irradiated onto the plant 2 from the irradiation section 60 as needed. The plant 2 is grown in this manner.

Next, the shipping stage is explained. First, the supply of culture solution 3 from the supplying tube 80 is stopped to drain out the culture solution 3 from the drainage outlet 24. Subsequently, the accommodation wall 25 on the side of the ends 23 of the vessels 20 is detached. While in this state, the plant holding plate 30 is conveyed toward the root cutter 70. The root cutter 70 cuts off the root of the plant 2 that was conveyed over with the plant holding plate 30. The plant 2 with its root cut off is transported by a transporter robot (not shown) and shipped.

In hydroponic cultivation system 100 according to the present embodiment, the vessels 20 are formed such that the width W of the accommodation trough 21 is relatively narrow. For this reason, the amount of culture solution 3 required for the growth of the plant 2 can be reduced. This is extremely advantageous when a hydroponic cultivation system is utilized, for example, in a region experiencing water shortage or the like. Further, since the vessels 20 are thin and small, the culture solution 3 would be circulated rapidly. In other words, a fresh culture solution 3 can be successively sent into the vessels 20. For this reason, it is possible to expedite the growth of the plant 2. Further, the inside of the vessel 20 can be kept clean by the circulation being faster. Diseases of the plant 2 can be prevented thereby. Further, since a small amount of culture solution 3 is sufficient, the vessels 20 would be lighter and the required strength of the frame body 10 for supporting the vessels 20 would be relatively low. For this reason, the material cost of the frame body 10 can be kept low. Further, the pumping and durability performance required for the pump 81 would also be lower, resulting in reduced cost for the pump 81.

Further, in the hydroponic cultivation system 100 according to the present embodiment, the plant holding plate 30 is supported by the groups of support rollers 41ab-41ef. That is, the plant holding plate 30 is supported by a support mechanism provided between vessels. For this reason, a reaction force of the weight of the plant holding plate 30 acting on the plant holding plate 30 from the support mechanism can be dispersed relatively equally in the D2 direction. For this reason, the strength required for the plant holding plate 30 would be relatively low, such that a light-weight plant holding plate 30 can be made. As a result, the driving performance and durability required for the conveyor mechanism 50 for conveying the plant holding plate 30 would be low to allow reduction in cost for the conveyor mechanism 50.

Further, in the hydroponic cultivation system 100 according to the present embodiment, the plant holding plate 30 is provided to span across the water vessels 20a-20f, whereby the plants 2 grown in the vessels 20a-20f, for example, can be conveyed together to the shipping step when shipping.

Second Embodiment

The main difference between the hydroponic cultivation system 100 according to the first embodiment and the hydroponic cultivation system according to the second embodiment is in the configuration of vessels.

Figure 5:
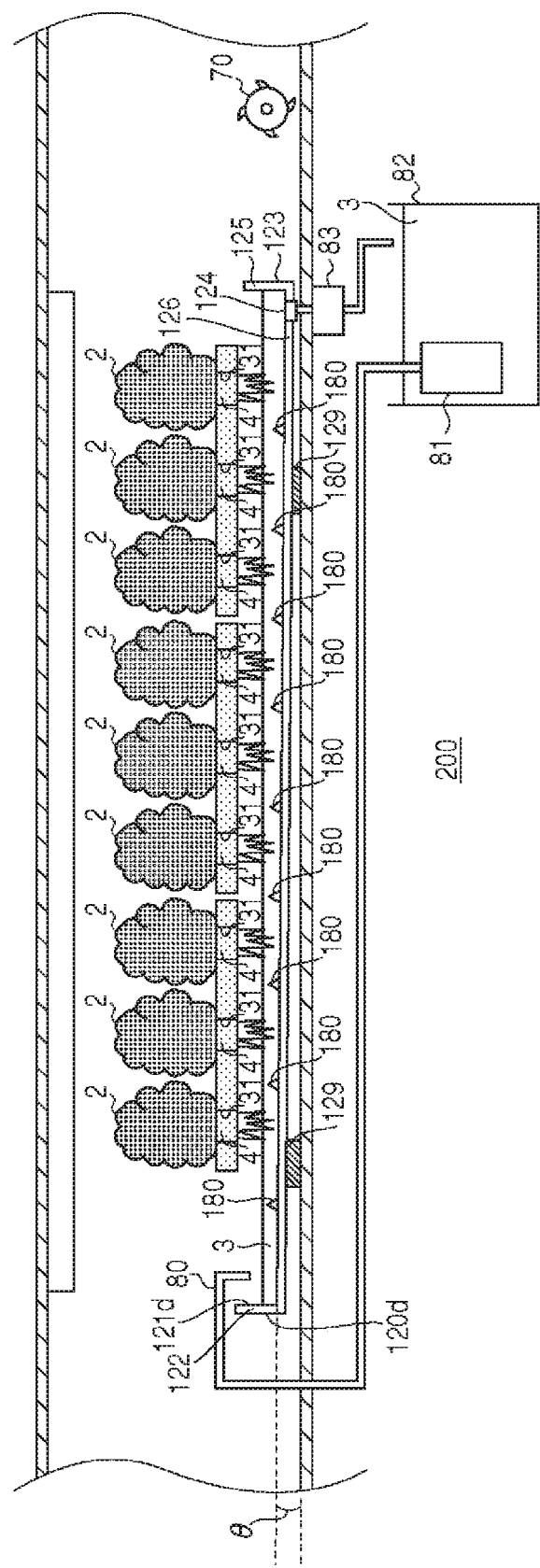
FIG. 5 is a top view showing a hydroponic cultivation system according to a second embodiment.

FIG. 5 shows a hydroponic cultivation system 200 according to the second embodiment. FIG. 5 corresponds to FIG. 3 with regard to the explanation of the first embodiment. The hydroponic cultivation system 200 comprises a frame body 10, vessels 20, a plurality of plant holding plates 30, a support mechanism 40, a pair of conveyor mechanisms 50a and 50b, a plurality of irradiation sections 60, and a plurality of root cutters 70.

A vessel 120 is configured such that the bottom surface of a trough 126 of an accommodation trough 121 thereof is inclined by only an angle θ with respect to the horizontal direction. In particular, the vessel 120 is configured to have a decline from the side of end 22, where a supplying tube 80 is provided, toward the side of end 23, where a drainage outlet 24 is provided. The present embodiment materializes an incline of the bottom surface of the trough 126 by supporting the vessel 120 with an incline adjusting section 129 and extending and contracting the incline adjusting section 129. The incline of the bottom surface of the trough 126 may be materialized by forming the vessel 120 such that a bottom section 123 grows in thickness in the D1 direction. The incline may be materialized by inclining the vessel 120 or by inclining the accommodation trough 121 in the vessel 120.

Further, a plurality of protrusion sections 180 are formed on the bottom surface of the trough 126 of the vessel 120. For instance, the protrusion sections 180 have a triangular cross-section along the D1 direction. Since the bottom surface of the trough 126 of the accommodation trough 121 is inclined as disclosed above, a flow of culture solution 3 from the end 22 toward the end 23 is created. Turbulence may be generated in the flow of the culture solution 3 due to the presence of the protrusion sections 180. Further, the present invention has a configuration supporting the plant holding plate 30 above the vessel 20 with the support mechanism 40 instead of allowing the plant holding plate 30 to float on the surface of the culture solution 3 of the vessel 20. Hence, there is a space between the plant holding plate 30 and the surface of the culture solution 3. Thus, air that is present in the space between the surface of the culture solution 3 and the plant holding plate 30 is incorporated into the culture solution 3 by the turbulence generated in the culture solution 3. The root of the plant 2 thereby contacts not only the culture solution 3, but also air, resulting in the growth of the plant 2 being promoted.

The hydroponic cultivation system 200 according to the present embodiment can achieve the same working effect as the hydroponic cultivation system 100 according to the first embodiment. In addition, the hydroponic cultivation system 200 according to the present embodiment has a decline from the supply side toward the draining side. Thus, the culture solution 3 can be circulated more readily. Further, the hydroponic cultivation system 200 according to the present embodiment can incorporate air in the atmosphere into the culture solution 3.

Third Embodiment

Figure 6:
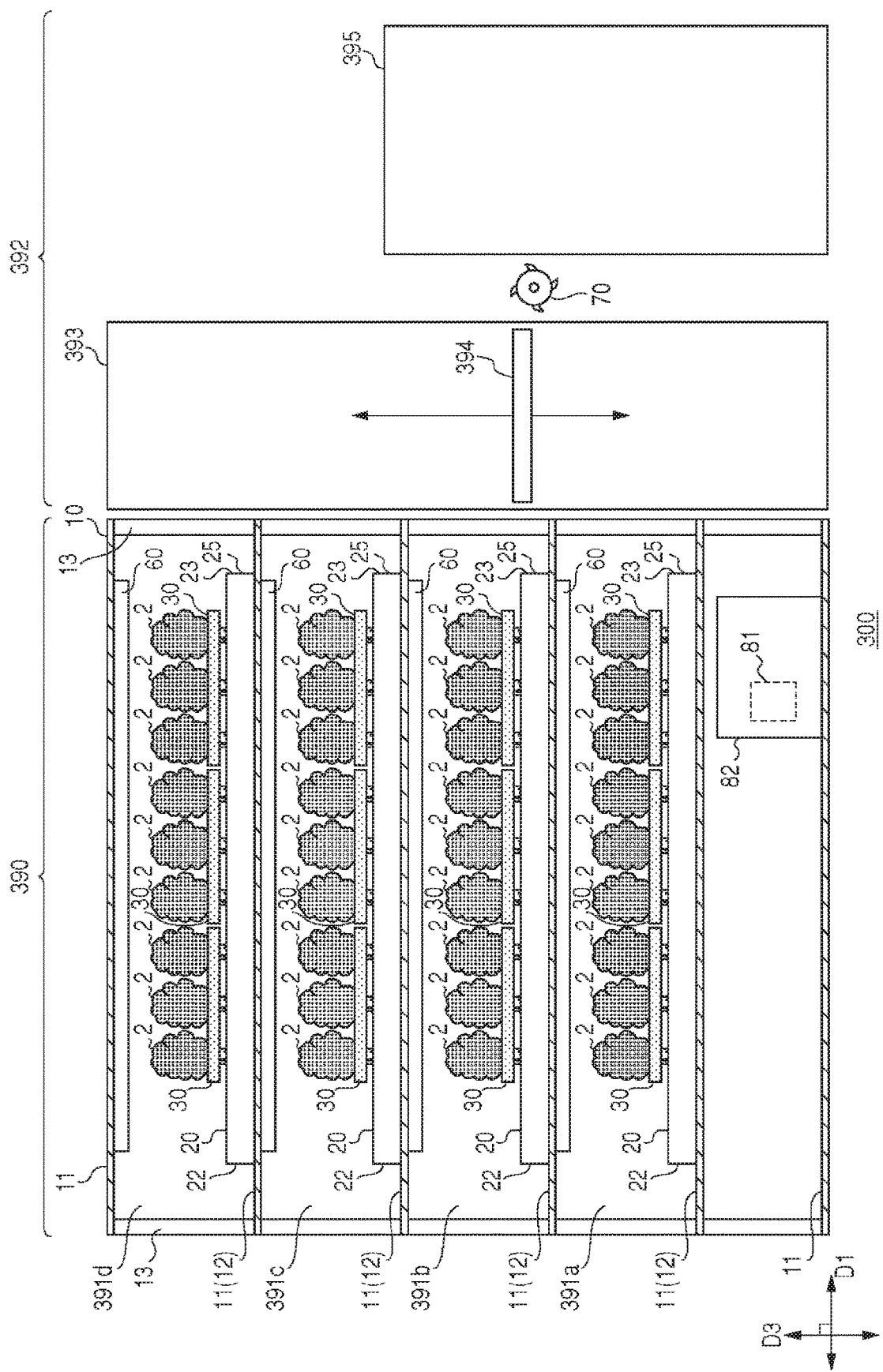
FIG. 6 is a top view showing a hydroponic cultivation system according to a third embodiment.

The third embodiment explains a multi-row hydroponic cultivation system in which vessels are stacked up and down. FIG. 6 is a side view showing a hydroponic cultivation system 300 according to the third embodiment. The hydroponic cultivation system 300 comprises a cultivation unit 390 and a harvest packaging unit 392. The entire hydroponic cultivation system of the present invention is configured to be light weight by the trough-like shape of vessels 20 extending in a predetermined direction and light weight configuration of a plant holding plate. Thus, multiple such systems can be stacked and disposed vertically to form a multi-row hydroponic cultivation system with a simple mechanism.

The cultivation unit 390 has a first cultivation shelf 391a, a second cultivation shelf 391b, a third cultivation shelf 391c, and a fourth cultivation shelf 391d (hereinafter, collectively referred to as the "cultivation shelves 391"), a tank 82, and a pump 81. The first cultivation shelf 391a to the fourth cultivation shelf 391d are stacked up in this order from the bottom to the top. Each of the cultivation shelves 391 comprises a plurality of vessels 20, a support mechanism (not shown), a conveyor mechanism (not shown), and an irradiation section 60, which correspond to the vessels 20, support mechanism 40, conveyor mechanism 50, and irradiation section 60 in the first or second embodiment, respectively. The tank 82 and pump 81 are shared and utilized by each of the cultivation shelves 391. Of course, the tank 82 and the pump 81 may be provided for each cultivation shelf 391. The display of a supplying tube 80 is omitted in FIG. 6.

The harvest packaging unit 392 is provided adjacent the cultivation unit 390. In particular, the harvest packaging unit 392 is provided on the side of end 23 of the vessels 20 in the cultivation unit 390 (distal side from end 22), i.e., the side proximal to a drainage outlet (drainage outlet). The harvest packaging unit 392 has a transport apparatus 393, a root cutter 70, and a packaging machine 395, which are arranged in this order going away from the end 23. The harvest packaging unit 392 may have a conveyor belt for carrying a packaged plant or another apparatus. The transport apparatus 393 comprises a transfer apparatus 394 and an elevator apparatus (not shown). The elevator apparatus conveys the transfer apparatus 394 in the perpendicular direction (D3 direction in the Figure). The transfer apparatus 394 is configured to be capable of conveying the plant holding plate 30 in the D1 direction. The packaging machine 395 packages a plant 2.

The operation of the hydroponic cultivation system 300 configured as disclosed above is explained. First, the growing stage is explained. An artificial medium 4 in which the plant 2 is planted is fitted into a through hole 31 of the plant holding plate 30. The plant holding plate 30 is then placed on the transfer apparatus 394 by an operator. The elevator apparatus conveys the transfer apparatus 394 on which the plant holding plate 30 is placed to a desired position in the D3 direction. For instance, when the plant holding plate 30 is delivered to the second cultivation shelf 391b, the apparatus is moved to a position where the plant holding plate 30 can be placed on a support mechanism of the second cultivation shelf 391b. The transfer apparatus 394 then delivers the plant holding plate 30 to the cultivation shelf 391 in a cultivation unit 390. The plant holding plate 30 is disposed at a desired position above the vessel 20 by a conveyor mechanism of the cultivation shelf 391. In addition, the plant 2 is grown as in the case of the first embodiment.

Next, the shipping stage is explained. First, supply of a culture solution from a supplying tube is stopped to drain out the culture solution from a drainage outlet. Subsequently, an accommodation wall 25 on the end 23 side of the vessel 20 is detached. While in this state, the plant holding plate 30 is conveyed toward the transport apparatus 393 and placed on the transfer apparatus. The elevator apparatus then conveys the transfer apparatus 394 with the plant holding plate 30 placed thereon to a position matching the packaging machine 395. The transfer apparatus 394 conveys the plant holding plate 30 to the packaging machine 395. At this time, the root of the plant 2 is cut off by the root cutter 70 provided between the transfer apparatus 394 and the packaging machine 395. The packaging machine 395 then packages the plant 2 with the root cut off.

The hydroponic cultivation system 300 according to the present embodiment can achieve the same working effect as the hydroponic cultivation system 100 according to the first embodiment. In addition, the hydroponic cultivation system 300 according to the present embodiment takes in or out the plant holding plate 30 with one transport apparatus 393. For this reason, the cost required for the transport apparatus 393 can be contained.

The configuration and operation of the hydroponic cultivation systems according to the embodiments have been explained. These embodiments are exemplification. It is understood by those skilled in the art that various modified examples combining each of the constituent elements thereof are possible and such modified examples are also within the scope of the present invention.

First Modified Example

The first to third embodiments were explained for cases where the support mechanism 40 comprises groups of support rollers 41ab, 41cd, and 41ef. However, the present invention is not limited thereto. A group of rollers 41bc may be provided between the vessel 20b and the vessel 20c, and a group of rollers 41de may be provided between the vessel 20d and vessel 20e. Of course, the support mechanism 40 may comprise any two or more groups of support rollers among the groups of support rollers 41ab, 41bc, 41cd, 41de, and 41ef.

Second Modified Example

In the second embodiment, a case where the bottom surface of the trough 126 of the vessel 120 is inclined, i.e., a case where the bottom surfaces of the troughs of all of the vessels 120a-120f is inclined, was explained. However, the present invention is not limited thereto. It is sufficient that the bottom surface of the trough of any one or more of the vessels is inclined.

Third Modified Example

The support mechanism 40 and the conveyor mechanism 50 may be integrally configured in the first to third embodiments. That is, the support mechanism 40 may have the function of the conveyor mechanism 50.

Figure 7:
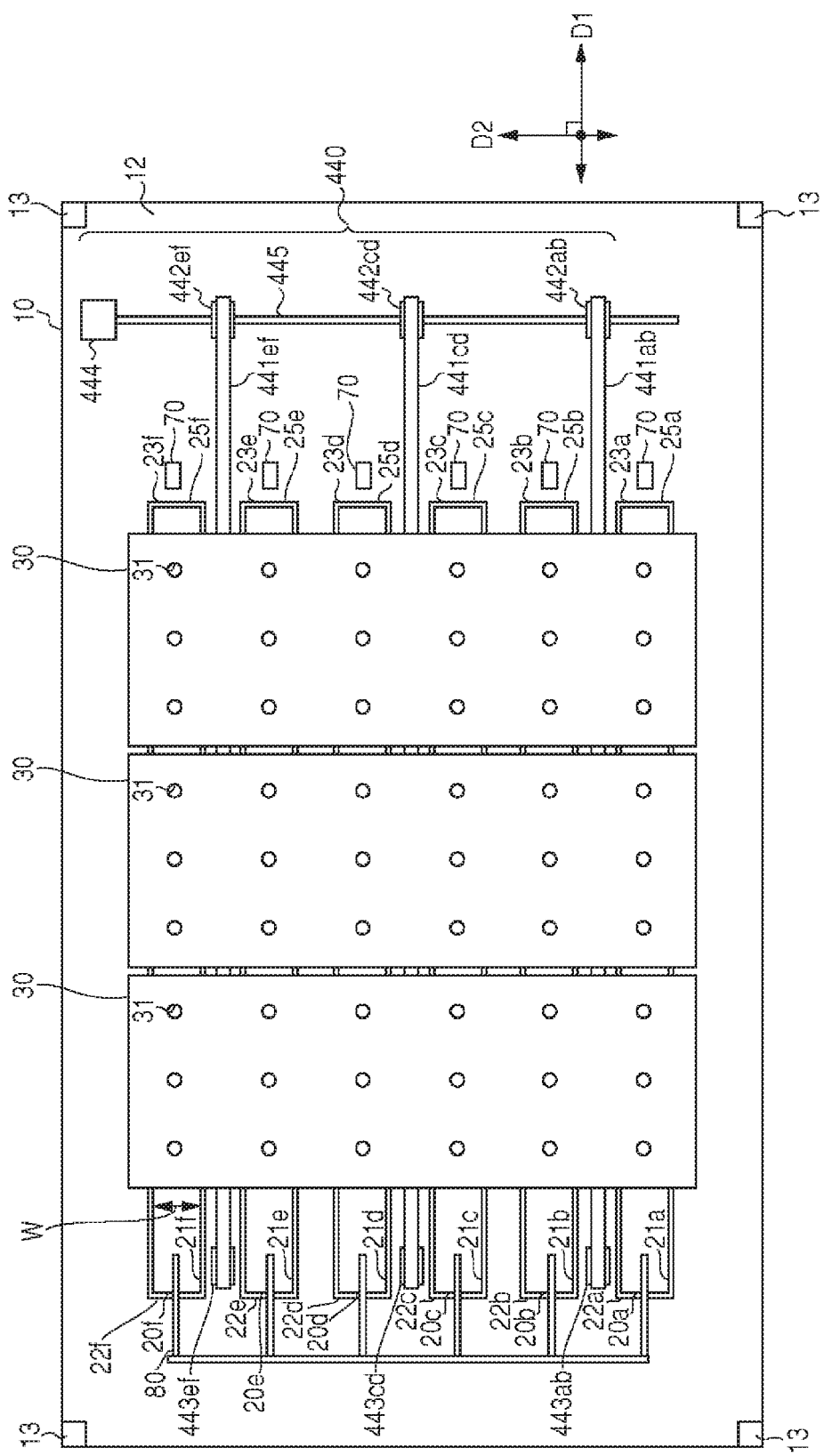
FIG. 7 is a top view showing a hydroponic cultivation system according to a fourth modified example.

FIG. 7 is a top view showing a hydroponic cultivation system 500 according to a fifth modified example. The hydroponic cultivation system 500 comprises a support mechanism 440. Further, the support mechanism 440 has a function as a conveyor mechanism as discussed below. Thus, the hydroponic cultivation system 500 does not have a conveyor mechanism 50 as in the first to third embodiments.

The support mechanism 440 has looped support belts 441ab, 441cd, and 441ef, driving pulley 442ab, 442cd, and 442ef, and slave pulleys 443ab, 443cd, and 443ef, a motor 444, and a shaft 445.

The support belts 441ab-441ef are suspended across between the driving pulleys 442ab-442ef and the slave pulleys 443ab-443ef, respectively. The plant holding plate 30 is supported by the support belts 441ab-441ef. The motor 444 rotates the driving pulleys 442ab-442ef via the shaft 445. The support belts 441ab-441ef move in a circular motion by the rotation of the driving pulleys 442ab-442ef, resulting in the plant holding plate 30 moving in the D1 direction. The support mechanism 440 may have a pulley that guides while applying tension to the center portion of the belt.

The present modified form can achieve the same working effect as the first to third embodiments. In addition, the hydroponic cultivation system 500 of the present modified form does not have a conveyor mechanism 50. Thus, the width in the D2 direction thereof can be narrowed. That is, the space required for the hydroponic cultivation system 500 can be reduced.

Fourth Modified Example

In the third embodiment, the harvest packaging unit 392 may be configured to be movable. For instance, the harvest packaging unit 392 may be disposed on a predetermined rail, along which the harvest packaging unit 392 is moved. Further, for example, each apparatus of the harvest packaging unit 392 may have a tire to allow the apparatus to freely move with the tire. When a hydroponic cultivation system comprises a plurality of cultivation units 390, the harvest packaging unit 392 configured to be movable in this manner can perform harvesting and packaging of the plurality of cultivation units 390. Thus, the number of required harvest packaging units 392 can be kept low thereby to keep the facility cost of the hydroponic cultivation system low.

Another Modified Example

The space between two adjacent vessels can be effectively utilized in various manners. For instance, a mechanism for receiving a culture solution overflowing from a vessel and returning the solution back into circulation may be provided between vessels. Further, a mechanism for preventing plant holding plates from running onto one another may be provided. Furthermore, the presence of a space between vessels facilitates maintenance of the vessels.

(Artificial Medium)

Figure 8:
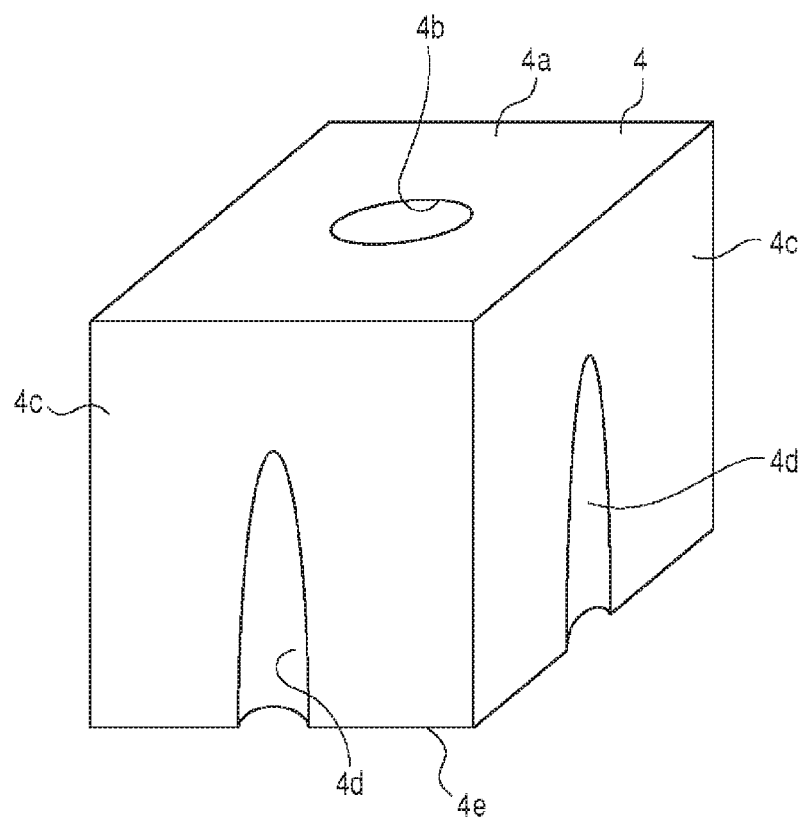
FIG. 8 is a perspective view showing an artificial medium prior to being fitted into a through hole of a plant holding plate.
Figure 9C:
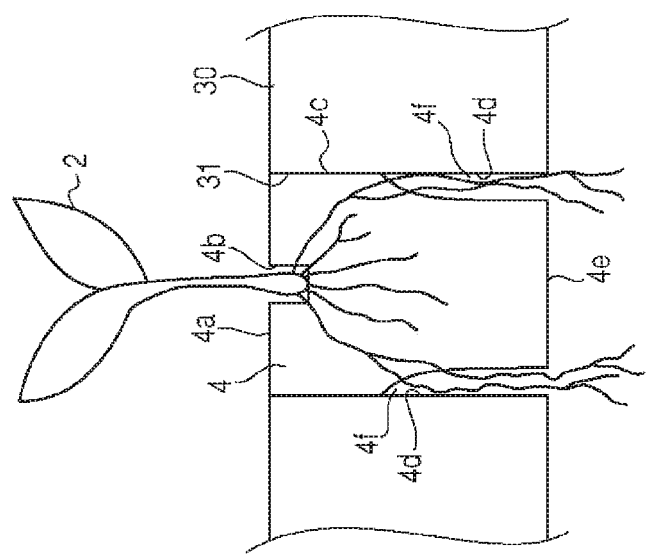
FIGS. 9(a)-(c) are expanded views expanded to show the vicinity of an artificial medium fitted into a through hole of a plant holding plate.
Figure 9B:
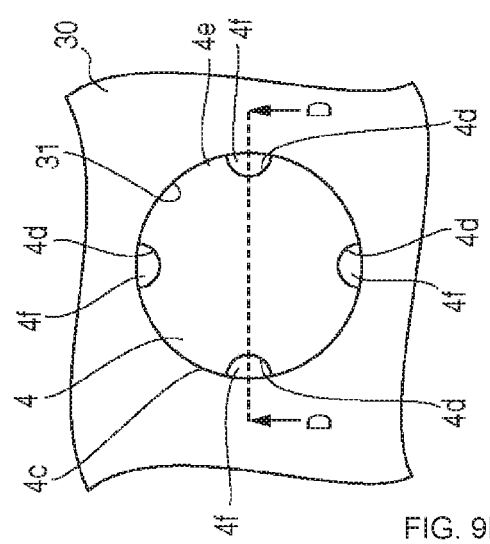
Figure 9A:
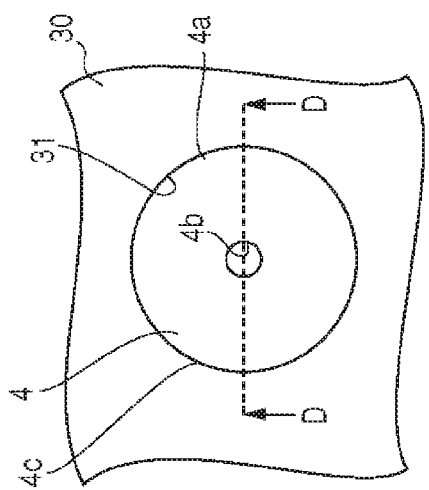

The artificial medium 4 is also referred to as a cultivation bed. The artificial medium 4 may have a plant holding portion for holding the plant 2 and may be any member that can be fixed to the through hole 31 of the plant holding plate 30. Typically, the artificial medium 4 can be a vegetable fiber processed good prepared by processing and solidifying palm or coconut fiber or a sponge formed from urethane. However, an artificial medium formed with a fibrous material tend to collapse, e.g., peel along a fiber, and is difficult to handle. Thus, a sponge formed from urethane is especially preferable in the present invention. FIG. 8 is a perspective view showing the artificial medium 4 prior to being fitted into the through hole 31 of the plant holding plate 30. In one embodiment, the artificial medium 4 has a quadrangular column shape prior to being fitted into the through hole 31 as shown in FIG. 8. The artificial medium 4 is elastically deformed to have a shape corresponding to the through hole 31 when fitted into the through hole 31. FIGS. 9(a)-(c) are expanded views expanded to show the vicinity of the artificial medium 4 fitted into the through hole 31 of the plant holding plate 30. FIG. 9(a) shows a diagram viewed from above. FIG. 9(b) shows a diagram viewed from below. FIG. 9(c) shows a cross-sectional view along the D-D line in FIGS. (a) and (b). FIGS. 9(a) and (b) show the configuration of the artificial medium 4. Thus, display of the plant 2 held thereby is omitted. The artificial medium 4 of the present invention is elastically deformed into an approximately cylindrical shape in the examples shown in FIGS. 9(a)-(c). The artificial medium 4 may have a cylindrical shape, polygonal column shape, or any other shape prior to being fitted into the through hole 31.

The artificial medium 4 has a first concave section 4b formed on a top surface 4a and four second concave sections 4d formed on a side surface 4c. The first concave section 4b houses at least a portion of the plant 2, such as a portion of a stem or a portion of a root. Thus, the first concave section 4b may be formed in a shape and size matching a stem or root to be housed. In the present embodiment, the first concave section 4b is formed into an approximately cylindrical shape. The plant 2 is held by the first concave section 4b.

One second concave section 4d is formed on each of the 4 side surfaces 4c of the quadrangular column shaped artificial medium 4. In particular, the second concave section 4d is formed by creating a notch on a portion of each side surface 4c. The side surface 4c has an approximately cylindrical shape when the artificial medium 4 is fitted into the through hole 31. The four second concave sections 4d are aligned at equidistance in the circumference direction on the approximately cylindrical shaped side surface 4c. The four second concave sections 4d extend in the direction from the bottom surface 4e to the top surface 4a. In this case, they extend to a position below the first concave section 4b.

When the artificial medium is fitted into the through hole 31, a non-through hole 4f is formed by the second concave section 4d and an inner wall 31a of the though hole 31. The second concave section 4d may extend from the bottom surface 4e to the top surface 4a. In this case, the second concave section 4d and the inner wall 31a form a through hole. The depth of the second concave section 4d may be determined such that the non-through hole 4f has a desired size while considering that the artificial medium 4 elastically deforms when fitted into the through hole 31.

The artificial medium 4 with such a configuration, when fitted into the through hole 31 of the plant holding plate 30, forms the non-through hole 4f with the plant holding plate 30. For this reason, once the root of the plant 2 reaches the non-through hole 4f, the root of the plant 2 readily grows from this point onward. Further, the artificial medium 4 is formed with a sponge in a preferred embodiment of the present invention. Thus, the root tries to extend uniformly in the artificial medium 4. In other words, the root tries to extend to spread from the first concave section 4b toward the side surface 4c. Thus, the root extends in a relatively spread out manner and readily extends in the artificial medium 4 according to the present embodiment. In addition, since the artificial medium 4 is formed with a sponge, the artificial medium 4 is less prone to collapsing compared with an artificial medium formed with a fibrous material such as rock wool.

For example, two, three or more second concave sections 4d may be provided on each side surface 4c of the artificial medium 4.

Figure 10C:
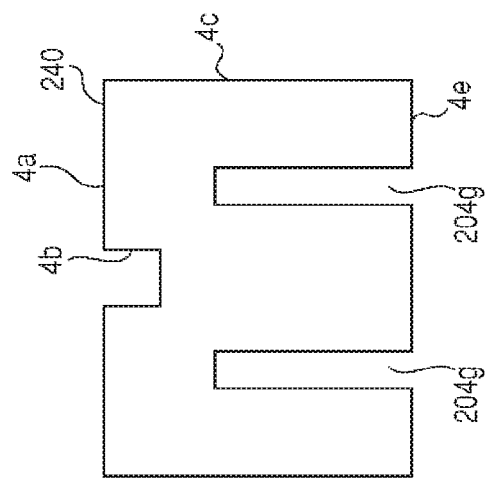
FIGS. 10(a)-(c) are drawings showing a modified example of the artificial medium.
Figure 10B:
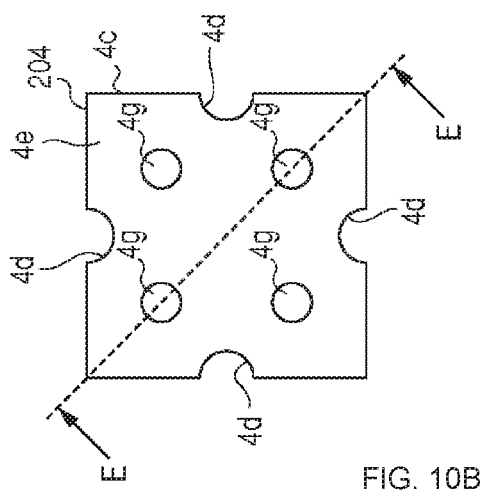
Figure 10A:
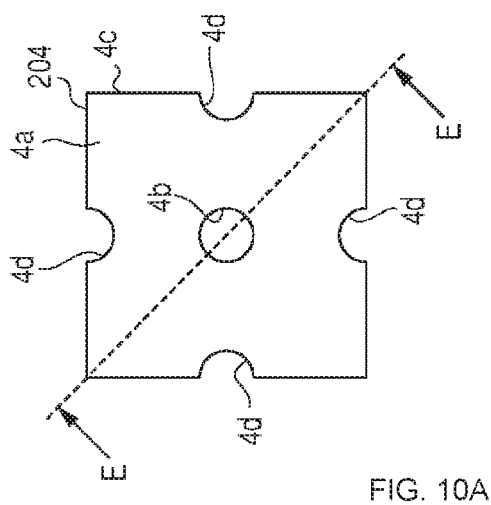

FIGS. 10(a)-(c) show a modified example of an artificial medium. FIGS. (a)-(c) show an artificial medium 204 prior to being fitted into the through hole 31 of the plant holding plate 30. FIG. 10(a) shows a drawing viewed from above, FIG. 10(b) shows a diagram viewed from below, and FIG. 10(c) shows a cross-sectional view along the E-E line of FIGS. 10(a) and 10(b). The artificial medium 204 has a first concave section 4b and a second concave section 4d as in the artificial medium 4 in the first and second embodiments. In addition, the artificial medium 204 has a hole 204g. The hole 204g extends in the direction from the bottom surface 4e to the top surface 4e. The hole 204g may extend in the direction orthogonal to the bottom surface 4e or a direction tilted at a predetermined angle with respect to the bottom surface 4e. Further, the hole 204g may be a through hole or a non-through hole.

The present modified example can achieve a working effect similar to the artificial medium 4 shown in FIGS. 8 and 9. In addition, the artificial medium 204 facilitates growth of the root for having the hole 204g in the present modified example. The present modified example has explained a case where a hole 4g is provided in addition to the second concave section 4d. However, the hole 4g may be provided instead of the second concave section 4d.

(Plant Holding Plate)

The plant holding plate 30 is a plate-like member comprising the through hole 31. The artificial medium (cultivation bed) 4 comprising the plant 2 is inserted into and held by the through hole 31. The plant holding plate 30 may be supported above the vessels 20 and composed of any material to which the through hole 31 for holding the plant 2 can be made. The plant holding plate 30 may be formed with any material, including metal, wood, foamed resin and the like. In a preferred embodiment, the plant holding plate 30 of the present invention is formed with expanded polystyrene foam. The thickness of the plant holding plate 30 may be determined in accordance with the material or the weight of the plant 2 to be held.

The plant holding plate 30 is disposed above the vessels 20 and supported by the support mechanism 40. In particular, the plant holding plate 30 is disposed above the vessel 20a to vessel 20f to span across the vessels. The plant holding plate 30 has a plurality of through holes 31 that penetrate through from one of the main surfaces to the other main surface. The through hole 31 is formed to be positioned perpendicularly above the accommodation trough 21 when the plant holding plate 30 is disposed above the vessels 20. In particular, the through hole 31 is formed on each of the accommodation troughs 21a-21f to align in one row in the D1 direction. In the example shown in FIG. 1, 6 rows of through holes 31 are formed in the D1 direction to match the 6 accommodation troughs, accommodation troughs 21a-21f.

Each through hole 31 may have any shape that can receive and hold the artificial medium 4 comprising the plant 2 inside thereof. For example, the through hole may have a cylindrical shape, quadrangular column shape, polygonal column shape or any other shape. FIG. 1 shows a circular through hole 31 as a representative embodiment. The artificial medium 4 in which the plant 2 is planted is fitted into each through hole 31. It is not necessary that each through hole 31 and the artificial medium 4 are fitted such that the entirety thereof is completely in contact. Any form of fit may be used, which can accomplish the objective of holding the plant 2 at a suitable location. Thus, the through hole 31 functions as a holding section for holding the plant 2 via the artificial medium 4. For example, a net may be fitted into the through hole 31 instead of the artificial medium 4 to hold the plant 2. The leaves of the plant 2 protrude out toward the top side of the plant holding plate 30. The root of the plant 2 protrudes out below the plant holding plate 30 and contacts the culture solution 3.

(Multi-Row Cultivation System)

A technique for improving the yield of agricultural products such as plants per unit area using limited farmland has been desired. Multi-row cultivation shelves are known as one such technique. As disclosed above, the hydroponic cultivation system of the present invention is light weight. Thus, the system is advantageous in application to multi-row cultivation shelves.

However, conventional multi-row cultivation shelves including techniques described in Japanese Laid-Open Publication No. 2012-217392 irradiate light only from lighting provided on the top side of each row. For this reason, conventional multi-row cultivation shelves had problems of light irradiation onto cultivated agricultural products being insufficient. To solve this problem, light should be irradiated from multiple directions. However, light irradiation from multiple directions in multi-row cultivation shelves was considered difficult.

In this regard, the inventors have developed a plant holding plate 35, which is a modified example of the plant holding plate 30, in the hydroponic cultivation system of the present invention. In addition to the through hole 31, the plant holding plate 35 shown in FIG. 11 comprises a light permeation region 28 independently of the through hole 31. The plant holding plate of the modified example may be used not only in the hydroponic cultivation system shown in FIGS. 1-6, but also as a floating plate in conventional hydroponic cultivation systems. That is, the plant holding plate 35 may be formed as a floating plate with a material that floats on water. Expanded polystyrene foam can be suitably used as a material for such a plant holding plate 35. The thickness of the plant holding plate 35 may be determined depending on the material or the weight of agricultural product 22 to be held. The plant holding plate 35 may have any shape, which may be determined in accordance with the hydroponic cultivation system in which the plant holding plate 35 is used.

Figure 13:
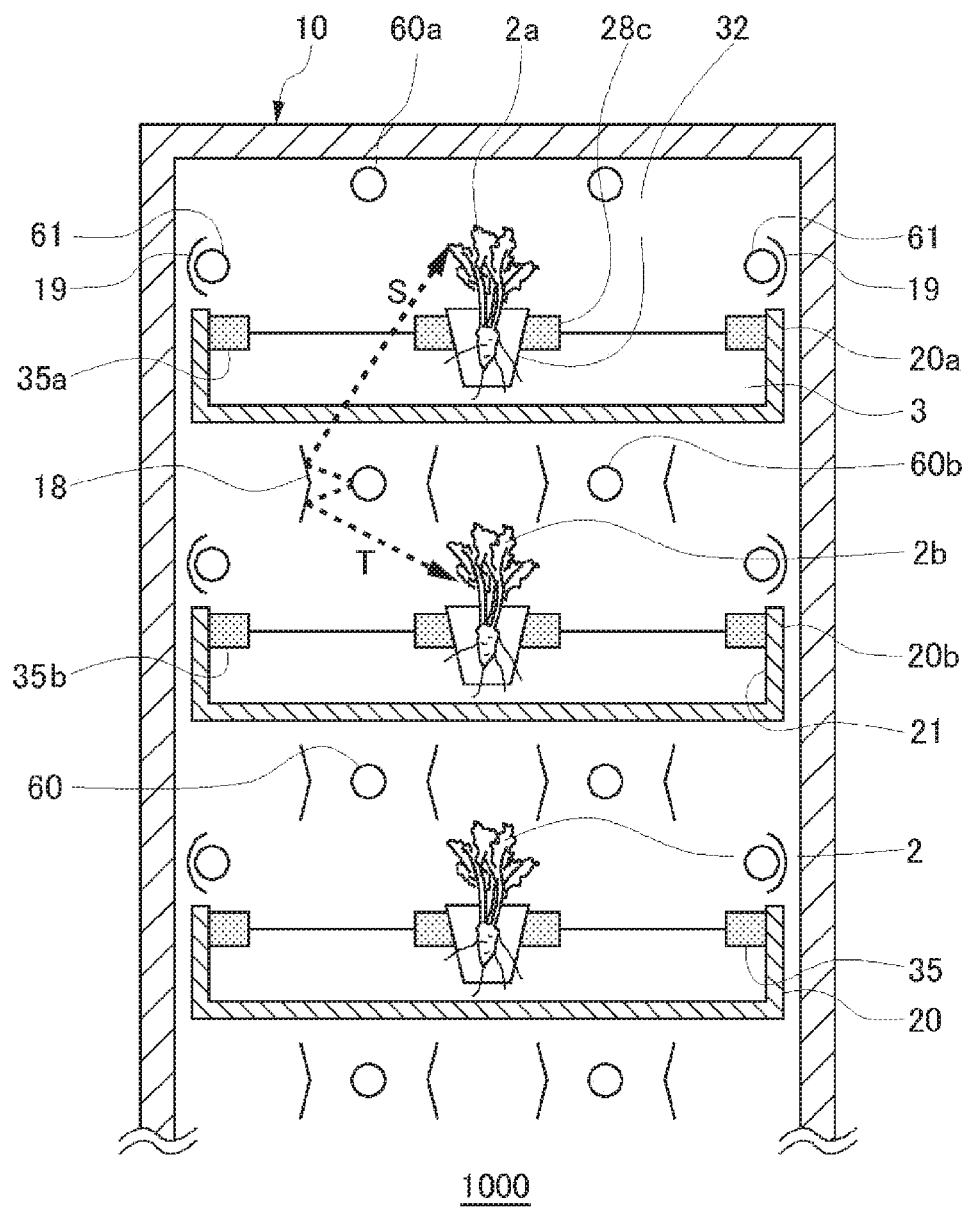
FIG. 13 is a side view showing the multi-row culture system 1000.

The through hole 31 is formed to penetrate from one of the main surfaces of the plant holding plate 35 to the other main surface to hold the plant 2. It is preferable that a plurality of through holes 31 are formed on the plant holding plate 35. FIG. 13 is used hereinafter to disclose how the plant 2 is held by the through hole 31.

The light permeation region 28 is also formed from one of the main surfaces of the plant holding plate 35 to the other main surface to allow light to pass through. The light permeation region 28 is provided adjacent the through hole 31 such that light is irradiated onto the plant 2, when the plant 2 is held, from at least the bottom side of the plant holding plate 35 even if the plant 2 grows. The light permeation region 28 preferably accounts for about 30% or more, and more preferably about 50% or more, of the surface area on both main surfaces of the plant holding plate 35. "About" herein refers to a value in the range of: the number subsequent thereto ±10%. When the light permeation region 28 is less than about 30%, the amount of light irradiated onto the plant 2 may not be sufficient. Meanwhile, light irradiation efficiency can be significantly enhanced by having the light permeation region 28 to be about 50% or more. The surface area of the light permeation region 28 may account for, for example, about 80% as long as the overall strength of the plant holding plate 35 is not compromised. The light permeation region 28 may be formed in any shape with any material as long as light irradiated from a light irradiation source can be at least partially passed through. In the embodiment shown in FIG. 11, the light permeation region 28 is a through hole. However, the light permeation region 28 can be formed as a non-penetrated transparent window made of glass or resin.

A plurality of light permeation regions 28 may be referred to as a light permeation region 28*a*, light permeation region 28*b*, and light permeation region 28*c* in accordance with the respective shape or position. The light permeation region 28*a* is provided between adjacent holding sections 26 in the longitudinal direction of the plant holding plate 35. The light permeation region 28*b* is provided between two holding sections 26 in the vicinity of a corner of the plant holding plate 35 in the transverse direction of the plant holding plate 35. The light permeation region 28*c* is provided between two holding sections 26 in a region other than the periphery of a corner in the plant holding plate 35.

Figure 11:
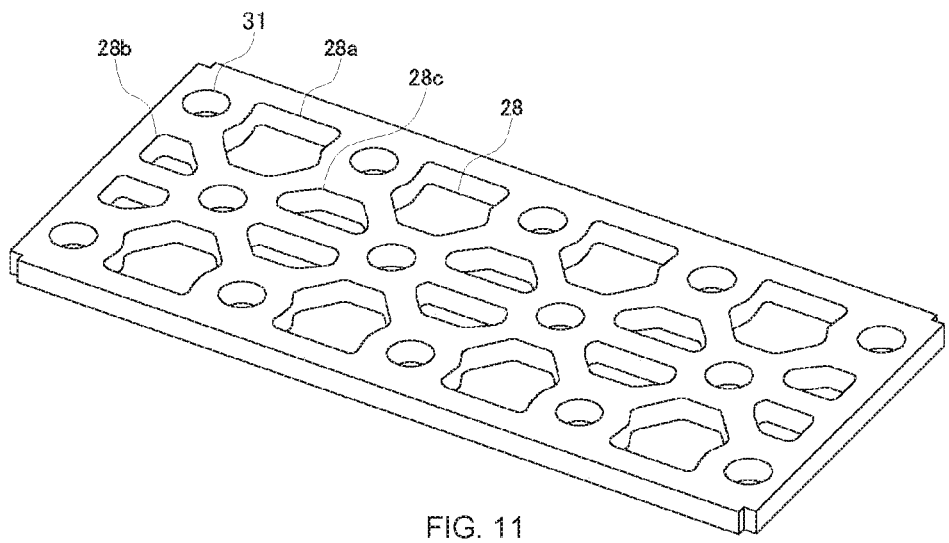
FIG. 11 is a schematic view showing a modified example of a plant holding plate 30.

The plant holding plate 35 shown in FIG. 11 can be used to allow light to be efficiently irradiated onto the plant 2 from multiple directions. As a result, the level of growth of plants can be improved to enhance productivity.

Figure 12:
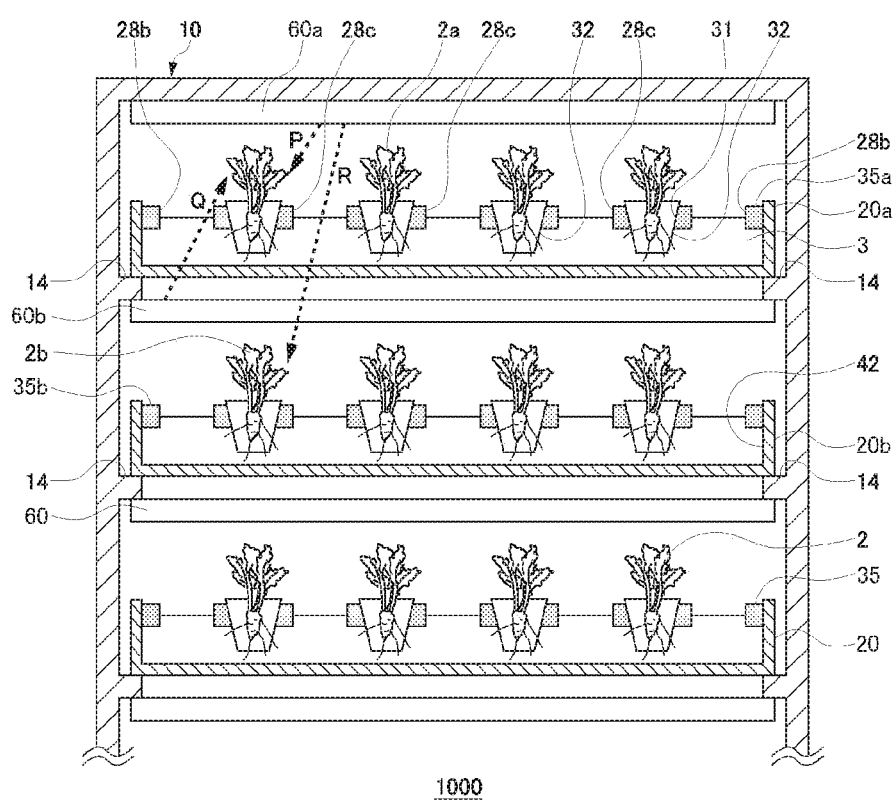
FIG. 12 is a front view showing a multi-row culture system 1000.

In this regard, FIGS. 12 and 13 are used to explain a culture system 1000 using the plant holding plate 35. FIG. 12 is a front view showing a culture system 1000 using the plant holding plate 35 according to the embodiment. FIG. 13 is a side view showing the culture system 1000 using the plant holding plate 35. In FIG. 12, illustration of an irradiation section 61 and reflector plates 18 and 19 is omitted.

The culture system 1000 mainly comprises the plant holding plate 35, frame body 10, and irradiation section 60.

The frame body 10 is formed by arranging a plurality of vessels 20 in a vertical direction at a predetermined interval. The vessels 20 have a trough shaped accommodation trough 21 for accommodating the culture solution 3. Unlike the hydroponic cultivation systems 100-300, the hydroponic cultivation system 1000 is provided with a plurality of convex portions 14 on each opposing inside wall surface of the frame body 10. Both ends of the vessels 20 are placed on the convex sections 14 provided at the same height to fix each of the plurality of vessels 20 to the frame body 10. Further, a columnar irradiation section 16 is provided between a pair of vessels 20 adjacent in the vertical direction. A frame body is not provided for the irradiation section 16 in the present embodiment in order to be able to irradiate light in the top and bottom directions. However, a frame body may be provided. When a frame body is provided to the irradiation section 60, it is preferable that the frame body thereof is formed to be transparent or semi-transparent such that light passes through. Each end of the irradiation section 60 is fixed under the convex section 14, whereby the vessels 20 and the irradiation section 60 are parallel. Only the top three rows of cultivation shelves are shown herein. However, the hydroponic cultivation system 1000 may be a system comprising any number of rows of cultivation shelves of 4 or more.

FIGS. 12 and 13 are used again to explain the relationship between the vessels 20 and the plant holding plate 35 of the culture system 1000. The accommodation trough 21 of the vessel 20 houses the culture solution 3 and the plant holding plate 35. The plant holding plate 35 holds the plant 2 while the plant 2 is housed in a cup 32. The cup 32 stably holds the plant 2, regardless of the growth stage, while the plant 2 is in a state where the through hole 31 is penetrated. The cup 32 may be the aforementioned artificial medium 4 or the artificial medium 4 may be fitted into the cup 32. The leaves of the plant 2 are mainly fixed while protruding out upward from one of the main surfaces of the plant holding plate 35. Meanwhile, the root of the plant 2 protrudes out below the other main surface of the plant holding plate 35 and contacts the culture solution 3. A hole is opened on the cup 32 to allow the culture solution 3 to enter inside the cup 32 to contact the root of the plant 2 and to allow light to irradiate the root. The root of the plant 2 can also penetrate the hole opened on the cup 32 and grow out from the cup 32. A hole as large as possible is desirable as long as the plant 2 can be held. The cup 32 may be integrally formed with the plant holding plate 35. Further, the artificial medium 4 such as a sponge may be provided inside the cup 32.

Next, the light irradiation to the plant 2 held by the plant holding plate 35 is explained. Explanation is provided herein while appending "a" and "b" to the plant holding plate 35, plant 2, vessel 20, and irradiation section 60 of the top row and middle row, respectively, of the three row structure shown in FIGS. 12 and 13.

At least the bottom surface of the vessel 20*a* on the top row is light permeable for the pair of vessels 20*a* and 20*b*, preferably semi-transparent or transparent, and more preferably transparent. In this case, light irradiated from the irradiation section 60*a* provided on the top side of the vessel 20*a* of the top row is mainly irradiated onto the closest plant 2*a* (dotted line P in FIG. 12) when the plant holding plate 35*a* holding the plant 2*a* to be cultured and culture solution 3 are housed in the vessel 20*a* on the top row. In addition, light irradiated from the irradiation section 60*b* provided between the vessel 20*a* and the vessel 20*b* irradiates not only plant 2*b*, but also plant 2*a* by passing through the light permeation region 28*b* (dotted line Q in FIG. 12). Light from the bottom side is mainly irradiated onto the back side of the leaves. In addition, light from the bottom side is also irradiated onto the root of the plant 2. Furthermore, light irradiated from the irradiation section 60*a* provided on the top row passes through the light permeation region 28*c* and is irradiated onto the plant 2*b* held by the plant holding plate 35*b* on the bottom row (dotted line R in FIG. 12). The side surface, in addition to the bottom surface, of the vessel 20 is preferably light permeable, more preferably semi-transparent or transparent, and most preferably transparent to allow light from the irradiation section 60 provided at various positions to be irradiated. In a particularly preferred embodiment, all of the vessels 20 are transparent. It is preferable to use a material such as glass or polycarbonate when forming the vessel 20 to be transparent. Further, it is preferable that the cup 32 is also formed transparent to enhance light irradiation efficiency on the root of the plant 2*a*.

Further, as shown in FIG. 13, the reflector plate 18 is provided in the vicinity of the irradiation section 60*b* in the horizontal direction. The reflector plate 18 changes the direction of progression of light released from the irradiation section 60 toward the direction of the plant 2 as shown by the dotted lines S and T. Light is thereby irradiated onto at least one of the plant 2*a* held by the plant holding plate 35*a* housed in the vessel 20*a* on the top row or the plant 2*b* held by the plant holding plate 35*b* housed in the vessel 20*b* in the bottom row.

Furthermore, an irradiation section 61 is provided in the vicinity of both ends of the vessel 20. The irradiation section 61 irradiates light onto the plant 2 from the side surface. The irradiation section 61 is provided with the reflector plate 19 with a curved cross-section. The reflector plate 19 reflects light dispersed outside of the hydroponic cultivation system 1000 to irradiate the plant 2.

In view of the above, the plant holding plate 35 of the present embodiment can be used to carry out multi-row culture to efficiently irradiate light on the cultured plant 2 from multiple directions. As a result, the level of growth of the plant 2 is improved to enhance productivity.

Further, the ratio of light permeation region 28 accounting for the surface area of the plant holding plate 35 at or above a predetermined value enables light irradiation efficiency to be further improved. Further, processability and efficiency of load in/load out of the plant holding plate 35 can be improved by forming the plant holding plate 35 with a material that floats on water.

Further, light can be efficiently irradiated onto the cultured plant 2 from multiple directions by constructing the culture system 1000 with the plant holding plate 35 of the present embodiment. In particular, light can be irradiated onto not only the front side of the leaves of the plant 2, but also the back side and the root. As a result, the level of growth of plant 2 is improved to enhance productivity. In fact, the inventors have confirmed that growth of the plant 2 is significantly improved by irradiating light onto not only the front side of the leaves of the plant 2, but also the back side and the root by using the culture system 1000. In addition, light irradiation efficiency can be further improved by using the reflector 18 to reflect light irradiated from the irradiation section 60.

The plant holding plate 35 is formed with a material that floats on water in the present embodiment. However, the plant holding plate 35 may be formed with a material that does not float on water. In this case, the objective of the present invention can also be accomplished by using, for example, a transparent glass or resin, mesh or the like to allow light to pass through the plant holding plate 35 itself. The light irradiation efficiency onto the plant 2 can be improved thereby.

Further, the plant 2 may be floated on water by forming the cup 32 that floats on water by using a material that floats on water such as expanded polystyrene foam. In this case, it is preferable to provide the light permeation region 28 in the cup 32. In this case, the cup 32 may be formed into a hat shape as a whole, for example, by providing a flange section where the light permeation region 28 is provided on the outer circumference of the opening.

Further, the present embodiment shows a case where one plant holding plate 35 is housed for each vessel 20 in each row. However, a plurality of plant holding plates 35 may be housed. In this case, light may be efficiently irradiated onto the plant 2 by at least one of: preparing a plurality of plant holding plates 35 with different light permeation region 28 and through hole 31 positioning; changing the positioning of the irradiation section 60; and changing the positioning or shape of the reflector plate 18. Furthermore, the plant holding plate 35 may be disposed above the plurality of vessels 20 extending in a predetermined direction as in the aforementioned hydroponic cultivation systems 100-300. In this configuration, light can pass through between two adjacent vessels and the configuration of the plant holding plate 35, irradiation sections 60 and 61 and reflector plate 18 as described above can be combined. Thus, a large amount of light would be irradiated onto the plant 2 from a very large number of directions.

As was disclosed above, another embodiment of the present invention is a multi-row culture system. The culture system comprises the aforementioned plant holding plate, culture shelves in which a plurality of vessels having a concave section for accommodating a culture solution are arranged in the vertical direction, and an irradiation section provided between a pair of vessels adjacent in the vertical direction. For the pair of vessels, at least a portion of the bottom surface of the vessel of at least the top row is transparent. Light may pass through a light permeation region and the vessel on the top row to irradiate a plant held by a plant holding plate from an irradiation section when the plant holding plate holding the cultured plant and culture solution are housed in the culture vessel on the top row. Light can be efficiently irradiated onto the culture plant from multiple directions by using the plant holding plate of the present embodiment to carry out multi-row culture.

Further, a reflector plate may further be provided in a culture system in order to change the direction of progression of light released from the irradiation section toward the direction of the plant in the vicinity of the irradiation section. This embodiment can further improve light irradiation efficiency by irradiating scattered light to at least one of a plant held by a plant holding plate housed in a culture vessel on the top row or a plant held by a plant holding plate housed in a vessel of the bottom row. As a result, the level of growth of plants can be improved to enhance productivity.

(Load in/Load Out System)

The multi-row cultivate shelves such as those described above had problems in that more labor was required for load in/load out as the number or rows increased and the shelves become higher. For example, the technique of Japanese Laid-Open Publication No. 2012-217392 loads in/loads out a plant to a cultivation shelf manually. Further, it was necessary to secure a work space that is the same or larger than the ground area of a cultivation shelf around the cultivation shelves. For this reason, the yield per unit area had room for improvement.

Thus, the present invention provides a technique that facilitates loading a plant into/out of a multi-row culture system.

A culture system of a certain embodiment of the present invention comprises cultivation shelves in which a plurality of vessels for accommodating a culture solution are provided in parallel in the vertical direction and a load-in apparatus for loading into at least one of a plurality of vessels a plant holding plate for holding a plant which is contacted with a culture solution and cultured when housed in an accommodation trough and disposed in the vicinity of one end of the cultivation shelves. The load-in apparatus comprises a vertical conveyor mechanism for lifting up a plant holding plate to the height where the plant holding plate should be disposed in each cultivation shelf and a horizontal conveyor mechanism for pushing at least one plant holding plate in a plurality of plant holding plates housed in a vessel where the plant holding plates should be housed from the side of one of the ends in an approximately horizontal direction to have the plurality of plant holding plates abutted and slide to the other end on the opposite side from the one end.

A plant holding plate can be readily loaded into a multi-row cultivation shelf with this embodiment.

Further, a culture system may further comprise a load-out apparatus for loading out from a vessel a plant holding plate slid to a positioning section provided on a vessel in the vicinity of the other end and disposed in the vicinity of the other end. In this case, a load-in apparatus and load-out apparatus may alternately load in/load out. A plant holding plate can be readily loaded in/loaded out in this embodiment. Further, in this case, a space secured may be small on side surface of a cultivation system. For this reason, more culture systems can be disposed in parallel to significantly increase the amount of production of plants per unit area.

Further, a load-in apparatus may load in one or more plant holding plates to each of the two or more cultivation shelves arranged in the vertical direction at once and a load-out apparatus may load out one or more plant holding plates from each of the two or more cultivation shelves arranged in the vertical direction at once. A plant holding plate can be more efficiently loaded into/out of a multi-row culture shelf in this embodiment.

Further, the number of cultivation shelves loaded in/out at once may be a factor of the number of rows of a plurality of cultivation shelves arranged in the vertical direction. This embodiment can load in/out a plant holding plate efficiently.

Further, the system may further comprise a load-in conveyor belt for supplying a plant holding plate holding a plant to be cultured to a load-in apparatus. This embodiment can load in a plant holding plate more efficiently.

Figure 14:
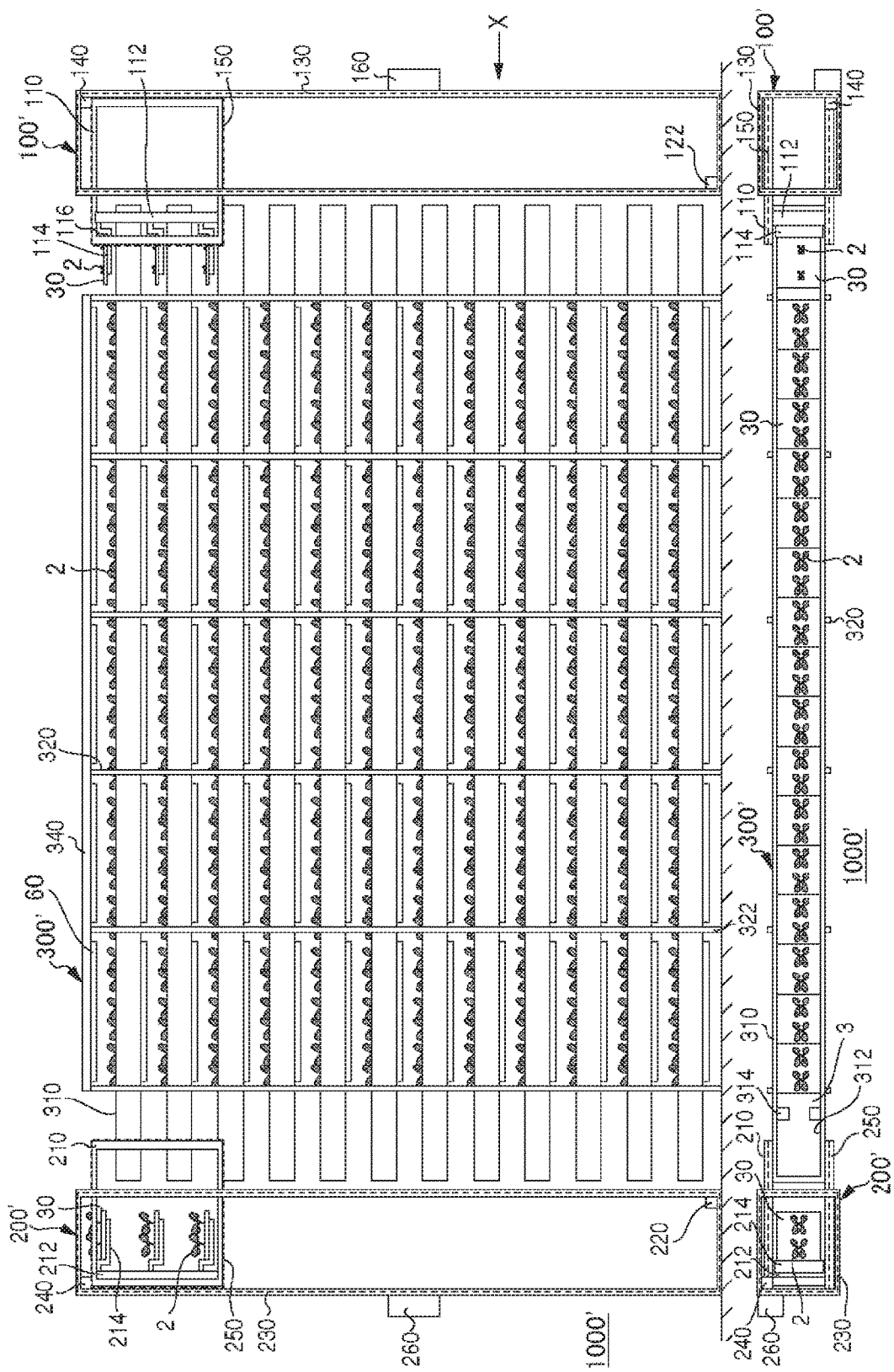
FIG. 14 is a schematic view of a culture system comprising a load in/load out mechanism of the present invention.
Figure 15:
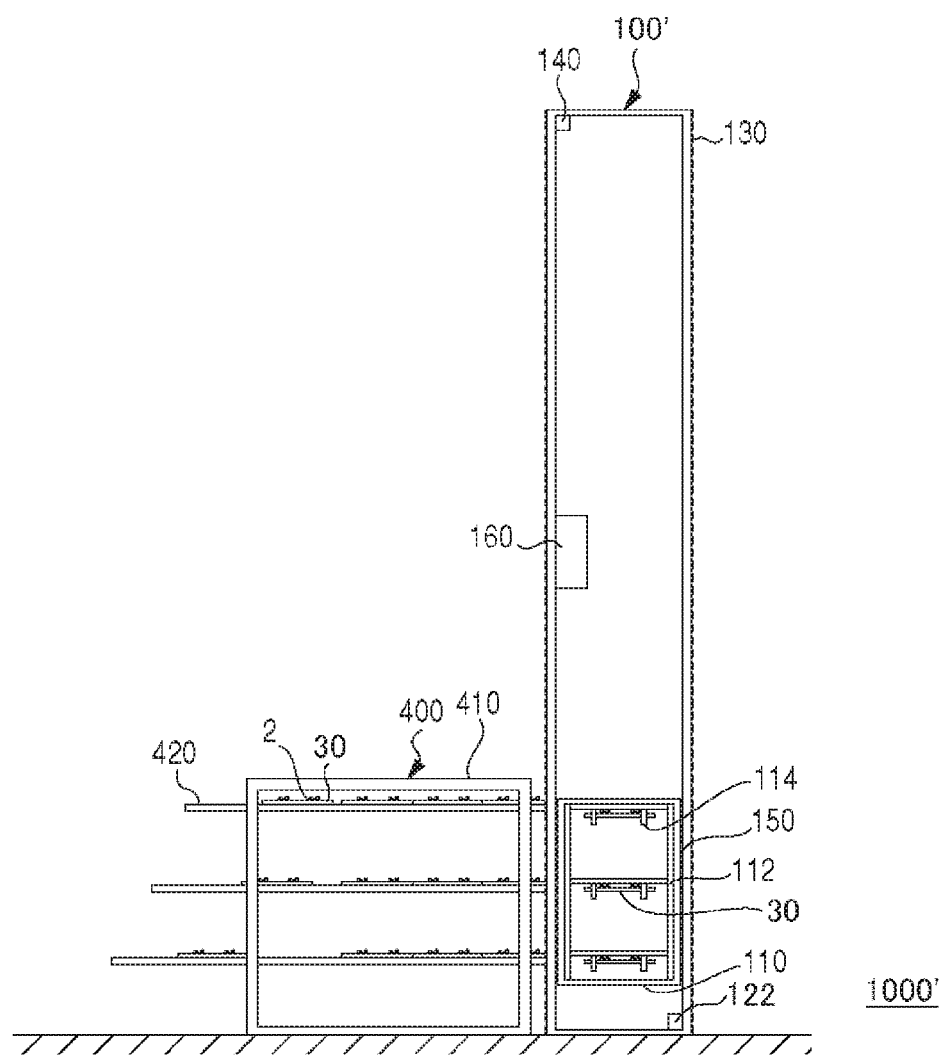
FIG. 15 is a front view of the culture system in FIG. 14 viewed from the direction of arrow X in FIG. 14.
Figure 16:
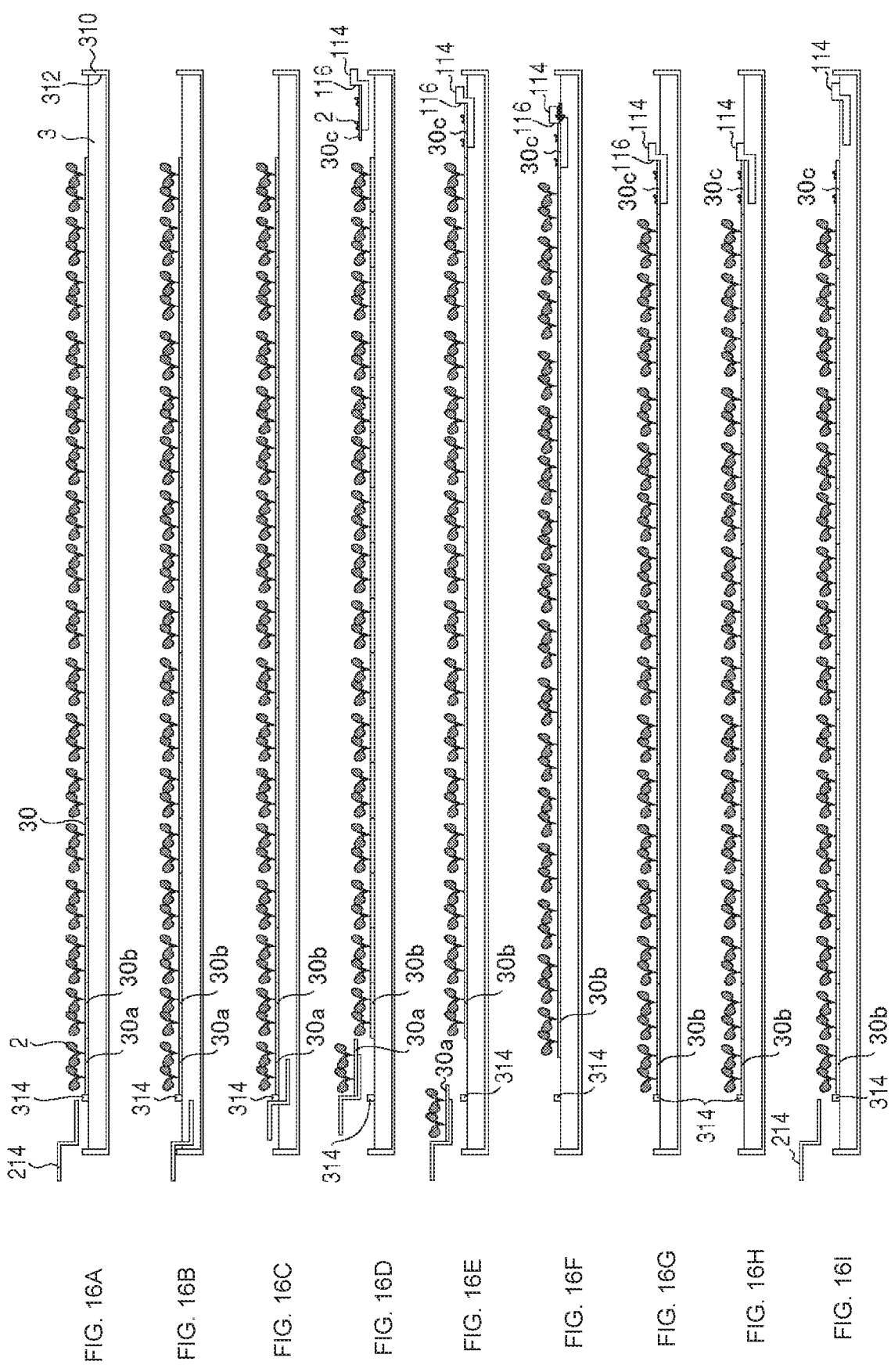
FIGS. 16(A)-(I) are schematic views from the side showing the procedure for alternately loading a plant holding plate into a culture system by the load in/load out mechanism of the present invention.

First, a culture system 1000' of the present embodiment is explained while referring to FIGS. 14-16. FIGS. 14-16 explain a load in/load out mechanism of the present invention using a multi-row hydroponic cultivation system which allows a plant holding plate to float on a culture solution. However, the load in/load out mechanism of the present invention can also be used in the above-described hydroponic cultivation systems of embodiments 1-3 supporting a plant holding plate above a vessel with a support mechanism (i.e., there is a space between a plant holding plate and a culture solution). FIG. 14 is a schematic diagram of the culture system 1000' comprising the load in/load out mechanism of the present invention. FIG. 14(A) is a side view of the culture system 1000', and FIG. 14(B) is a plan view of the culture system 1000'. FIG. 15 is a front view of the culture system 1000' in FIG. 14 viewed from the direction of arrow X in FIG. 14. FIG. 14 omits the illustration of a load-in conveyor belt 400 shown in FIG. 15. Further, FIG. 14(B) omits the illustration of top plate 340 and the irradiation section 60 provided on the back side of top plate 340 shown in FIG. 14(A). Further, FIG. 15 only shows a load-in apparatus 100' and the load-in conveyor belt 400.

The culture system 1000' mainly comprises the load-in apparatus 100', a load-out apparatus 200', a culture shelf 300', and the load-in conveyor belt 400.

The culture shelf 300' is formed while a plurality of culture vessels 310 having approximately the same shape with one another and having a trough shaped concave section 312' are provided in parallel in the vertical direction at a predetermined interval. A positioning section 314 is formed in a concave section 312'. Further, a culture solution 3 for hydroponic cultivation is housed in the concave section 312. The culture solution 3 is an aqueous solution prepared by dissolving nutrients that can grow a plant in water. A fixing member 320 fixes the arranged plurality of culture vessels 310 in the vertical direction. FIG. 14 shows a case where 12 culture vessels 310 are fixed with the fixing member 320. The fixing member 320 is fixed to the floor in a fixing section 322. The irradiation section 60 is installed on the back surface of the culture vessel 310 other than that at the bottom-most row. The irradiation section 60 irradiates light onto a plant housed in the culture vessel 310 one row lower while the culture vessels 310 are arranged in the vertical direction. Light is irradiated on the culture vessel 310 on the top-most row by the irradiation section 60 provided on the back surface of the top plate 340.

The plant holding plate 30 holds the plant 2 to be cultured as described above and is in contact with the culture solution 3 when housed in the concave section 312. The through hole 31 (not shown) for fixing the plant 2 to be cultured is opened on the plant holding plate 30. The plant 2 to be cultured is disposed to penetrate through the through hole such that the root of the plant 2 to be cultured contacts the culture solution 3 from the bottom side of the plant holding plate 30. The culture solution 3 can thereby be supplied to the plant 2 to be cultured. The plant holding plate 30 may be composed of any material that can have the through hole 31 for holding the plant 2 made inside and be housed in the concave section 312. The plant holding plate 30 may be formed from any material including metal, wood, foamed resin and the like. In embodiments where the plant holding plate 30 is floated on a culture solution, the plant holding plate 30 is preferably formed with a material with a specific gravity of less than 1 in order to have the plant holding plate 30 float on the culture solution 3 even while holding the plant 2 to be cultured. Expanded polystyrene foam can be optimally used as such a material. The material or volume of the plant holding plate 30 may be determined while considering the weight of the plant 2 to be cultured.

Further, the plant holding plate 30 may be the plant holding plate 35 having not only the through hole 31, but also the light permeation region 28.

The load-in apparatus 100' is disposed in the vicinity of one end of the culture shelf 300' and loads in the plant holding plate 30 holding the plant 2 cultured by contacting the culture solution 3 when housed in the concave section 312 into at least one of the plurality of culture vessels 310. The load-in apparatus 100 is made to have any mechanism that can convey a plant holding plate in the vertical direction to a culture vessel of interest and convey the plant holding plate horizontally when reaching the culture vessel of interest to place the plant holding plate into a concave section of the culture vessel in a multi-row hydroponic cultivation system. In the specific embodiments shown in FIGS. 14 and 15, the load-in apparatus 100' comprises a conveyor section 110, a vertical motor 122, a vertical roller chain 130, a horizontal motor 140, a horizontal roller chain 150, and a control section 160.

The conveyor section 110 has a plurality of holding sections 114 installed on the fixing section 112. As shown in FIG. 15, the holding section 114 is formed from two arms. The holding section 114 holds the plant holding plate 30 when loading in/loading out. Further, as explained in FIG. 16, the holding section 114 is provided with a pushing section 116. The pushing section 116 pushes to slide the plant holding plate 30 in the horizontal direction.

The vertical motor 112 rotates and moves the vertical roller chain 130, whereby the rotational motion of the vertical motor 122 is converted to movement of the conveyor section 110 in the vertical direction (convey up or down). The horizontal motor 140 rotates to move the horizontal roller chain 150, whereby the rotational motion of the horizontal motor 140 is converted to movement of the conveyor section 110 in the horizontal direction (left and right direction)

The control section 160 controls the rotation of the vertical motor 122 and the horizontal motor 140 to control the movement of the conveyor section 110 in the vertical direction and the horizontal direction. Further, the control section 160 communicates with a control section 260 provided in a load-out apparatus 200' discussed below through wireless or wired communication to coordinate loading in of the plant holding plate 30 by the load-in apparatus 100' and the loading out of the plant holding plate 30 by the load-out apparatus 200'. Further, the control section 160 controls the timing of loading the plant holding plate 30 into the load-in apparatus 100' from the load-in conveyor belt 400 mentioned below.

The load-out apparatus 200' may have any mechanism that can take out a plant holding plate housed in a culture vessel of interest from the culture vessel and convey the plant holding plate for harvest in a multi-row hydroponic cultivation system. In the specific embodiment shown in FIGS. 14 and 15, the load-out apparatus 200' is disposed in the vicinity of the other end and loads out, from the culture vessel 310, the plant holding plate 30 slid to the positioning section 314 provided on the culture vessel 310 in the vicinity of the other end. The load-out apparatus 200' comprises a conveyor section 210, a vertical motor 220, a vertical roller chain 230, a horizontal motor 240, a horizontal roller chain 250, and the control section 260.

The conveyor section 210 has a plurality of holding sections 214 installed on a fixing section 212. When loading out, the plant holding plate 30, on which the plant 2 after culture is placed, is held by the holding sections 214.

The vertical motor 220 rotates to move the vertical roller chain 230, whereby the rotational motion of the vertical motor 220 is converted to movement of the conveyor section 210 in the vertical direction (convey up or down). The horizontal motor 240 rotates to move the horizontal roller chain 250, whereby the rotation motion of the horizontal motor 240 is converted to the movement of the conveyor section 210 in the horizontal direction (left and right direction).

The control section 260 controls the rotation of the vertical motor 220 and the horizontal motor 240 to control the movement of the conveyor section 210 in the vertical direction and the horizontal direction. Further, the control section 260 communicates with the control section 160 provided in the load-in apparatus 100' disclosed above through wireless or wired communication to coordinate loading in of the plant holding plate 30 by the load-in apparatus 100' and the loading out of the plant holding plate 30 by the load-out apparatus 200'.

The load-in apparatus 100' and the load-out apparatus 200' were explained herein as separate apparatuses. However, they may be configured to use the same apparatus.

As shown in FIG. 15, the load-in conveyer belt 400 supplies the plant holding plate 30 holding the plant 2 to be cultured to the load-in apparatus 100'. The load-in conveyor belt 400 has a frame body 410 and a plurality of rotating beds 420. The plurality of rotating beds 420 is formed such that the height of each is approximately the same as the height of one of the plurality of holding sections 114 when the conveyor section 110 descends to the bottom. In this state, the rotating beds 420 are rotated by the control section 160 to supply a new culture equipment 20 to the holding section 114.

Next, the culture system 1000' of the present embodiment is used to explain a method of loading the plant holding plate 30 into/out of the culture vessel 310. FIG. 16 is a schematic view from the side direction showing the procedure for alternately loading the plant holding plate 30 into/out of the culture system 1000' according to the present invention. A vertical conveyor mechanism is assumed herein to be mainly composed of the conveyor section 210, vertical motor 220, and the vertical roller chain 230 and the horizontal conveyor mechanism mainly composed of the holding section 214, horizontal motor 240, and horizontal roller chain 250, respectively. However, the vertical conveyor mechanism may be the conveyor section 210 and the horizontally conveyor mechanism may be holding section 214 for simplicity. Further, explanation is provided while referring to a plant holding plate loaded out by the load-out apparatus 200' as a plant holding plate 30a, a plant holding plate adjacent to the plant holding plate 30a loaded out by the load-out apparatus 200' as a plant holding plate 30b, a plant holding plate loaded in by the load-in apparatus 100' as a plant holding plate 30c, and a plant holding plate loaded in by the load-in apparatus 100' subsequent to the plant holding plate 30c as a plant holding plate 30d.

First, the control section 260 moves the holding section 214, which is the horizontal conveyor mechanism of the load-out apparatus 200', into the culture solution 3 (FIG. 16(A)). The holding section 214 is lowered into the culture solution 3 at a position closer to the load-out apparatus 200' than to the positioning section 314. FIG. 16(B) is a diagram showing the state after the holding section 214 is moved into the culture solution. The holding section 214 is then moved horizontally toward the plant holding plate 30a (FIG. 16(C)). After the holding section 214 is moved to a position where the plant holding plate 30a can be lifted up in the vertical direction, the holding section 214 lifts up the plant holding plate 30a in the vertical direction to take out the plant holding plate 30a from the culture solution 3 (FIG. 16(D)). Further, in connection therewith, the holding section 214, which is the horizontally moving mechanism of the load-in apparatus 100', loads in the plant holding plate 30c. The load-out apparatus 200' then loads out the plant holding plate 30a that was taken out (FIG. 16(E)). The plant holding plate 30a loaded out from the culture vessel 310 is loaded out from the culture system 1000' when the conveyor section 210 is lowered to the bottom. Further the holding section 214 of the load-in apparatus 100' moves the plant holding plate 30c into the culture solution 3.

The pushing section 116 pushes and slides the plant holding plate 30c in the horizontal direction (arrow in FIG. 16(F)). The pushing section 116 pushes the plant holding plate 30c closest to the load-in apparatus 100' to push all of the plurality of plant holding plates 30 housed in a certain concave section 313 toward an approximately horizontal direction. The plant holding plates 30 housed in a single culture vessel 310 are thereby collectively abutted and slid toward the opposite side end. As a result, the plant holding plates 30 are moved together until the plant holding plate 30b closest to the load-out apparatus 200' reaches the positioning section 314 (FIG. 16(G)). A plurality of plant holding plates 30 can be readily abutted to one another and moved together by forming the plant holding plates 30 with a material with low specific gravity such as expanded polystyrene foam. After the plant holding plate 30b is moved to the positioning section 314 by the holding section 114 of the load-in apparatus 100', the holding section 114 is lowered below the water surface such that the plant holding plate 30c is floated on the culture solution 3 (FIG. 16(H)). The holding section 114 of the load-in apparatus 100' is subsequently moved horizontally toward the load-in apparatus 100' and separated from the plant holding plate 30c (FIG. 16(I)). The controller 160 then lowers the conveyor section 110 to the bottom and moves the load-in conveyor belt 400 to place the plant holding plate 30d holding the plant 2 prior to culture on the holding section 114. The plant holding plate 30d is subsequently supplied to the culture vessel 310.

The plant holding plates 30 of the culture vessel 310 can be replaced by repeating the aforementioned FIGS. 16(A)-(I). When plant holding plates 30 holding the plant 2 prior to culture are replaced with plant holding plates 30 holding the plant 2 after culture after a predetermined culture period has passed, the operations in FIGS. 16(A)-(I) may be repeated the number of times equal to the number of plant holding plates 30 housed in the culture vessel 310 to replace the plant holding plates 30.

An example of loading the plant holding plates 30 into/out of one culture vessel 310 was shown herein. However, it is preferable that a plurality of holding sections 114 and holding sections 214 installed on the load-in apparatus 100' and load-out apparatus 200', respectively, are used to load the plant holding plates 30 into/out of a plurality of culture vessels 310 at once. In this case, the culture system 1000' shown in FIGS. 14 and 15 first replaces three rows of adjacent culture vessels 310 and, after all replacement is completed, replaces the next three rows. The time required for load-in/load-out can be significantly reduced thereby.

In this case, each of the number of plant holding plates 30 loaded in/loaded out at once, the number of holding sections 114 and the number of holding sections 214 used at once is preferably a factor of the number of plurality of culture vessels 310 arranged in the vertical direction in the culture shelf 300. For example, the culture shelf 300 has 12 rows of culture vessels 310 in FIG. 14. Thus, it is preferable that the plant holding plates 30 are loaded in/loaded out for 2, 3, 4, 6, or 12 rows of culture vessels 310 at once. Load in/load out can be carried out efficiently thereby. Further, the holding sections 114 and the holding sections 214 may be built longer to load a plurality of plant holding plates 30 at once into/out of a single culture vessel 310.

Further, when the culture vessel 310 is not at full capacity of the plant holding plates 30, the plant holding plate 30 may be loaded into the culture vessel 310 by using only the load-in apparatus 100' without using the load-out apparatus 200'. Further, FIG. 16 shows a case where the plant holding plate 30 is loaded out first and then loaded in later. However, the culture system 1000' may be configured to load in the plant holding plate 30 first and then load-out later.

In view of the above, the culture system 1000' of the present embodiment can readily load the plant holding plate 30 into/out of the multi-row culture shelf 300'. Further, in this case, the space secured on the side of the culture shelf 300' may be small. For this reason, more culture system 1000' can be disposed in parallel per unit area. Thus, the amount of production of organisms per unit area can be significantly increased.

It is preferable that both the load-in apparatus 100' and the load-out apparatus 200' are provided in the culture system 1000'. However, only one of the two may be provided. In this case, a person may serve the role of the apparatus that is not provided. The plant holding plates 30 can be readily loaded into or loaded out from the multi-row culture shelf 300' thereby.

Further, in the present embodiment, the positioning section 314 is formed on the load-out apparatus 200' side of the culture vessel 310. However, the positioning section 314 may be formed on the load-in apparatus 100' side, whereby the plant holding plate 30 can be prevented to move to the load-in apparatus 100' side. Further, it is preferable in this case to form the positioning section on the load-in apparatus 100' side such that the distance from the end of the culture vessel 310 on the load-in apparatus 100' side to the positioning section on the load-in apparatus 100' side is equal to the distance from the end of the culture vessel 310 on the load-out apparatus 200' side to the positioning section 314. The culture vessel 310 can be used regardless of the orientation thereby.

Further, a load-out conveyor belt having a similar structure as the load-in conveyor belt 400 may be provided for the load-out apparatus 200'. In such a load-out conveyor belt, when installed adjacent the load-out apparatus 200', the rotating beds are rotated in the direction the plant holding plates 30 are load out. The load-out conveyor belt can thereby load out the plant holding plates 30 holding the plant 2 after culture from the load-out apparatus 200'. Further, the load-in conveyor belt 400 and a load-out conveyor belt may be provided to culture vessels to a higher row or the number of rotating beds thereof may be increased to shorten the time of the load-in apparatus 100' and load-out apparatus 200' moving up and down.

For example, when the hydroponic cultivation system of the present invention is used to cultivate plants that grow in one month, 12-fold the plants can be cultivated in a month per unit area. The culture equipment 20 is readily loaded in/loaded out as described above in the culture system 10 of the present embodiment. For this reason, 12×12=144-fold of plants can be cultivated in a year per unit area.

(Hydroponic Cultivation System Accommodating Greenhouse)

The present invention provides not only a novel hydroponic cultivation system, but also a combination of such a hydroponic cultivation system and a greenhouse for the accommodation thereof. In the present invention, a combination of a hydroponic cultivation system and a greenhouse for accommodating the system is referred to as a "plant factory". The greenhouse for accommodating the hydroponic cultivation system of the present invention is not particularly limited, but is preferably a greenhouse with a high level of thermal insulation effect. This is because there is no seasonal variation in the indoor temperature and a plant of interest can be stably cultivated and harvested throughout the year due to the high level of thermal insulating effect and no effect from the external environment.

In one embodiment, a greenhouse for accommodating the hydroponic cultivation system of the present invention is a greenhouse manufactured from foamed resin with a thermal insulation property. As used herein, "foamed resin" refers to a synthetic resin having gas dispersed therein and molded into a foam-like form. The synthetic resin in the present invention may be any synthetic resin that can be molded by foam molding, while the product of foam molding can accommodate a hydroponic cultivation system. However, the synthetic resin is preferably expanded polystyrene foam. A hydroponic cultivation system accommodating greenhouse using expanded polystyrene foam as a constituent material is resistant to damage unlike conventional vinyl greenhouses and can sufficiently withstand natural disasters such as earthquakes and typhoons. In addition, even if the greenhouse surface cracks due to an earthquake or the greenhouse surface is partially deformed from a collision with a flying object during a typhoon, such damage can be readily repaired. Compared to ordinary architectural structures and glass greenhouses, a greenhouse made of expanded polystyrene foam is less likely to collapse during a natural disaster. In addition, glass is not used for the greenhouse surface. Thus, there is no concern with regard to shattered glass flying around or dispersing within the greenhouse. Furthermore, since the wall surface is sufficiently thick, an impact imparted from the outside can be prevented to reaching the inside of the greenhouse. For this reason, an expanded polystyrene foam greenhouse would not be deformed by wind as in a vinyl greenhouse or suffer damage to the crops due to the vinyl tearing.

Since expanded polystyrene foam has excellent thermal insulation and light blocking properties, the environment for growing a plant (vegetables, fruits or the like) cultivated in a greenhouse, i.e., temperature, humidity, light irradiation time and the like, can be readily managed. Thus, plants can be stably cultivated and harvested throughout the year without being affected by external weather conditions with hydroponic cultivation. Further, expanded polystyrene foam can be readily recycled.

The hydroponic cultivation system accommodating greenhouse of the present invention comprises a room temperature adjusting means for adjusting the temperature within a greenhouse as needed. A greenhouse made of expanded polystyrene foam, which is a preferred embodiment of the present invention, has little variation in the room temperature within the greenhouse compared to other hydroponic cultivation system accommodating greenhouses (e.g., conventional vinyl greenhouse and the like) due to excellent thermal insulation and airtight properties of expanded polystyrene foam. For this reason, a large-scale room temperature adjustment within the greenhouse is unnecessary, such that cost associated with the room temperature adjusting means can be reduced.

Furthermore, a hydroponic cultivation system accommodating greenhouse can be a pre-fabricated expanded polystyrene foam greenhouse constructed by assembling a plurality of divided fragments, so that a greenhouse can be completed in a shorter construction period at a lower cost compared to building a plant factory. The hydroponic cultivation system accommodating greenhouse of the present invention may comprise equipment, such as a reflector material for reflecting light irradiated form an irradiation apparatus.

Divided fragments constituting an expanded polystyrene foam greenhouse are, for example, molded expanded polystyrene foam products with a thickness of about 10-50 cm and an expansion ratio of about 10-50 fold. For instance, when a greenhouse is to be installed in a region requiring a higher level of strength where snowfall can be up to about 80 cm, divided fragments can be made of expanded polystyrene foam with a thickness of about 20 cm and an expansion ratio of up to about 20 fold to secure strength. A thickness increases with a larger expansion ratio. Further, in regions where snowfall does not need to be considered, an expansion ratio greater than about 20 fold or a thickness of about 20 cm or less can be used. In contrast, in regions with snowfall of 1 m or less, an expansion ratio is decreased to about 20 fold or less to guarantee strength or the thickness is increased. This type of expanded polystyrene foam has an excellent light blocking property capable of cutting off light from entering from the outside. The specific shape of divided fragments of a pre-fabricated expanded polystyrene foam greenhouse and the specific method of assembly thereof are known in the art and can be appropriately selected by those skilled in the art.

In an embodiment of assembling divided fragments to construct a greenhouse, it is preferred to secure assembled divided fragments by binding means. Examples of such binding means include, but are not limited to, structures such as tie band, wire rope, piano wire, rubber, net, mortar and the like. For instance, it is preferable to wrap a tie band around a pre-fabricated greenhouse in a circumferential direction, such that divided fragments that are fastened and glued together do not disassemble. Alternatively, a flexible wire rope or a piano line can be used instead of a tie band. Furthermore, it is also possible to cover a greenhouse with a net, so that the divided fragments do not fall apart. Thus, any of them can function as binding means of divided fragments.

Figure 17:
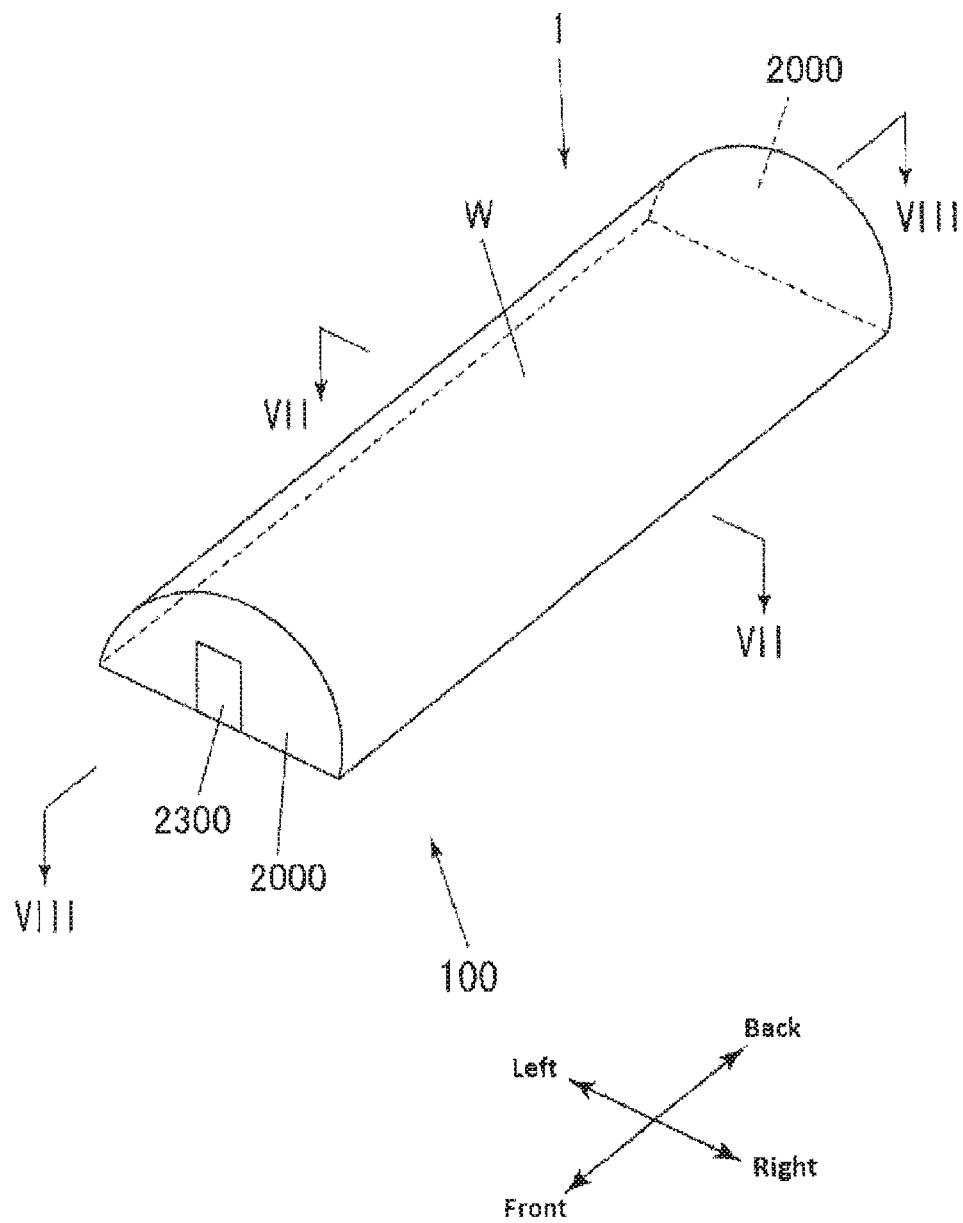
FIG. 17 is a perspective view showing the outer appearance of a hydroponic cultivation system accommodating greenhouse 1.
Figure 18:
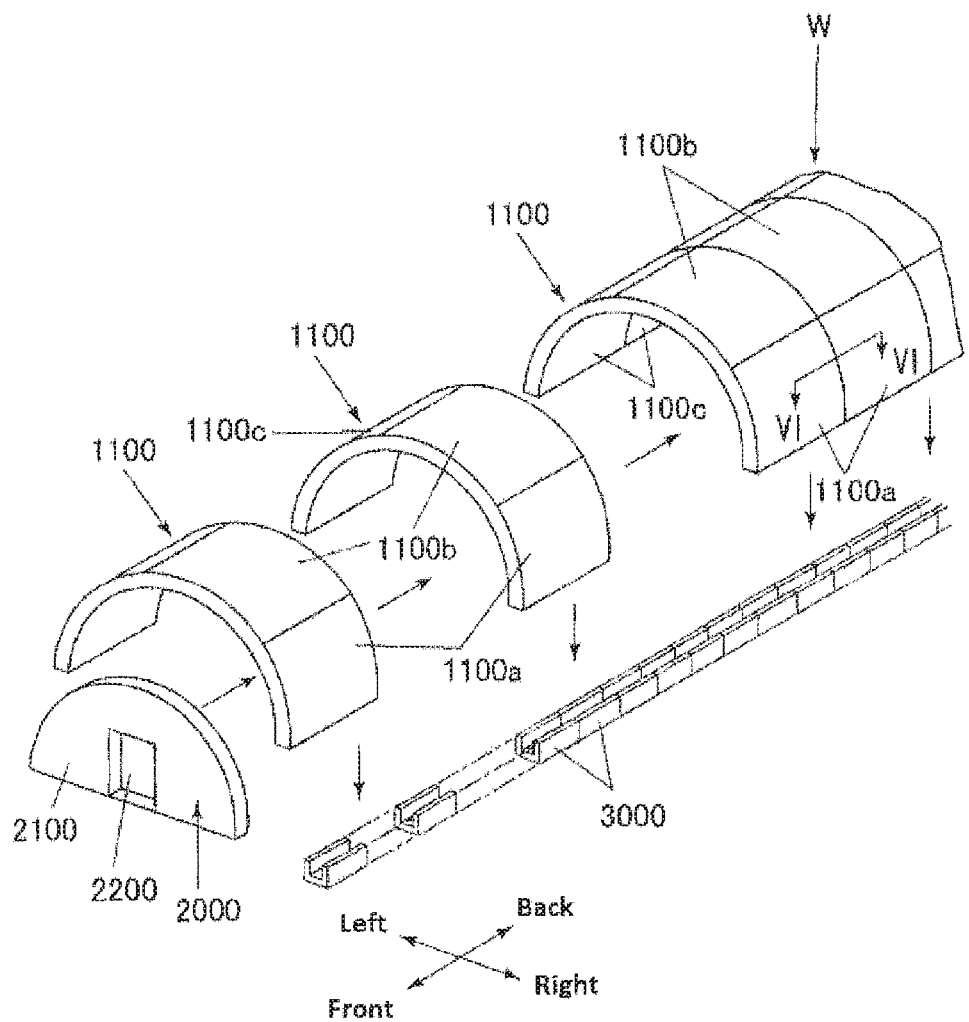
FIG. 18 is an exploded perspective view of the hydroponic cultivation system accommodating greenhouse 1.

FIGS. 17 and 18 show an example of a pre-fabricated expanded polystyrene foam greenhouse for accommodating the hydroponic cultivation system of the present invention. FIG. 17 is a perspective view showing the outer appearance of a hydroponic cultivation system accommodating greenhouse 1. FIG. 18 is an exploded perspective view thereof. Hereinafter, left, right, front, and back are defined as illustrated for convenience.

As shown in FIG. 17, the hydroponic cultivation system accommodating greenhouse 1 has a semi-cylindrical circumferential wall W that is elongated toward the front-back direction and front and back walls 2000 with a nearly half-disk shape for blocking the front and back surfaces of the circumferential wall W, as well as a space for accommodating a hydroponic cultivation system inside. As is apparent from FIG. 17, the hydroponic cultivation system accommodating greenhouse 1 has an arched roof. The entirety thereof has a tunnel-shape.

(Divided Fragments)

The semi-cylindrical circumferential wall W as shown in FIG. 18 is assembled by putting together a plurality of arched divided circumferential walls 1100. Each divided circumferential wall 1100 is composed of three divided fragments 1100a-1100c, which are connected while contacting one another in the axial longitudinal direction. Each of the divided circumferential walls is connected while contacting one another at each end surface in the axial longitudinal direction.

As used herein, "connect" refers to a certain member and another member being in contact and fixed. As used herein, adhesion with an adhesive is also a connection, and engagement of engaging sections and fixation by fitting are also connections.

The front and back walls 2000 may be composed of a single divided fragment or formed with a plurality of divided fragments. FIG. 18 shows an embodiment where the front and back walls are composed of a single divided fragment. It is of course possible to put together a plurality of divided fragments to assemble the front and back walls 2000. Circumferential walls and front and back walls are accommodated in a foundation 3000 to be fixed. In the embodiment of FIG. 18, the foundations 3000 are arranged in two rows in the width direction of the hydroponic cultivation system accommodating greenhouse 1 to support the bottom ends of the circumferential wall W. However, the foundation of the hydroponic cultivation system accommodating greenhouse of the present invention is not limited to such a specific shape or configuration. Those skilled in the art can construct a suitable foundation.

The size of a single hydroponic cultivation accommodating greenhouse 1 may be appropriately determined by those skilled in the art depending on the size of the hydroponic cultivation system to be accommodated or plant to be cultivated. For example, a width (length in the left-right direction) is about 5-10 m, depth (length in the front-back direction) is about 20-50 m, and the height is about 3-5 m.

The divided fragments 1100a-1100c and 2100 are manufactured in advance at a factory and are assembled at the construction site. The size of the divided fragments 1100a-1100c and 2100 can be appropriately determined by those skilled in the art while considering the ease of transport or assembly. In a preferred embodiment where the divided fragments 1100a-1100c and 2100 are made of expanded polystyrene foam, each divided fragment is light to facilitate transportation and assembly operations. An opening 2200, which is an entrance/exit of the greenhouse 1, is formed in advance on the divided fragment 2100. A door 2300 which can be opened or closed may be installed on the opening 2200.

Figure 19:
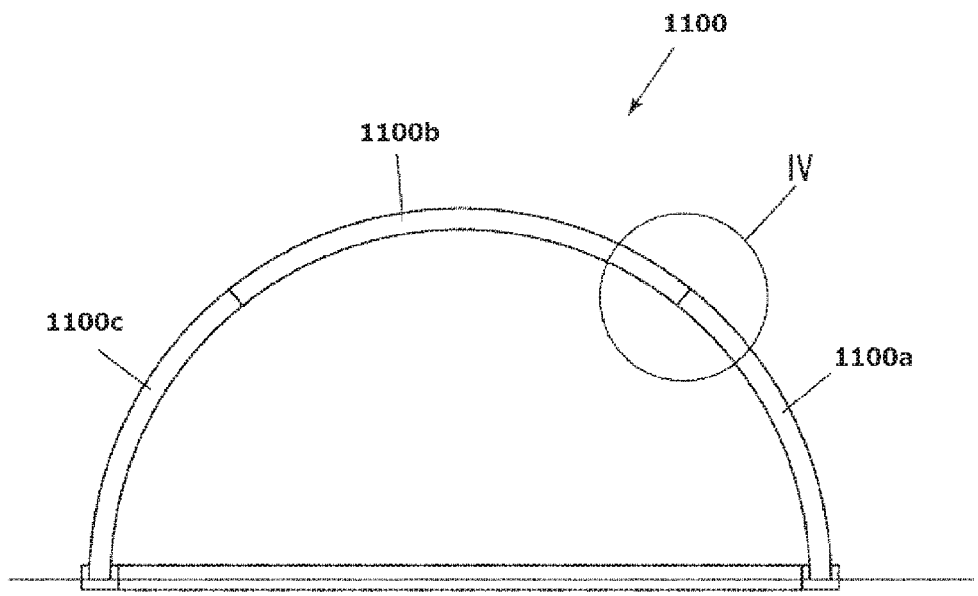
FIG. 19 is an elevational view showing an assembled state of divided circumferential walls that are divided into three in the circumferential direction.
Figure 20:
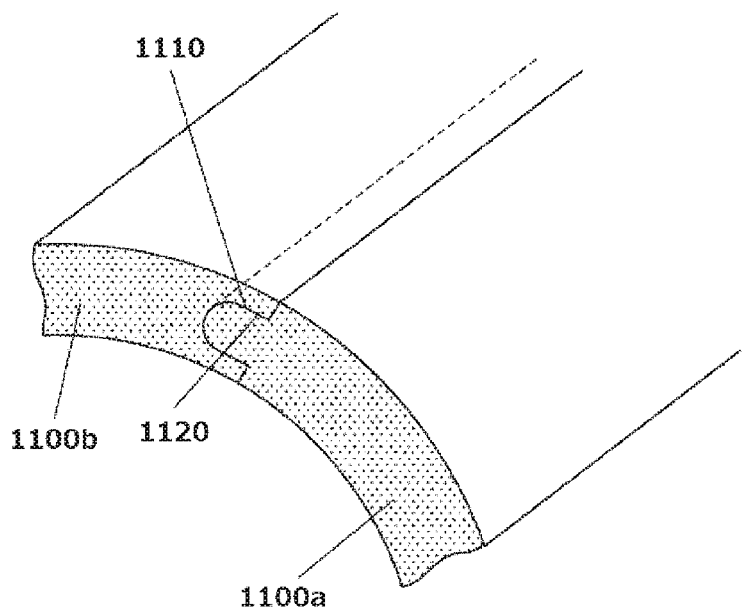
FIG. 20 is an expanded view of section IV in FIG. 19.

FIG. 19 is an elevational view showing an assembled state of divided circumferential walls 1100 that are divided into three in the circumferential direction. FIG. 20 is an expanded view of section IV in FIG. 19. In one embodiment, a convex section 1110 is formed on the top end surface of the divided fragment 1100a and a concave section 1120 is formed on the opposing bottom end surface of the divided fragment 1100b as shown in FIG. 20. The concave section 1120 is fitted with the convex section 1110 to connect the divided fragment 1100a and the divided fragment 1100b. Furthermore, the divided fragments 1100a and 1100b may be bonded with an adhesive and fixed to each other in this state. The divided fragment 1100b and the divided fragment 1100c are similarly connected.

Figure 21A:
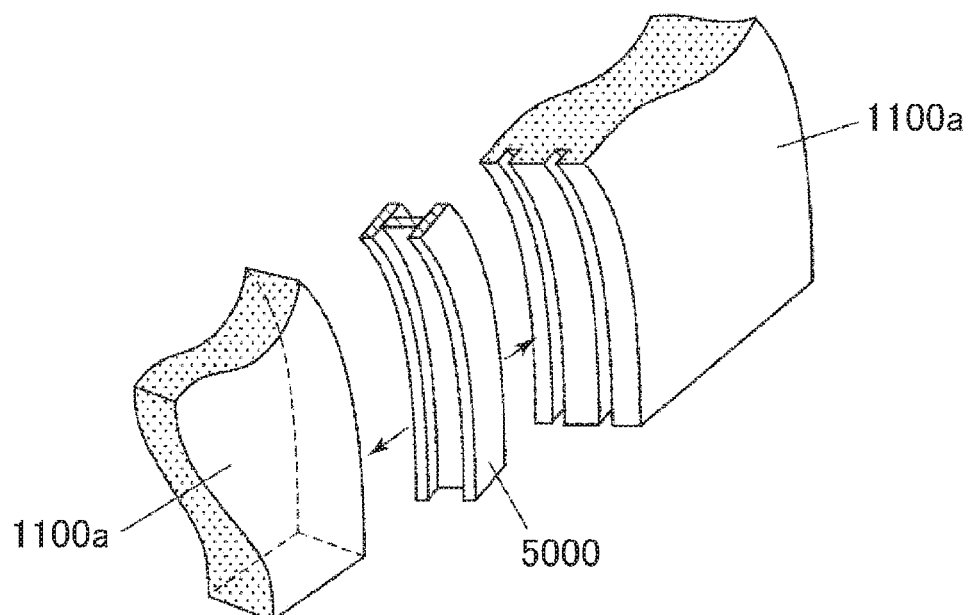
FIG. 21(a) is a perspective view showing one embodiment of a linked state of a divided circumferential wall 1100 in the front and back direction.
Figure 21B:
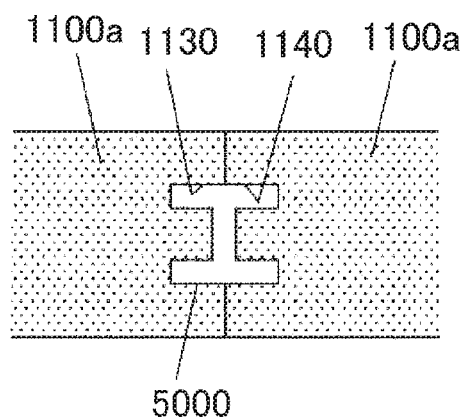
FIG. 21(b) is a cross-sectional view of a linking section thereof (cross-sectional view along the VI-VI line in FIG. 20).

FIG. 21(a) is a perspective view showing one embodiment of a linked state of divided circumferential walls 1100 in the front and back direction. FIG. 21(b) is a cross-sectional view of a linking section thereof (cross-sectional view along the VI-VI line in FIG. 20). As shown in FIG. 21, a reinforcing member may be interposed between two adjacent divided fragments 1100a to reinforce the entire greenhouse. Such a reinforcing member may be any member known in the art that can be interposed in the greenhouse to reinforce the greenhouse. The specific shape may be determined by those skilled in the art to be suitable for assembly. In the embodiment shown in FIG. 21, an H-beam 5000, which is nearly semicircular to match the shape of the greenhouse, is interposed. The bottom end section of the H-beam 5000, for example, may be fastened to the foundation 3000 integrally with the dividing fragment 1100a by a penetrating bolt.

Concave sections 1130 and 1140 for fitting with the H-beam 5000 are formed on each of the front-back direction end surfaces of each divided fragment 1100a, and divide fragments 1100a are connected with each other via the H-beam 5000. The divided fragments 1100b and divided fragments 1100c may be similarly connected with each other via the H-beam 5000. The H-beam 5000 thereby functions as a reinforcing member of the greenhouse 1, such that the strength of the entire hydroponic cultivation system accommodating greenhouse can be enhanced. This as a result allows linking of the divided circumferential walls 1100 to a length of several 10 s of meters to assemble the greenhouse 1 and assembly of the greenhouse 1 in regions with significant snowfall in terms of strength. Further, when such an H-beam 5000 is interposed, the H-beam 5000 would not be exposed to the surface. Thus, it is possible to prevent the H-beam 5000 from rusting.

Figure 21C:
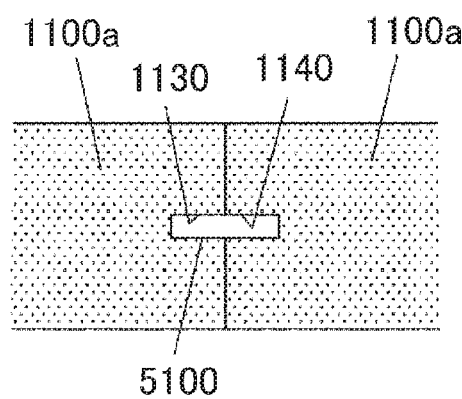
FIG. 21 (c) is a cross-sectional view of a linking section in another embodiment of a linked state of a divided circumferential wall 1100 in the front and back direction.

When not much strength is required for the greenhouse 1 (e.g., there is no concern for snowfall), a plate 5100 may be interposed to connect the divided fragments 1100 with each other via the plate 5100 instead of the H-beam 5000 as shown in FIG. 21(c).

One example of an assembly sequence for the hydroponic cultivation system accommodating greenhouse 1 of the present invention is explained. First, as shown in FIG. 18, the foundation 3000 is laid where the greenhouse 1 is to be assembled. A reinforcing member (e.g., H-beam 5000) is then erected at a position corresponding to the front-most section of the greenhouse 1, and each concave section 1140 of the front end of each divided fragment 1100a-1100c is fitted with the H-beam 5000. In this state, the bottom end section of the H-beam 5000 and the bottom end section of the divided fragments 1100a and 1100c are fastened to the foundation 3000 with a penetrating bolt. At this time, the divided fragments 1100a-1100c are linked to one another in the circumferential direction via the concave section 1120 and the concave section 1110 to form the divided circumferential wall 1100. The H-beam 5000 is then fitted with the concave section 1130 of the back end of the divided circumferential wall 1100, and the linking operation of divided circumferential wall 1100 via the H-beam 5000 is repeated until the entire greenhouse has a predetermined length.

When the entire greenhouse has a predetermined length, a foam mat is laid and floor concrete is poured, and a coating or the like is applied as needed between the left and right foundations 3000. Furthermore, a reflector material may be applied to the inner surface of the greenhouse 1, or a painting material may be applied to the outer surface of the greenhouse 1. After a hydroponic cultivation system, required parts and products are transported into the greenhouse 1, the divided fragments 2100 are linked to the divided circumferential walls 1100 at the front and back end sections of the greenhouse 1 via the H-beam 5000. The front and back surfaces of the greenhouse 1 are thereby closed to form a sealed space blocked from the outside and suitable for hydroponic cultivation. A reflector material or a painting material may be applied to the surface of the divided fragments 1100a-1100c in advance at a factory.

The hydroponic cultivation system accommodating greenhouse of the present invention may comprise a windbreak room, air shower room, changing room/anteroom, sterilization room, warehouse, cultivation room and the like as needed.

In a preferred embodiment, the entire inner surface of the hydroponic cultivation system accommodating greenhouse 1 has a curved shape from the bottom to the top portions while having few uneven portions. Thus, it is possible to create an interior space that is very hygienic, where dust or microorganisms tend not to accumulate.

(Divided Circumferential Wall and Divided Roof)

Figure 22:
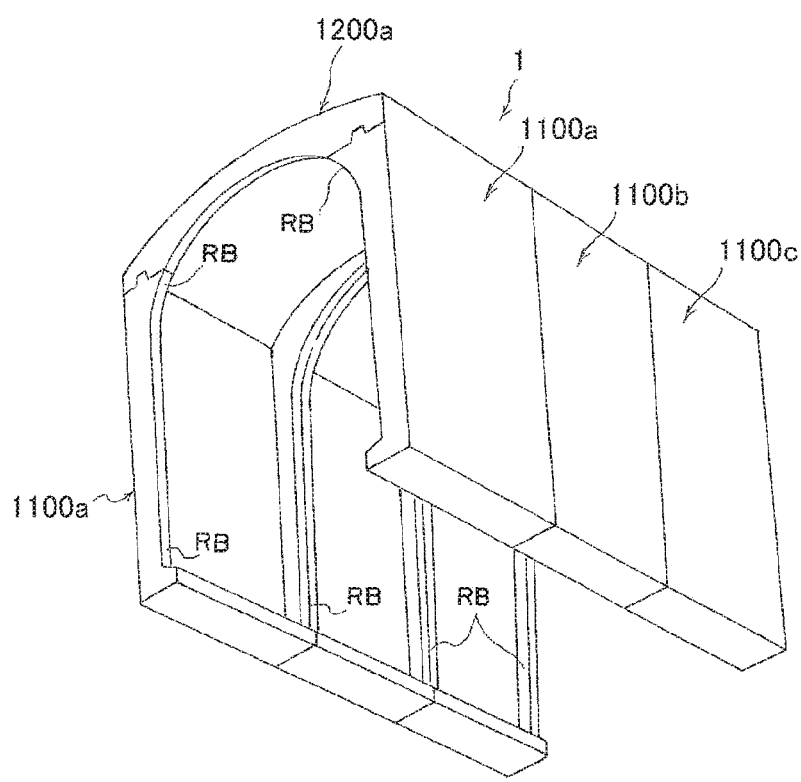
FIG. 22 shows a specific embodiment of a hydroponic cultivation system accommodating greenhouse composed of divided circumferential walls and divided roofs.

In another embodiment, the hydroponic cultivation system accommodating greenhouse of the present invention may be configured to comprise the divided circumferential wall 1100 and a divided roof 1200 using expanded polystyrene foam as the constituent material. FIG. 22 shows a specific embodiment of the hydroponic cultivation system accommodating greenhouse 1 composed of divided circumferential walls 1100 and divided roofs 1200. In FIG. 22, the divided circumferential wall 1100 has opposing, flat plate-shaped divided circumferential walls 1100a, 1100b and 1100c. The divided roof 1200 has divided roofs 1200a-1200c that each stretch across between opposing divided circumferential walls in a nearly arched shape. That is, a plurality of divided circumferential walls and divided roofs are put together to form the hydroponic cultivation system accommodating greenhouse 1. When a larger number of divided circumferential walls and divided roofs are put together, a large-scale greenhouse 1 can be formed without using a larger individual expanded polystyrene foam fragment.

As shown in FIG. 22, each of the engaging section of the divided circumferential wall 1100 and the engaging section of the divided roof 1200 protrudes out, such that the thickness of the engaging sections is thicker than other portions.

The contact area between the divided circumferential walls and divided roofs with one another is increased thereby to increase the strength of the engaging sections. Further, with such a configuration, the engaging sections would have a ribbed structure, such that it is possible to achieve enhanced strength of not only the engaging sections, but also the entire greenhouse 1. In FIG. 22, ribs RB have a configuration having a rib protruding out toward the interior space at the engaging sections of divided circumferential walls and divided roof. However, ribs may be provided to face outward, and the specific shape of ribs may be any shape, if it is possible to achieve enhanced strength of the engaging sections and the entire greenhouse. Furthermore, a rib can be provided at portions other than engaging sections of divided circumferential walls and divided roofs.

Figure 23A:
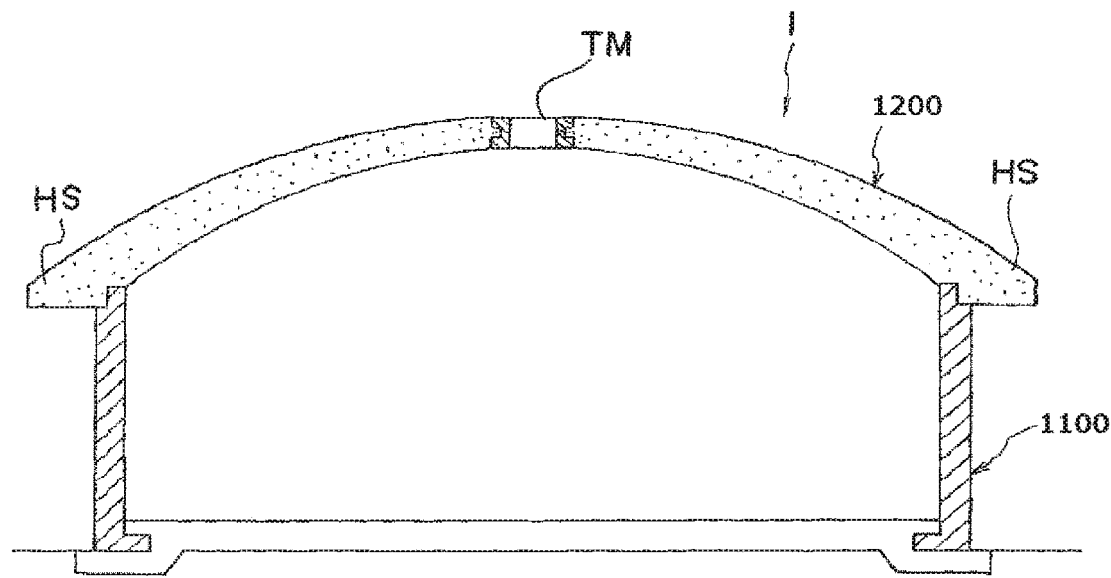
FIG. 23(a) is a cross-sectional view of a specific embodiment in which divided roofs have eaves.
Figure 23B:
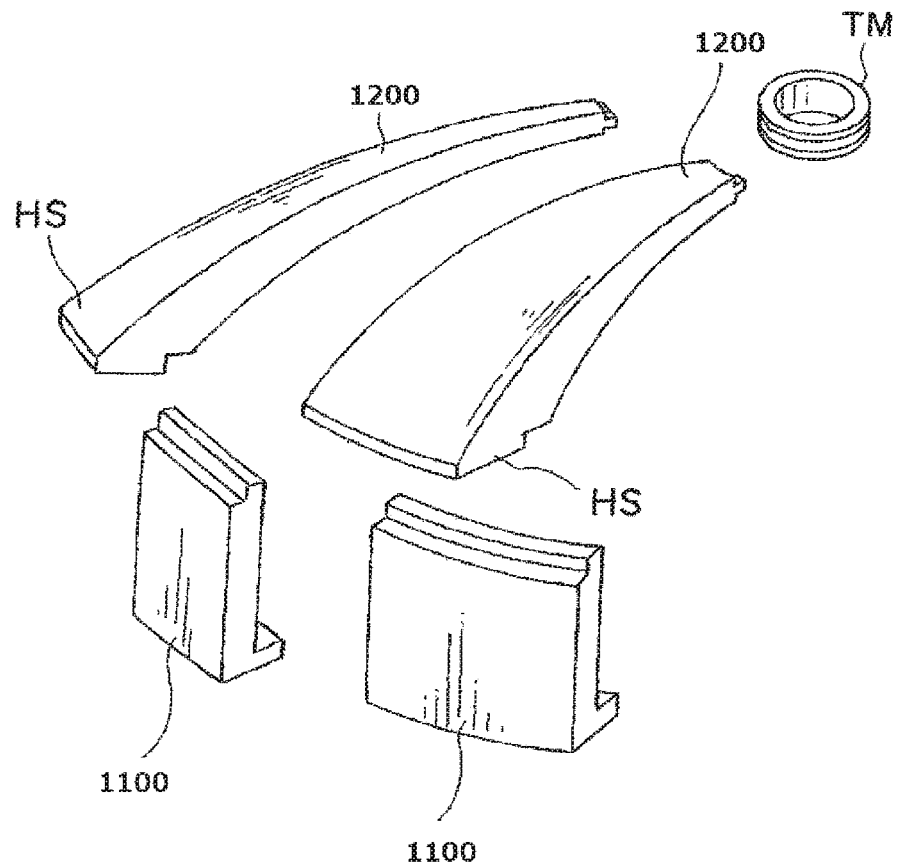
FIG. 23(b) shows the state of a connection surface between the divided circumferential wall 1100 and the divided roof 1200 having such eaves HS.

In one embodiment, the hydroponic cultivation system accommodating greenhouse of the present invention has eaves HS on the divided roof 1200 as shown in FIG. 23. FIG. 23(b) shows the state of a connection surface between the divided circumferential wall 1100 and the divided roof 1200 having such eaves HS. A Skylight™ is provided in FIGS. 23(a) and 23(b). However, such a skylight may or may not be provided. In a preferred embodiment, the thickness of a divided roof varies which is at the maximum thickness at the eaves HS portion, as shown in FIGS. 23(a) and 23(b). This is to enhance the strength at the eaves HS portion. However, the shape of the divided roof 1200 is not necessarily limited thereto. The end sections where eaves HS portion is provided may not necessarily have the maximum thickness.

(Linking with Another Construct)

Figure 24:
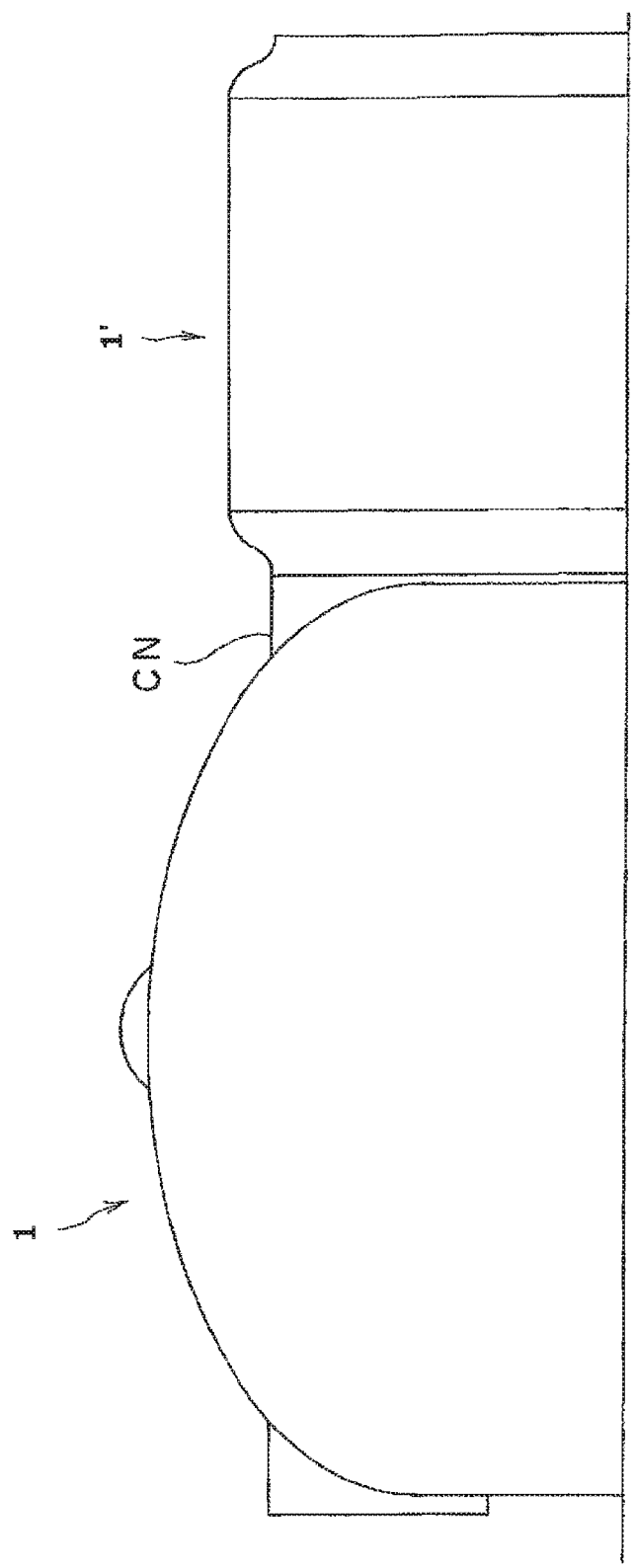
FIG. 24 shows an embodiment in which the hydroponic cultivation system accommodating greenhouse of the present invention is linked to another structure via a linking section.

The hydroponic cultivation system accommodating greenhouse 1 of the present invention can be used as a single unit or by linking the greenhouse with another construct. For instance, the greenhouse 1 having an arched roof can be used by linking with another semi-cylindrical or semispherical construct. FIG. 24 shows an embodiment in which the hydroponic cultivation system accommodating greenhouse 1 is linked to another structure 1' via a linking section CN. If the greenhouse 1 and the structure 1' are linked such that the interior spaces are communicable via an internal pathway, spaces with various shapes can be readily formed. A linking section CN may be provided, for example, with a door. Another structure 1' may be an air shower room, changing room/anteroom, sterilization room, warehouse or the like.

Figure 25:
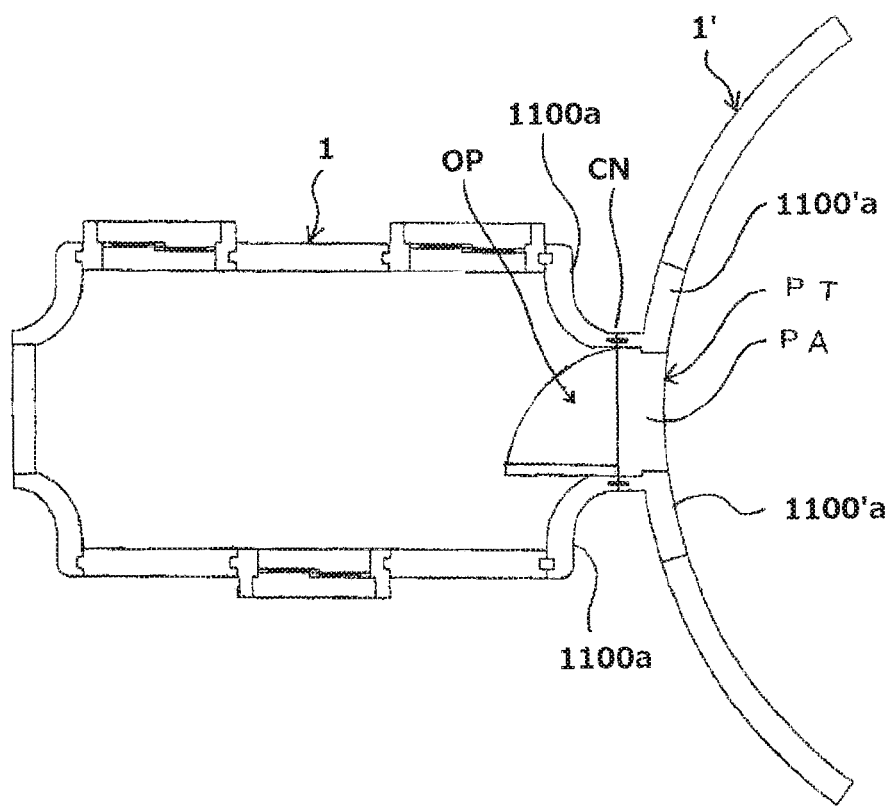
FIG. 25 is an expanded view of a linking section in one embodiment of link between a hydroponic cultivation system accommodating greenhouse and a domed construct.
Figure 27D:
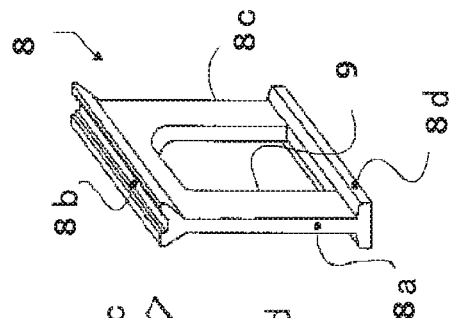
FIG. 27(D) is a perspective view of the divided fragment 8 of a partition wall leg section.
Figure 27C:
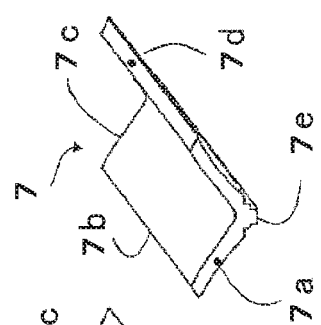
FIG. 27(C) is a perspective view of the divided fragment 7 of a partition wall top section.
Figure 27B:
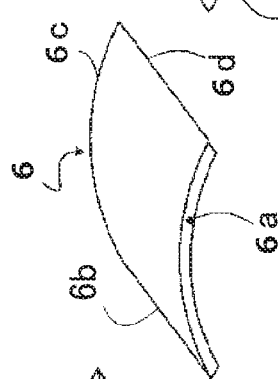
FIG. 27(B) is a perspective view of the divided fragment 6 of an arched roof.
Figure 27A:
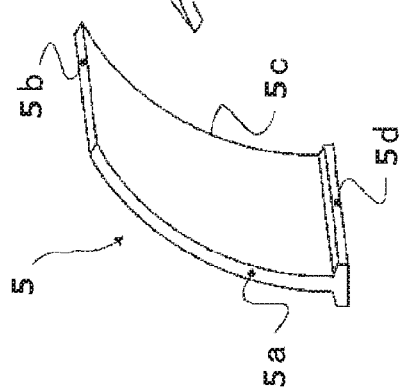
FIG. 27(A) is a perspective view of the divided fragment 5 of a side wall.

FIG. 25 shows an expanded view of the linking section CN in one embodiment of a link between the hydroponic cultivation system accommodating greenhouse 1 and a domed construct 1'. In this specific example, an opening OP and a convex section protruding outward to surround the opening OP are provided to the divided fragment 1100a of the greenhouse 1. Similarly, an opening OP and a convex section protruding out to surround the opening OP are provided to the divided fragment 1100' for the construct 1'. The end surfaces of the convex sections are connected to each other, such that the interior space of the greenhouse 1 and the interior space of the construct 1' are in communication. The specifics are set forth below.

The linking section CN is provided with the above-described door PT. The divided circumferential wall 1100a of the greenhouse 1 facing the door PT is molded in a tapered and curved manner toward the door PT. In addition, the opening OP with approximately the same open area as the door PT is provided. The end surface of the divided circumferential wall 1100a abuts the end surface of the divided circumferential wall 1100'a forming the door PT of the construct 1', where they are connected without space.

Further, the greenhouse 1 and the construct 1' are also connected without space above and below the door PT. The greenhouse 1 and the construct 1' are thereby linked via the linking section CN and a pathway PA is formed by the door PT and the opening OP within the linking section CN. As a result, the greenhouse 1 and the construct 1' are communicable with each other via the pathway PA. A highly extensible greenhouse with various types of constructs can be readily formed by linking the greenhouse 1 and the construct 1' in this manner. In addition, the linking section CN can enhance the strength of the greenhouse itself. Furthermore, a linking member at the link between the greenhouse 1 and the construct 1' is rendered unnecessary, such that the number of parts can be reduced and construction is facilitated. In addition, as constructs can be linked with each other only by connecting the end surfaces of concave sections surrounding an opening provided to oppose each other, construction is facilitated.

(Linking of Structures without Using a Linking Section)

When the linking section CN is used as discussed above to provide numerous arched greenhouses in the left-right direction, the presence of numerous linking sections CN linking the greenhouses in the left-right direction may create wasted spaces and complicate assembly. Thus, the present embodiment shows a configuration for linking multiple arched greenhouses with an arched roof without using the linking section CN as described above.

In this regard, in one embodiment of the present invention, a hydroponic cultivation system accommodating greenhouse is an arched building comprising a first structure having a first arched roof and a second structure having a second arched roof, wherein the first structure and the second structure may have a configuration that shares at least a portion of a partition wall partitioning the first structure and the second structure. That is, structures having an arched roof are linked without using the linking section CN.

Specifically, the first arched roof comprises a divided fragment of the first arched roof, the second arched roof comprises a divided fragment of the second arched roof, and partition wall comprises a divided fragment of a partition wall leg section, wherein the divided fragment of the first arched roof, the divided fragment of the second arched roof, and the divided fragment of the partition wall leg section are connected through a divided fragment of a partition wall top section, such that the first structure and the second structure share at least a portion of the partition wall.

Such a greenhouse further comprises a third structure having a third arched roof, and the second structure and the third structure share at least a portion of a partition wall partitioning the second structure and the third structure such that structures can be successively linked without using the linking section CN.

Specific explanations are set forth hereinafter. FIG. 26(*a*) is an overview of a hydroponic cultivation system accommodating greenhouse 1 combining three arched structures 1α, 1β, and 1γ. The arched structures 1α and 1β share a partition wall 8, and the arched structures 1β and 1γ share another partition wall 8'. The size of the greenhouse 1 can be appropriately determined by those skilled in the art in accordance with the application. However, as one example, a divided fragment with an outer shell radius R of 3850 mm is used to connect 10 divided fragments in the front-back direction in FIG. 26(*a*). In this case, the width in the left-right direction is about 19 m and the width in the front-back direction is about 20 m. The height from the ground surface to the interior ceiling is 3650 mm. When a divided fragment with an outer shell radius R of 4850 mm is used to connect 13 divided fragments in the front-back direction, the width in the left-right direction is about 26 m, and the width in the front-back direction is about 26 m. The height from the ground surface to the interior ceiling is 4650 mm. In this manner, an expansive space with lengths in the left-right direction and the front-back direction can be formed inside the greenhouse 1. Although not shown in FIG. 26, a wall or a door may be provided at the front end and back end in the front-back direction.

FIG. 26(*b*) is a cross-sectional view of the greenhouse 1 in FIG. 26(*a*). As shown in FIG. 26(*b*), the greenhouse 1 can be assembled from divided fragments 5 of a side wall provided at the leftmost end and the right most end, a divided fragment 6 of an arched roof, a divided fragment 7 of a partition wall top section, and a divided fragment 8 of a partition wall leg section installed to the bottom section of the divided fragment 7 of a partition wall top section. For instance, such a configuration can extend an arched roof in the left-right direction. However, divided fragments of a side wall and divided fragment of an arched roof may be a single divided fragment or two or more divided fragments. Further, a divided fragment of a partition wall top section may or may not be provided. Any divided fragment may be used for assembly as long as structures having an arched roof are strung together and adjacent structures share a partition wall with each other.

When there are structures with, for example, outer shell radii R of 3850 mmm and 4850 mm, divided fragments 5 of a side wall, divided fragments 6 of an arched roof, divided fragments 7 of a partition wall top section, and divided fragments 8 of a partition wall leg section with two different dimensions corresponding thereto can be prepared. It is desirable that the outer shell radius R is 3.5-5.0 m.

FIG. 27 is a perspective view of each divided fragment that is a constituent of the hydroponic cultivation system greenhouse 1 of FIG. 26. (A) is a perspective view of the divided fragment 5 of a side wall, (B) is a perspective view of the divided fragment 6 of an arched roof, (C) is a perspective view of the divided fragment 7 of a partition wall top section, and (D) is a perspective view of the divided fragment 8 of a partition wall leg section. For the divided fragment 5 of a side wall, a front connection section 5*a*, a top connection section 5*b*, and a back connection section 5*c* are connected to other divided fragments. A leg 5*d* contacts the ground surface or the foundation. The divided fragment 6 of an arched roof is a roof arched in the left-right direction. A front connection section 6*a*, a left connection section 6*b*, a back connection section 6*c*, and a right connection section 6*d* are connected to other divided fragments. For the divided fragment 7 of a partition wall top section, a front connection section 7*a*, a left connection section 7*b*, a back connection section 7*c*, a right connection section 7*d*, and a bottom connection section 7*e* are connected to other divided fragments. The divided fragment 8 of a partition wall leg section has a leg supporting the bottom section of the divided fragment 7 of partition wall top section. A through hole 9 may be provided to this leg. The leg 8*d* contacts the ground surface of the foundation. For the divided fragment 8 of a partition wall leg section, a front connection section 8*a*, a top connection section 8*b*, and a back connection section 8*c* are connected to other divided fragments. The same divided fragment 5 of a side wall can be used for one end and the other end in the left-right direction of the greenhouse 1. Although FIG. 27 shows only the divided fragment 5 of a side wall at one end, the divided fragment 5 of a side wall at the other end has a form in which the front connection section 5a and the back connection section 5c of the divided fragment 5 of a side wall shown in FIG. 27(A) are switched.

The divided fragment 7 of a partition wall top section may be integrally formed with the divided fragment 8 of a partition wall leg section. In this case, a construction to connect the bottom connection section 7e of the divided fragment 7 of a partition wall top section with the top connection section 8b of the divided fragment 8 of a partition wall leg section can be omitted. Further, when the dimension of the divided fragment 7 of a partition wall top section is large in the left-right direction, for example, the left wing or the right wing may be separated to be composed of two divided fragments.

Figure 28:
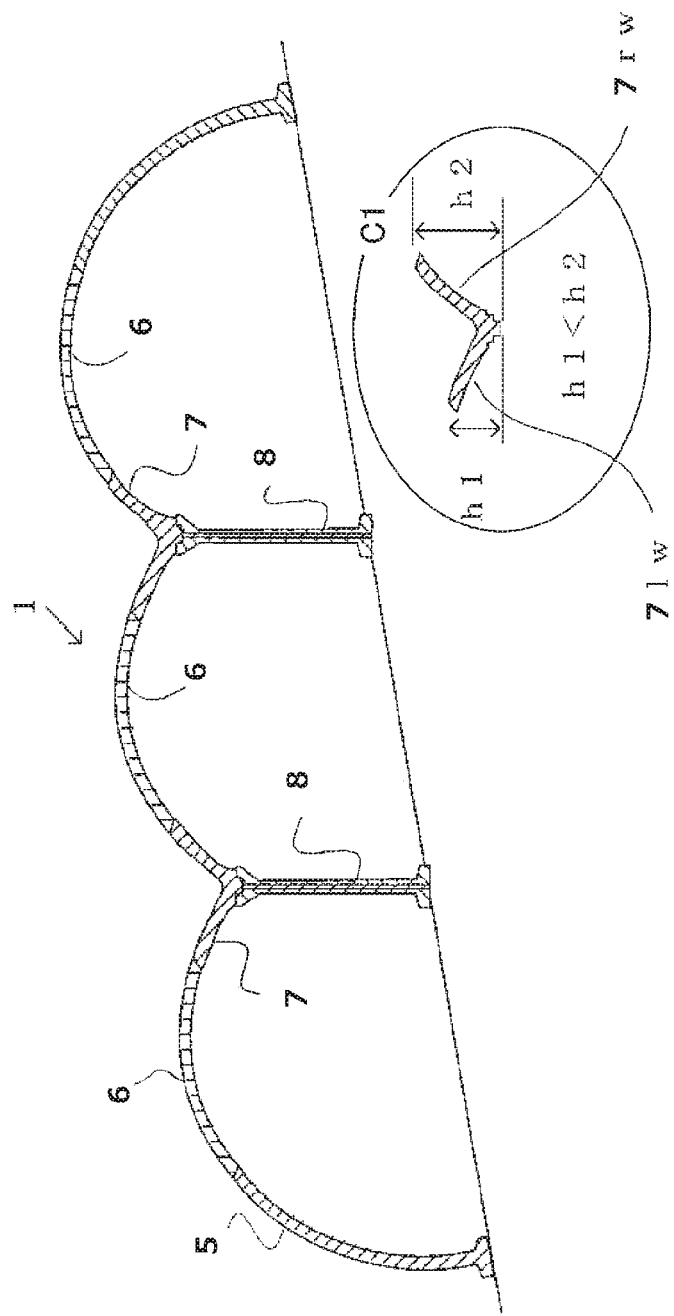
FIG. 28 is a cross-sectional view when the hydroponic cultivation system accommodating greenhouse according to the present invention is installed on an uphill inclined surface.

FIG. 28 is a cross-sectional view when the hydroponic cultivation system accommodating greenhouse 1 according to the present invention is installed on an uphill inclined surface. In this embodiment, the divided fragment 8 of a partition wall leg section is not perpendicular with respect to the incline, but is perpendicular with respect to the horizontal direction. For this reason, as shown in the expanded bubble C1, a left wing 7lw is bent more downward and a right wing 7rw is bent more upward for the divided fragment 7 of a partition wall top section for an incline in comparison to the divided fragment 7 of a partition wall top section for a standard horizontal ground surface. The angle of bending is determined based on the angle of the incline of the ground surface. Further, the height h1 of the left wing 7lw is lower than the height h2 of the right wing 7rw. The hydroponic cultivation system accommodating greenhouse 1 can be installed on an inclined surface by using such a divided fragment 7 of a partition wall top section. The divided fragment 7 for a partition wall top section for a downhill inclined surface is the opposite of the divided fragment 7 of a partition wall top section for an uphill inclined surface. If the angles of incline are the same, the same divided fragment 7 of a partition wall top section can be used.

Figure 29:
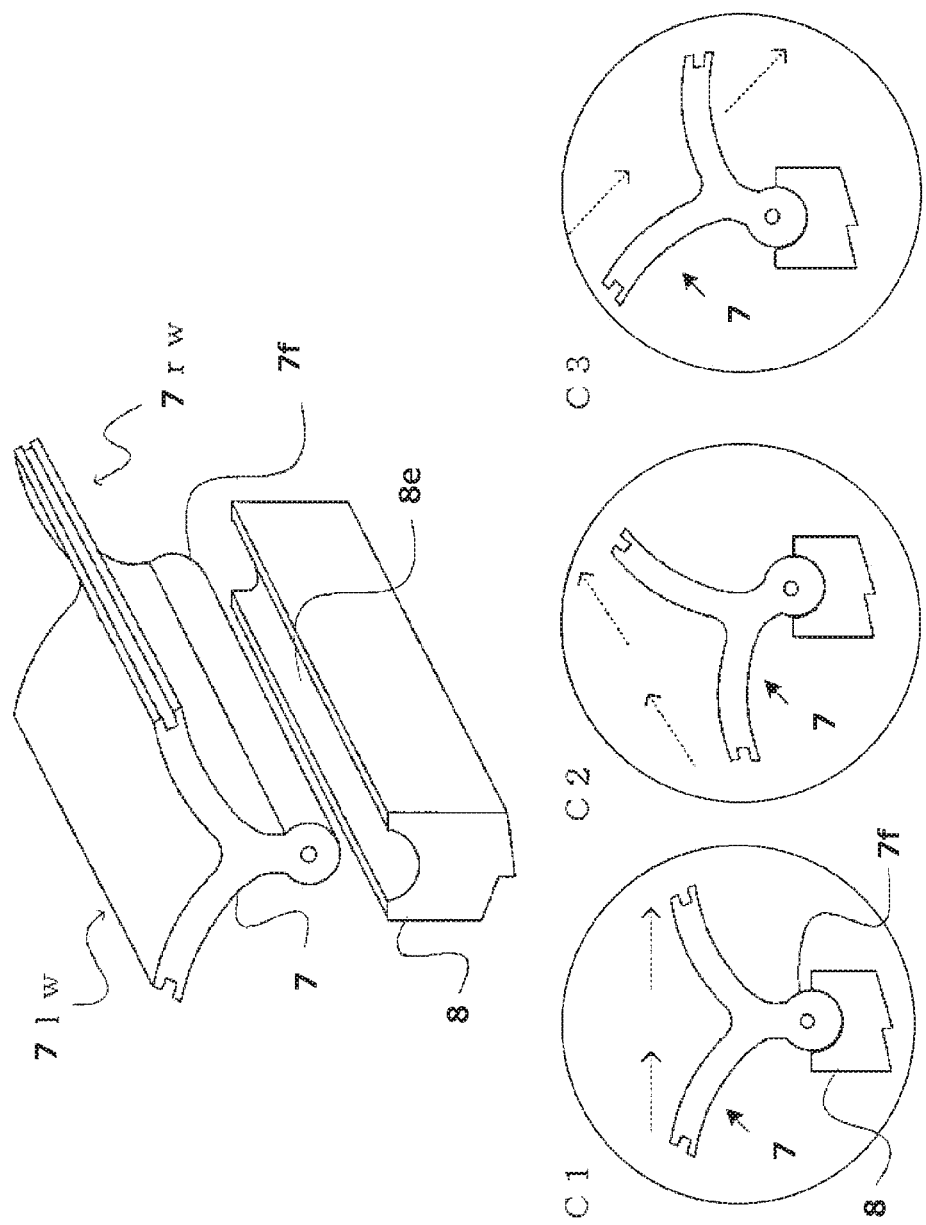
FIG. 29 is a diagram of a configuration in which a divided fragment of a partition wall top section is rotatable with respect to a divided fragment of a partition wall leg section.

FIG. 29 is a diagram of a configuration in which the divided fragment 7 of a partition wall top section is rotatable with respect to the divided fragment 8 of a partition wall leg section. A roll 7f is provided to the bottom connection section 7e of the divided fragment 7 of a partition wall top section, and a semi-cylindrical concave section 8e is provided on the top connection section 8b of the divided fragment 8 of a partition wall leg section. As shown in the expanded bubble C1, the greenhouse 1 can be installed on a horizontal ground surface by connecting the divided fragment 7 of a partition wall top section horizontally to the divided fragment 8 of a leg section. As shown in the expanded bubble C2, the greenhouse 1 can be installed on an uphill inclined surface by connecting the divided fragment 7 of a partition wall top section to the divided fragment 8 of a partition wall leg section with the right side tilted upward. As shown in the expanded bubble C3, a pre-fabricated building can be installed on a downhill declined surface by connecting the divided fragment 7 of a partition wall top section to the divided fragment 8 of a partition wall leg section with the right side tilted downward.

Figure 30:
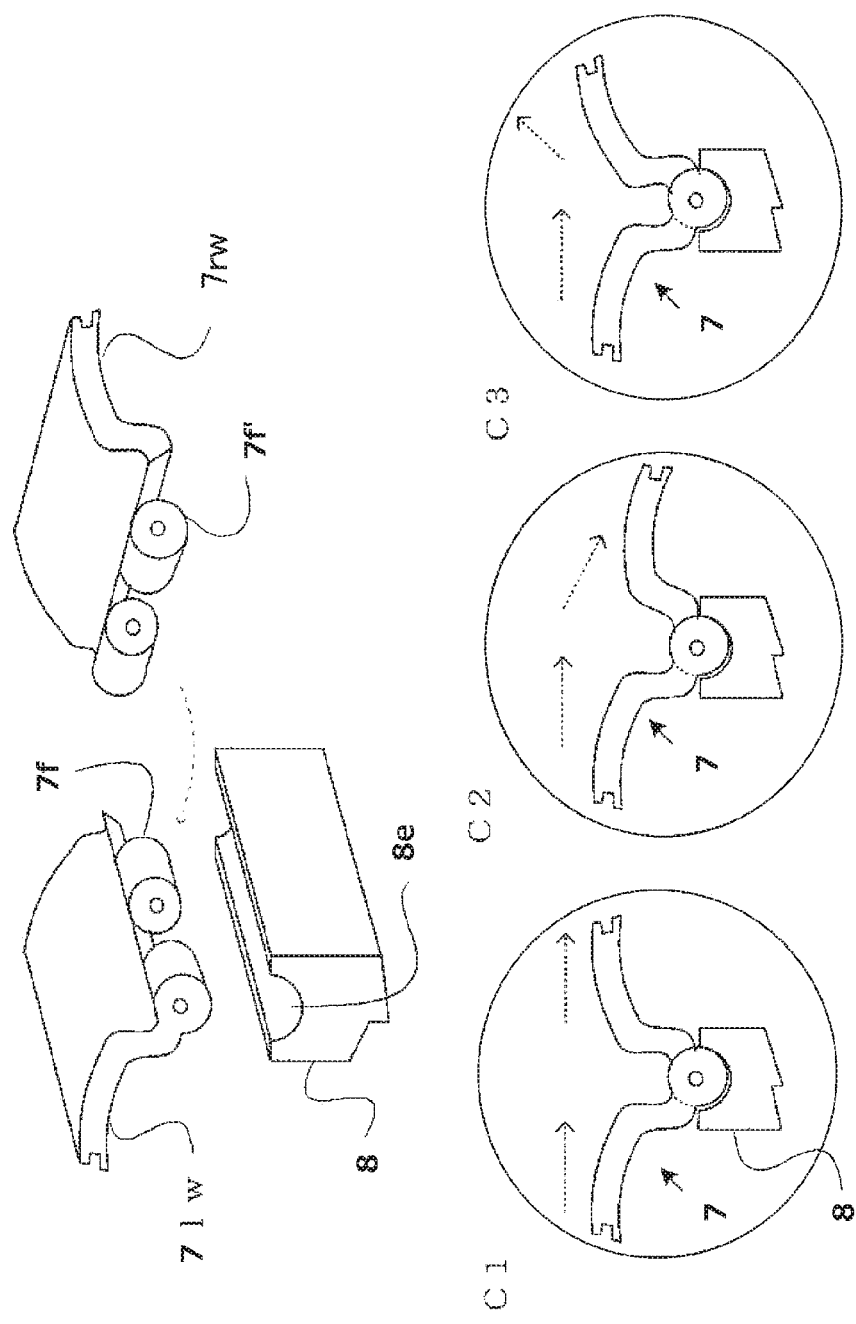
FIG. 30 is a diagram of a configuration in which a left wing and a right wing of a divided fragment of a partition wall top section are individually rotatable with respect to a divided fragment of a partition wall leg section.

FIG. 30 is a diagram of a configuration in which a left wing and a right wing of the divided fragment 7 of a partition wall top section are individually rotatable with respect to the divided fragment 8 of a partition wall leg section. The left wing and the ring wing are integrally formed and cannot move separately in the divided fragment of a partition wall top section of FIG. 29. However, the left wing and the ring are formed separately such that they can move independently in the divided fragment of a partition wall top section with a configuration shown in FIG. 30. Rolls 7f and 7f are provided alternately in the axial direction at the bottom connection section of the left wing 7lw and right wing 7rw. In addition, a semi-cylindrical concave section 8e for receiving the rolls 7f and 7f is provided at the top connection section of the divided fragment 8 of a leg section. According to this embodiment, the left wing 7lw and the right wing 7rw can be connected in an individually rotatable manner. As shown in the expanded bubble C1, a prefabricated building can be installed on a horizontal group surface by connecting the left wing 7lw and the right wing 7rw horizontally to the divided fragment 8 of a partition wall leg section. As shown in the expanded bubble C2, a pre-fabricated building can also be installed on an inclined surface tilted down in the right direction from the horizontal line by connecting the left wing 7lw horizontally to the divided fragment 8 of a partition wall leg section and connecting the right wing 7rw to the divided fragment 8 of a leg section with the right side tilted down. As shown in the expanded bubble C3, a hydroponic cultivation system accommodating greenhouse can also be installed on a inclined surface tilted up on the right side with respect to the horizontal line by connecting the left wing 7lw horizontally to the divided fragment 8 of a leg section and connecting the right wing 7rw to the divided fragment 8 of a leg section with the right side tilted up. In this manner, a hydroponic cultivation system accommodating greenhouse can be installed on a ground surface that changes from a valley to a mountain and a mountain to a valley to match such a ground surface.

(Hydroponic Cultivation System Accommodating Greenhouse and Foundation)

In a representative embodiment, the hydroponic cultivation system accommodating greenhouse is fixed to a foundation (for example, see foundation 3000 in FIG. 18).

Figure 31:
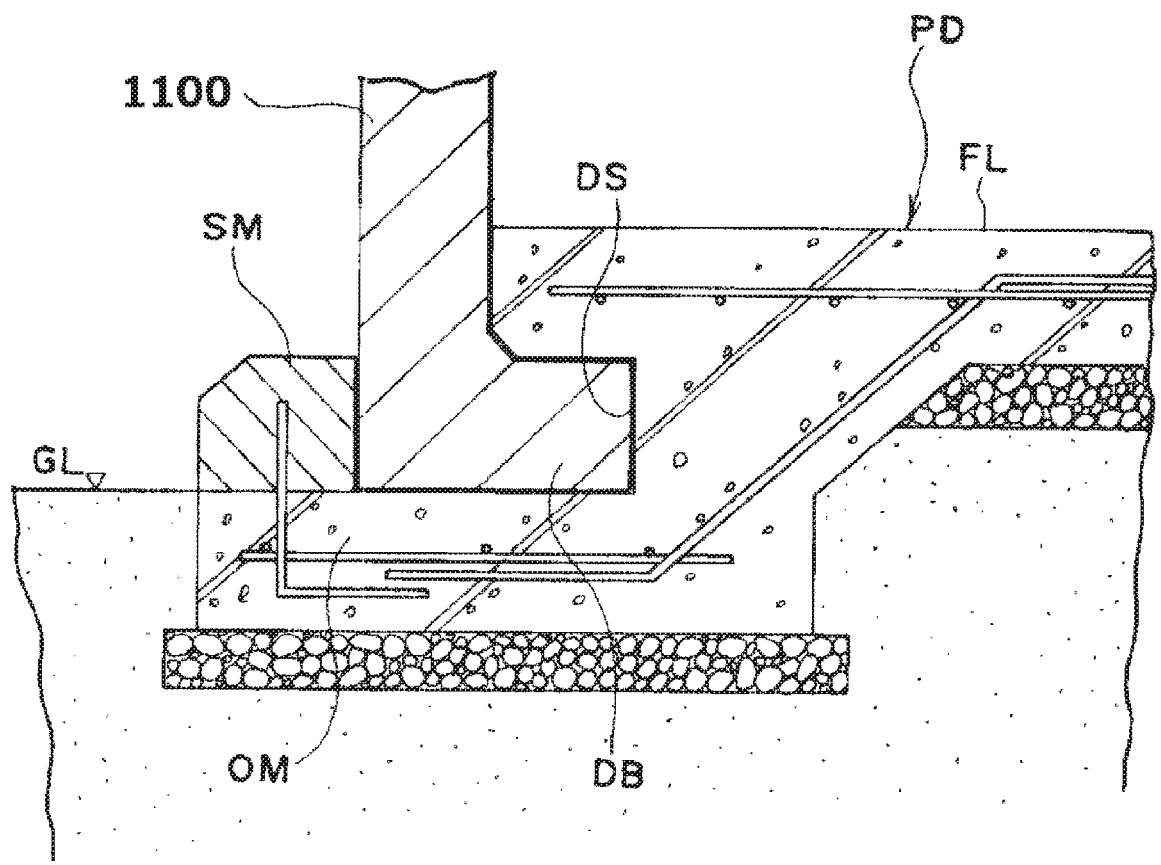
FIG. 31 is a diagram showing the detailed installed structure of a divided fragment.

FIG. 31 is a diagram showing the detailed mounted structure of the divided fragment 1100. A foundation PD is laid at a location where a greenhouse is installed. The foundation PD, as illustrated, has a greenhouse supporting section OM for supporting a divided fragment at the same height as ground surface GL and a divided fragment pressing section DS. A floor surface FL is also formed on the foundation PD at a predetermined height (e.g., 360 mm) from the ground surface GL. A divided fragment of a greenhouse has, at a base end section, a protrusion section DB, which fits with the pressing section DS to ensure a fixed position of the greenhouse and restricts the greenhouse from moving upward or toward the inner radial direction. The specific shape of the protrusion section DB and the pressing section DS may be of any shape as long as they fit with each other to prevent movement of the greenhouse upward or toward the inner radial direction. Further, the protrusion section DB of a divided fragment is at the base end section of the greenhouse. However, a "base end section" does not necessarily have to be an end section in the present invention, and refers to a position in the vicinity of a base section of a greenhouse where it can fit with the pressing section DS to prevent the greenhouse from moving upward or toward the inner radial direction. The specific shape and position of the protrusion section DB and the pressing section DS can be appropriately determined by those skilled in the art. In the embodiment shown in FIG. 31, the divided fragment pressing section DS is a ring-like concave section. An L-shaped base section DB provided at the base end section of each divided fragment 1100 is locked with the dome pressing section DS to ensure the fixed position of the greenhouse and restrains the greenhouse from moving upward or toward the inner radial section. A restriction section SM for preventing the greenhouse from expanding in the outer radial direction can be provided along the entire circumference in a ring shape around the outer circumference section of the protrusion section DB of the divided fragment.

(Transportable Assembly Foundation)

Figure 32A:
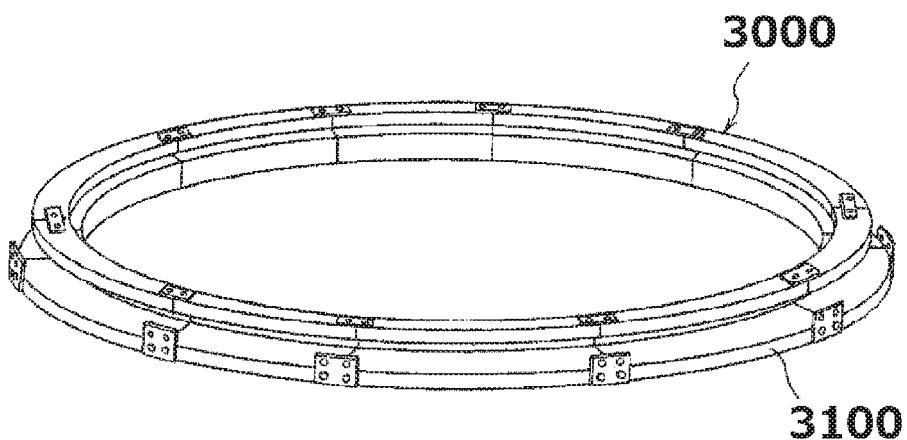
FIG. 32(a) is a perspective view of a mobile assembly foundation.

In one embodiment of the present invention, the foundation is a transportable assembly foundation. Generally, a laid foundation is not intended to be transported. One embodiment of a transportable assembly foundation is shown in FIG. 32. FIG. 32(a) is a perspective view of a mobile assembly foundation. In this embodiment, the foundation 3000 is composed of a plurality of divided substrates 3100. A floor for forming a flat surface, which is a floor surface of a greenhouse, may be disposed on the substrate 3100. As shown in FIG. 32, provision of a transportable mobile assembly foundation and a pre-fabricated greenhouse can be materialized by not only constructing a greenhouse from divided fragments, but also constructing the foundation to be made by putting together a plurality of divided substrates. The foundation is given a tonic shape to facilitate understanding in FIG. 32. However, the shape is not limited to such a shape. The shape of a foundation can be determined to match the shape of a greenhouse erected thereon.

Figure 32B:
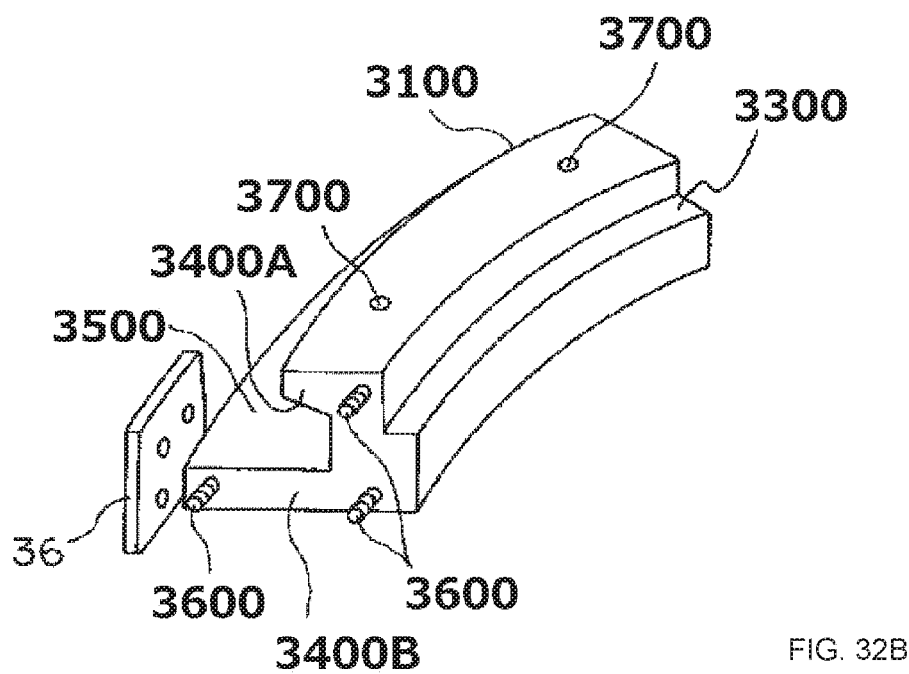
FIG. 32(b) is a diagram showing one embodiment of a divided substrate 3100.

FIG. 32(b) showing one embodiment of a divided substrate 3100. Since a toric foundation was shown in FIG. 32(a), the divided substrate 3100 in FIG. 32(b) also has an arc shape. However, the shape of the divided substrate 3100 can be changed in accordance with the shape of the foundation 3000.

In FIG. 32(b), a step section 3300 for accommodating a floor is formed along the entire circumference on the inner circumferential side of the divided substrate 3100. Top and bottom protrusion sections 3400A and 3400B that protrudes out toward the outer substrate are formed along the entire circumference, and a depression 3500 used as an engaging section between the top and bottom protrusion sections 3400A and 3400B is formed on the outer circumferential side of the divided substrate 3100. Thus, the step section 3300 is formed along the entire circumference on the inner circumferential side of the top section of the foundation 3000, which is constituted by putting together the divided substrates 3100. In addition, the locking concave section 3500 is formed along the entire circumference on the outer circumferential side of the top section. The depression 3500 serves the function of the pressing section DS in FIG. 31.

In the embodiment shown in FIG. 32(b), a couple guide pin 3600 for positioning is embedded into one end surface in the longitudinal direction of each divided substrate 3100, and a couple guide pin hole (not shown) is made on the other end surface. However, such a guide pin configuration may not be employed. Any means that can engage divided substrates 3100 with each other may be used to engage adjacent divided substrates. Adjacent divided substrates are connected to each other by inserting the couple guide pin 3600 into the couple guide pin hole to assemble the foundation 3000.

In a preferred embodiment, outer circumferential surfaces of a connection section of two adjacent divided substrates 3110 are linked via a linking plate 36. The linking pate 36 shown in FIG. 32(b) can be used to link divided substrates with each other as well as to link the divided fragment 1100 of the hydroponic cultivation system accommodating greenhouse 1 to the foundation 3000 by, for example, a bolt.

As shown in FIG. 32(b), an insert 3700 is embedded into the top surface of a divided substrate, which may be used for suspension or construction.

The divided substrates 3100 are fixed to one another on a ground to form the foundation 3000. A floor can be provided on the inside thereof. In a preferred embodiment, crushed stones or the like can be filled to a predetermined depth inside the foundation 3000. Polyethylene or another resin film is laid thereon. Furthermore, concrete is filled to the height of the foundation 3000 thereon. Flat finish is applied to the surface of concrete to form a floor. The mobile assembly foundation 3000 is complete by the above-described steps.

The hydroponic cultivation system accommodating greenhouse 1 is installed on the mobile assembly foundation 3000 constructed in this manner by assembling the divided fragments 1100. That is, the protrusion section DB of the base end section of a divided fragment is fitted into the depression 3500 while connecting the divided fragments 1100 with one another to assemble the greenhouse 1. In a preferred embodiment, the base section of the divided fragment 1100 may be fastened and fixed to the substrate 3100 by the linking plate 36. That is, the divided fragment 1100 is locked to the foundation 3000 by the linking plate 36. The outer circumferential surface of an assembled dome may be covered with concrete mortar, resin or the like for water resistance, fire resistance, weather resistance or the like.

In this embodiment, the divided substrates 3100 are assembled as the foundation 3000 by the linking plate 36 to install a floor on the foundation 3000. Thus, the foundation 3000 can be readily disassembled by relieving the bolting by the linking plate 36. For this reason, the foundation and the greenhouse can be readily moved and installed elsewhere. Further, the foundation of the locking section 3500 for the protrusion section DB of the divided fragment 1100 is integrally formed with the outer circumferential surface of the divided substrate 3100 constituting the foundation. Thus, the structure of the foundation 3000 can be simplified. Furthermore, the base section DB is configured to be fixed to the linking plate 36 for linking the divided substrates 3100. Thus, the configuration of the foundation can be simplified to facilitate construction.

In the above-described embodiment, the floor formed inside the foundation 3000 may be formed by laying a joist such as a steel plate across the step section 3300 on the inner circumferential side of the foundation 3000 to lay floor boards thereon instead of by concreate or crushed stones as described above. It is preferable that each joist of steel plates has a length taking into consideration the transportability thereof and can be bolted and disassembled, while the floor also has a size taking into consideration the transportability thereof and can be bolted to the joist and disassembled. That is, it is preferable that the floor is also dividable and transportable. In doing so, the foundation 3000 can be disassembled by relieving the bolting by the linking plate 36. Thus, the disassembling property of the foundation 3000 is improved such that the foundation can be readily moved and installed.

(Reinforcement of Hydroponic Cultivation System Accommodating Greenhouse)

The hydroponic cultivation system accommodating greenhouse of the present invention is preferably reinforced by various methods.

Figure 33:
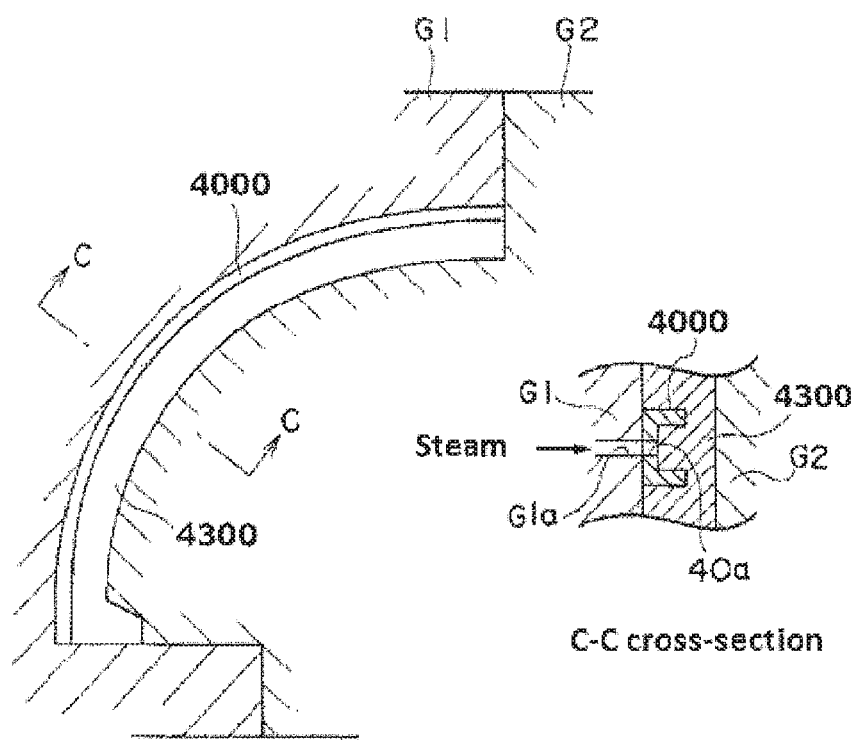
FIG. 33 is a diagram showing how a reinforcing member is incorporated into a divided fragment.

For instance, a reinforcing member may be integrated into a divided fragment. The material and shape of a reinforcing member can be appropriately determined by those skilled in the art depending on the shape and application of the greenhouse. FIG. 33 shows a preferred embodiment of incorporating a reinforcing member into a divided fragment.

As shown in FIG. 33, a reinforcing member 4000 (e.g., steel frame) is set into metal molds G1 and G2 for foam molding of a divided fragment. At this time, it is preferable to set the male G2 after setting the reinforcing member 4000 to the female G1. In the embodiment of FIG. 33, the female G1 has approximately the same shape as the outer circumferential surface of the reinforcing member 4000, which is set while abutting the female G1. A gap is created between the reinforcing member 4000 and the metal mold G2.

The raw material beads (pre-foamed) are then enclosed between the female G1 and the male G2. High pressure steam is blown in through a heating hole G1a (see the c-c cross-sectional view) provided on the female G1 to heat the beads. The high pressure steam inside the molds G1 and G2 leaves outside through a small hole (not shown) provided on the male G2. The beads rupture thereby inside the molds G1 and G2 such that expanded polystyrene foam is made by foam molding along the surface shape of the molds G1 and G2. At this time, expanded polystyrene foam 4300 goes around to the back side of the reinforcing member 4000 to cover the surrounding of the reinforcing member 4000, as shown in the c-c cross-sectional view of FIG. 33. Thus, the expanded polystyrene foam 4300 closely adheres to and is entwined with the reinforcing member 4000 to have strong adhesion. At this time, a heating hole 40a penetrating though the reinforcing member 4000 is provided to directly blow in steam to the back side of the reinforcing member 4000, i.e., to the male G2 side, such that foam is produced on the back side of the reinforcing member 4000 at the initial stage to further enhance tight adhesion between expanded polystyrene foam and the reinforcing member 4000. Thus, in a preferred embodiment of the present invention, a reinforcing member comprises a through hole for passing steam inside.

Subsequently, steam is stopped for sufficient cooling. The molds G1 and G2 are then detached to take out the molded product, a divided fragment. In a divided fragment formed in this manner, the reinforcing member 4000 is positioned on the outside of the divided fragment. The outer circumferential surface of the reinforcing member 4000 and the outer circumferential surface of the expanded polystyrene foam 4300 are formed without a difference in height. That is, one surface of the reinforcing member 4000 is exposed along the dome meridian. Paint may be blown onto the outer surface of the molded divided fragment for blocking ultraviolet rays and water resistance.

In a preferred embodiment, the reinforcing member 4000 has a fastening member for fastening a divided fragment with another divided fragment. Such a configuration readily accomplishes strong fastening of a divided fragment with another divided fragment. For instance, after molding of a divided fragment as described above, a fastening member (e.g., screw and screw hole) may be fabricated on a part of the reinforcing member 4000 from the outside of the divided fragment.

The above steps are performed in a factory. After manufacturing a plurality of divided fragments, the fragments are transported to a construction site to assemble the hydroponic cultivation system accommodating greenhouse 1.

(Reinforcement by Sheet and Application Layer)

FIG. 34 shows a specific embodiment of reinforcement with a sheet and a base material. In this embodiment of reinforcement with a sheet and a base material, sheets MS, MSa, and MSb are applied to cover a portion connecting adjacent divided fragments 1100, a portion rising out from the foundation 3000 of the divided fragments, and a corresponding portion of a foundation and an application layer (e.g., base material) is applied to a portion including the sheet in assembly, such that two divided fragments and the divided fragment and the foundation can be strongly fixed.

A sheet used in this embodiment may be any sheet that can stabilize the fixation of a foundation with a divided fragment by being applied as described above. The sheet is preferably a mesh sheet and more preferably a mesh sheet formed with inorganic fiber. Inorganic fiber refers to carbon fiber, glass fiber, metal fiber and the like. The sheet may be a sheet consisting of resin-based fiber with tensile strength. A sheet is preferably in a form woven into a mesh-like state. For example, use of carbon fiber with a thickness of 0.3-1 mm and 6 meshes (6 mesh holes per inch) can achieve an effect. A mesh sheet exceeding 12 meshes is too fine such that it is more difficult to operate, while the mesh is too coarse with 6 meshes or less. Strength or toughness of a sheet (e.g., mesh sheet), in addition to connection by an adhesive or the like, thereby act on the portion of connection of the divided fragment 1100 in the greenhouse 1 such that the divided fragments can be connected strongly with one another.

Figure 34A:
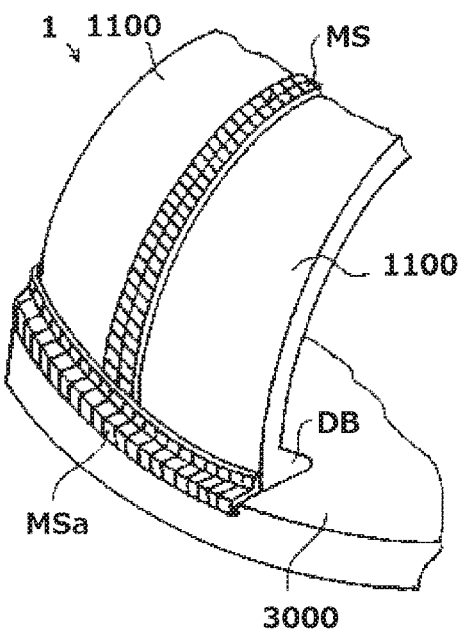
FIG. 34(a) shows that the mesh sheet MSa may be applied to a portion of connection between the outer surface of the divided fragment 1100 and the foundation 3000.
Figure 34B:
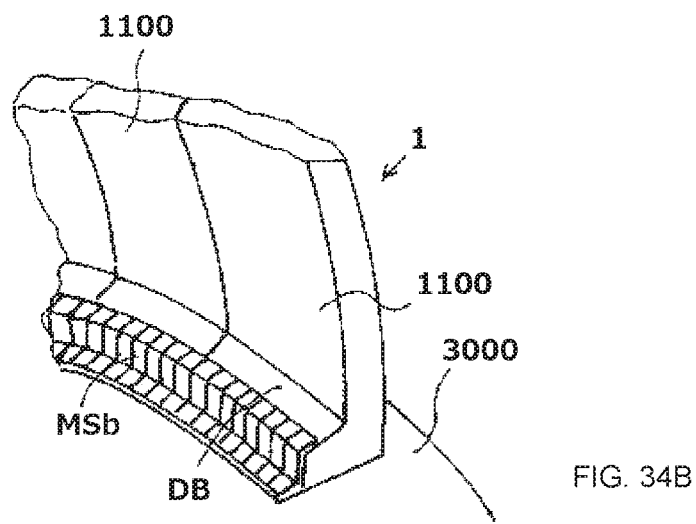
FIG. 34(b) shows that the mesh sheet MSb may be applied to a portion of connection between the inner surface of the divided fragment 1100 and the foundation 3000.

In one embodiment, a mesh sheet MS is applied to a portion of connection of adjacent divided fragments 1100. In addition, as shown in FIG. 34(a), the mesh sheet MSa may be applied to a portion of connection between the outer surface of the divided fragment 1100 and the foundation 3000. Furthermore, as shown in FIG. 34(b), the mesh sheet MSb may be applied to a portion of connection between the inner surface of the divided fragment 1100 and the foundation 3000. That is, the mesh sheets MSa and MSb may be applied to the outer circumferential side and the inner circumferential side of the hydroponic cultivation system accommodating greenhouse 1 of the present invention.

At the bottom end section of the greenhouse 1 on the exterior surface side, the mesh sheet MSa is applied to the corresponding portion of the foundation 3000 as shown in FIG. 34(a). The mesh sheet MSa successively covers the bottom end outer circumferential side of the greenhouse 1 and is successively applied over the foundation 3000 and adjacent divided fragments 1100 aligned side by side. The same applies to the interior surface side of the greenhouse 1. As shown in FIG. 34(b), the mesh sheet MSb is successively applied over the bottom end section of the inner surface of the divided fragment 1100 and the corresponding position of the foundation 3000 corresponding thereto. A leg section DS extending to the interior side is integrally formed at the bottom end section of the inner surface of the divided fragment 1100. The mesh sheet MSb is applied from the leg section DS to the corresponding portion of the foundation 3000. In a preferred embodiment, a base material is further applied to the interior surface and the exterior surface of the greenhouse 1. Since application thereof hides the mesh sheets MS, MSa, and MSb, this prevents deterioration of the exterior appearance.

The binding strength between the greenhouse 1 and the foundation 3000 is enhanced by covering the portion connecting the divided fragments 1100, the portion rising out from the foundation 3000 of the divided fragments 1100, and the corresponding portion of the foundation 3000 corresponding thereto with the mesh sheets MS, MSa and MSb in this manner. Thus, the greenhouse 1 can be stably erected on the foundation 3000.

An acrylic resin such as polyacrylic acid ester or polymethacrylic acid ester is used as an adhesive used for the adhesion between divided fragments. Preferably, mortar powder may be mixed into and dispersed in such an acrylic resin. Acrylic resins have strong adhesive force against expanded polystyrene foam. Thus, an acrylic resin can strongly connect divided fragments made of expanded polystyrene foam with each other.

Since an adhesive would have toughness with elasticity by using an acrylic resin mixed with mortar powder as an adhesive for divided fragments, it would be possible to obtain a greenhouse with excellent earthquake resistance or impact resistance. For this reason, earthquake, shaking, or impact would not cause a connection portion of the greenhouse 1 to crack. Further, since such an adhesive is water resistant, infiltration of rain from the connecting portion can be prevented for an extended period.

A base material is commonly applied to the entire interior surface and exterior surface of the greenhouse 1 to a predetermined thickness after application of a sheet. As a base material, resin paint with fiber such as glass fiber or carbon fiber and mortar powder dispersed therein can be used. As the resin paint, an acrylic resin such as polymethacrylic acid ester or polyacrylic acid ester or other resins can be used. The ingredients and thickness of a base material can be appropriately determined by those skilled in the art. As an example, the thickness of a base material can be a predetermined thickness in the range of 1-3 cm.

After application of a base material, it is common to apply paint for exterior finish to the surface of the base material on the exterior surface of the greenhouse 1 and to apply paint for interior finish to the base material surface on the interior surface. Any paint known in the art can be used as paint for exterior finish. However, water repellant and UV blocking paint is preferred. Modified silicone resin paint or other resin paint can be selected as paint having such properties. Any paint that can form an interior space for hydroponic cultivation can be used as paint for interior finish, but for example naturally-derived clay-like paint is preferred. Diatomaceous earth or plaster can be selected as a naturally-derived clay-like paint. Diatomaceous earth is heat resistant and safe, as it would not burn even when contacted with a moderate level of fire of a cigarette or the like. Diatomaceous earth 18 has action to adsorb to and remove formaldehyde. Thus, formaldehyde generated by a certain action from modified silicone resin paint 17, which is paint for exterior finish, or the base material 13 can be prevented from remaining in the room. Furthermore, since diatomaceous earth adsorbs to and removes harmful substances, diatomaceous earth is safe, and has deodorizing action and action of preventing tick and mold outbreak.

(Improvement in Adhesion Between Foamed Resin and Reinforcing Member)

Figure 35A:
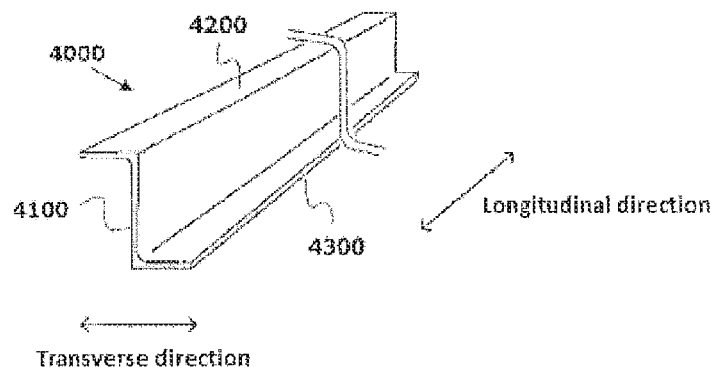
FIG. 35(a) shows a specific configuration that can improve adhesion between foamed resin and a reinforcing member in a divided fragment.
Figure 35B:
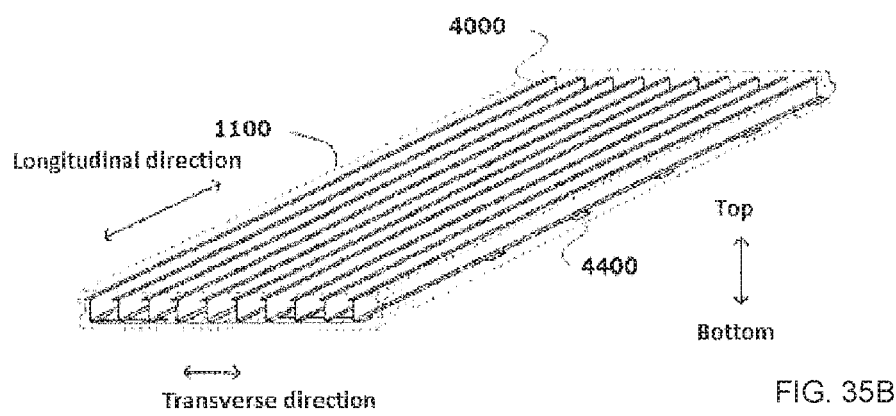
FIG. 35(b) shows an embodiment of a reinforcing member comprising a crossing member installed to intersect therewith.
Figure 35C:
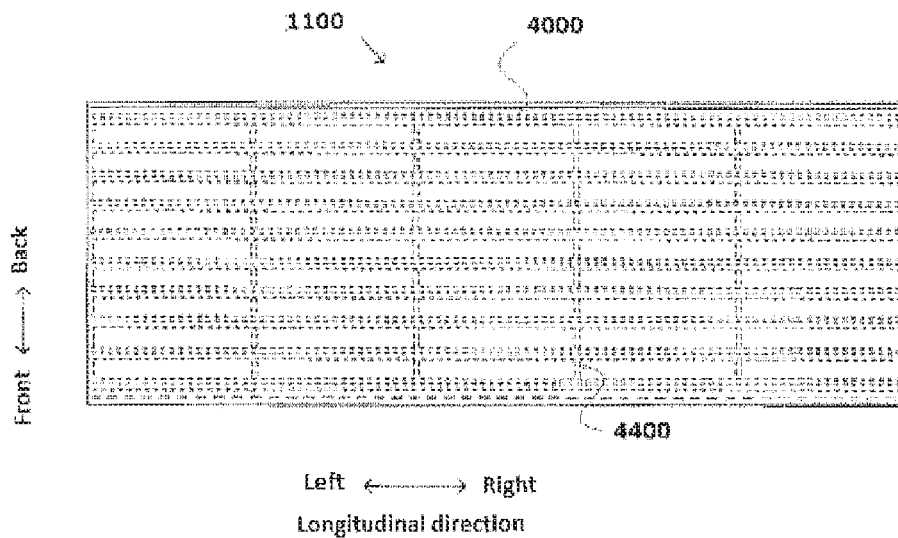
FIG. 35(c) is a plan view of a divided fragment comprising a reinforcing member and a crossing member.

FIG. 35(*a*) shows a specific configuration that can improve adhesion between foamed resin and a reinforcing member in a divided fragment. In this embodiment, the reinforcing member of the divided fragment comprises a web extending in a longitudinal direction, a first flange projecting out from the web toward one of the transverse directions, and a second flange projecting out from the web toward the opposite direction from the first flange. Use of such a reinforcing material enables uniform foaming of resin and more stable molding of a divided fragment compared to using a reinforcing member with a U-shaped cross-section. For a reinforcing member with a U-shaped cross-section, a space remains at a portion around the inside of the U-shape when a foamed resin raw material is foamed and expanded by steam, such that the resin tends to foam non-uniformly. As a reinforcing member in this embodiment, plus (+) shaped or Z-shaped steel or the like can be used. FIG. 35 shows a specific embodiment of a divided fragment using a Z-shaped steel as an example. As shown in FIG. 35(*a*), the reinforcing member 4000 comprises a web 4100 extending in the longitudinal direction, a first flange 4200 projecting out from the web 4100 toward one of the transverse directions, and a second flange 4300 projecting out toward the opposite direction from the first flange 4200. FIG. 35(*a*) illustrates a Z-shaped reinforcing member. However, a flange does not necessarily need to protrude out from the top end or the bottom end of a web. The flanges may project out in opposite directions from any place on the web. The reinforcing members 4000 are typically arranged while being spaced in the transverse direction such that the web 4100 is perpendicular. The reinforcing member 4000 may be configured to be light by providing a plurality of holes on the web 4100 or by using a light material such as aluminum.

FIG. 35(*b*) shows an embodiment of a reinforcing member comprising a crossing member installed to intersect therewith. The crossing member 4400 is installed to intersect with the reinforcing member 4000. A crossing member and a reinforcing member can be installed by a technique well known in the art, such as welding or screws. The specific angle is not limited as long as a reinforcing member and a crossing member support and reinforce each other, but preferably the crossing member and the reinforcing member are orthogonal. A framework composed of the reinforcing member 4000 and the crossing member 4400 is put into a mold, and the framework is installed to float from the bottom of the mold. Beads, the raw material of the divided fragment 1100, are placed in the mold and are foamed and expanded with a high temperature steam. The foamed resin divided fragment 1100 is formed by such integral molding. The divided fragments 1100 are shown with dotted lines in FIG. 35(*b*). The divided fragment 1100 can be produced to have, for example, 14-30 kg of weight per cubic meter by adjusting the expansion ratio. The compressive strength is 40 kN/m$^2$-120 kN/m$^2$. Thus, the divided fragment 1100 can withstand a large load. The flexural strength is 40 kN/m$^2$-120 kN/m$^2$. Thus, the divided fragment 1100 can withstand bending. The divided fragment 1100 molded in this manner is light weight, heat resistant, and readily processed.

FIG. 35(*c*) is a plan view of a divided fragment comprising a reinforcing member and a crossing member. The divided fragment 1100 has a rectangular board shape with the reinforcing member 4000 and the crossing member 4400 incorporated internally. The reinforcing member 4000 and the crossing member 4400 are inside the foamed resin, and therefore are represented by dotted lines. The dimension of the divided fragment 1100 can be appropriately determined by those skilled in the art while considering the size, transportability or constructability of the final hydroponic cultivation system accommodating greenhouse. However, the dimension is about 5 m in the longitudinal direction and about 2 m in the transverse direction. Both the front and back end surfaces in the transverse direction may be provided with a concave section and a convex section, respectively. The concave section and the convex section are provided to extend in the longitudinal direction and are shaped to engage each other. For example, a concave section of the divided fragment 1100 can be engaged with a convex section of another divided fragment to extend the divided fragment in the transverse direction. That is, the concave section and the convex section function as a connection section for extending the divided fragment 1100 in the transverse direction. The crossing member 4400 may be of any material with any shape that can intersect with a reinforcing member for the reinforcement thereof. However, the crossing member 4400 is typically a band-shaped flat board material. FIG. 35(*c*) shows a state where the crossing members 4400 are installed in 1 m intervals in the longitudinal direction of the divided fragment 1100 which is about 5 m in the longitudinal direction and about 2 m in the transverse direction.

(Two-Story Hydroponic Cultivation System Accommodating Greenhouse)

Figure 36:
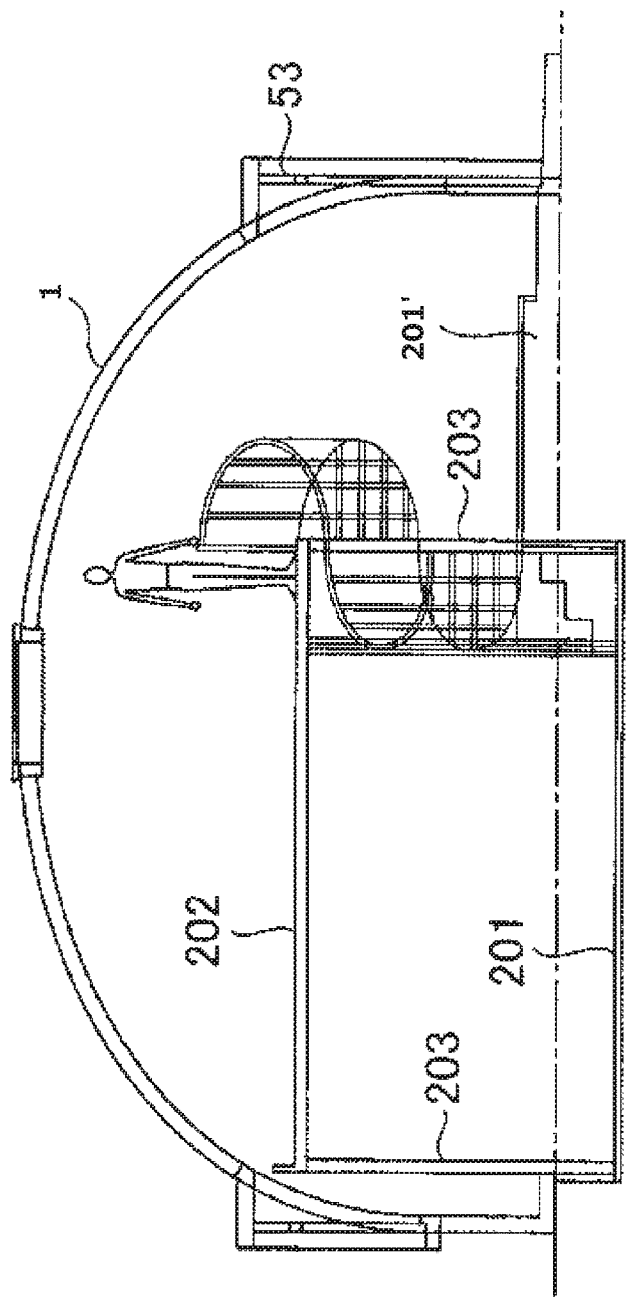
FIG. 36 shows a two-story hydroponic cultivation system accommodating greenhouse.

The hydroponic cultivation system accommodating greenhouse 1 may comprise a plurality of support columns erected in at least a portion of a region of the floor surface in the greenhouse 1 and a top floor surface supported by the support columns. That is, the greenhouse may be two stories. FIG. 36 shows a two-story hydroponic cultivation system accommodating greenhouse. In the embodiment of FIG. 36, a floor surface 201 of the first floor portion is formed to be lower than a floor surface 201' near an entrance 53. A plurality of columns 203 are erected on the floor surface 201 and a second floor top floor surface 202 is formed above the columns. As illustrated, a spiral staircase or the like may be provided from the floor surface 201' to the floor surface 202. In addition, stairs may be provided from the floor surface 201' to the floor surface 201. The floor surface 201 is formed to be lower than the floor surface 201' in FIG. 36. However, the floor surface 201 and the floor surface 201' may be on the same plane. In addition, the floor surface 201 may be formed to be higher than the floor surface 201'. However, it is preferable that the floor surface 201 is formed to be lower than the floor surface 201' because a wide space on the top floor surface 202 can be secured thereby.

In a preferred embodiment, the internal structure composed of the top floor surface 202 and the columns 203 supporting the same is in a separated state from the external structure of the greenhouse 1 constructed by assembling divided fragments. The internal structure and the external structure are not structures in which one of the structures is supported by the other structure or the structures are linked. Simplification of the structure of the greenhouse in this manner facilitates assembly, thus enabling assembly in a short period of time.

(Processed Plate on Greenhouse Surface)

In another embodiment, the hydroponic cultivation system accommodating greenhouse 1 may comprise a processed product for reinforcement and design. The processed product may be anything as long as it is made of foamed resin. However, the processed product is preferably formed with the same foamed resin as the foamed resin constituting the greenhouse 1. This is because when the materials of the greenhouse and the processed plate are the same foamed resin, it is possible to prevent the processed plate from peeling from the greenhouse due to thermal contraction. Further, a processed plate made of foamed resin is lighter compared to conventional imitation stone plates or the like. Thus, a processed plate made of foamed resin facilitates construction and is also preferable in terms of the overall strength of the greenhouse. In a preferred embodiment, a processed plate has a convex section on a surface in contact with the greenhouse upon adhesion. Peeling is prevented by such a convex section. The processed plate in this embodiment may have a thin connection section on at least a portion of an outer circumference. Such a processed plate may be manufactured by molding while a plurality of processed plates are linked via thin connection sections and then cutting at the thin connection sections. Thus, a thin connection section is formed to be thin for cutting. Since a thin connection section tends to be hard in foam molding with foamed resin, foamed resin at the thin connection section can be made to not be hard by two stage foaming consisting of pre-foaming and foam molding.

(Seismic Base Isolation Structure)

Figure 37:
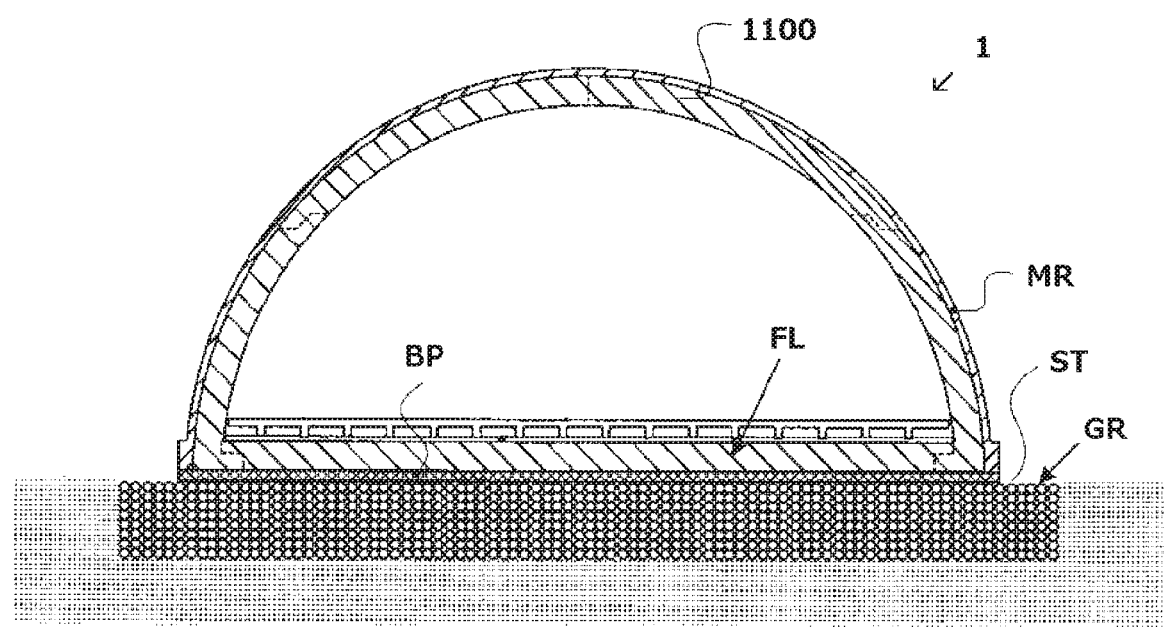
FIG. 37 shows a seismic base isolation structure of the hydroponic cultivation system accommodating greenhouse of the present invention.

In another embodiment, the hydroponic cultivation system accommodating greenhouse 1 of the present invention may comprise a seismic base isolation structure. FIG. 37 shows a seismic base isolation structure of the hydroponic cultivation system accommodating greenhouse of the present invention. According to the seismic base isolation structure shown in FIG. 37, a sphere can absorb lateral vibration from an earthquake to dampen the shaking of the greenhouse by an improved ground foundation covered with uniform spheres. Further, even if the improved ground foundation moves to the left or right, the greenhouse hardly moves because the greenhouse slides between its floor plate and the improved ground foundation. Furthermore, the underfloor, side wall, and ceiling can all be formed with foamed resin to form a closed structure like a shell, such that an impact from an earthquake is dissipated over the entire greenhouse with suitable cushioning and strength to minimize the impact on people or stored objects in the greenhouse.

FIG. 37 is a cross-sectional view of the hydroponic cultivation system 1 of the present invention. The greenhouse 1 composed of foamed resin (e.g., expanded polystyrene foam) divided fragments is placed on the improved ground foundation GR composed of spheres ST. In this embodiment, the greenhouse 1 is a closed structure in which the underfloor, side wall, and ceiling surround the room. A floor plate BP is provided at the bottom section in contact with the improved ground foundation GR. The external sections of the divided fragment 1100 constituting the greenhouse 1 may be covered with toughened mortar layer MR with a thickness of about 2 cm. The toughened mortar layer MR can be mixed with an adhesive based on an acrylic resin such as polyacrylic acid ester or polymethacrylic acid ester in order to improve adhesion with foamed resin (e.g., expanded polystyrene foam) and to prevent cracking from impact or vulnerability to impact by mixing carbon fiber with mortar.

The floor plate BP can be configured such that the improved ground foundation GR and the greenhouse 1 are slidable. For example, plywood for a concrete mold can be used. Plywood for a concrete mold is used as a mold for concreate and has a thickness of about 6-9 mm. The material of the floor plate BP is not limited thereto. The floor plate BP may be made of resin. In general, a concrete layer is provided above the underfloor FL, and a floor is provided thereon. The bottom side of the floor can also be a space for wiring or piping.

A hole with a depth of about 50 cm is made on the ground of the area covering the outer circumference of the greenhouse 1, wherein the spheres ST are disposed to form the improved ground foundation. The spheres ST are typically laid in this hole to form the improved ground foundation GR. The spheres ST can be any of material with any shape that can effectively absorb vibration from an earthquake. The spheres ST are disposed such that a greenhouse can be slidably placed thereon. The spheres ST are preferably cobblestones with a diameter of about 15-30 cm and more preferably uniform cobblestones. Hard rubber spheres with a suitable hardness and elasticity can also be used as the spheres ST constituting the improved ground foundation GR. The diameter thereof is preferably about 10-30 cm.

Other Embodiments

As described above, the present invention has been illustrated by showing preferred embodiments to facilitate understanding. The present invention is explained below based on Examples. The aforementioned explanation and the following Examples are not provided for the purpose of limiting the present invention, but for the sole purpose of exemplification. Thus, the scope of the present invention is not limited to embodiments and Examples specifically described herein and is limited only by the scope of claims.

INDUSTRIAL APPLICABILITY

The present invention can be utilized in plant production because the present invention provides a system capable of efficient hydroponic cultivation in small space. The hydroponic cultivation system of the present invention is characterized by the small amount of culture solution. Thus, the system is useful for plant production in desert regions where water is especially scarce. Furthermore, a large amount of plants can be produced even in environments that are not suitable for plant cultivation by combining such a hydroponic cultivation system with an expanded polystyrene foam greenhouse that has a high level of thermal insulation effect.

What is claimed is:

1. A hydroponic cultivation system comprising:
a plurality of vessels extending in a longitudinal direction;
a plant holding plate that holds a plurality of plants and is disposed above the plurality of vessels;
the plant holding plate extends across the plurality of vessels; and
at least one support that extends longitudinally between vessels that are adjacent to each other,
wherein the at least one support comprises rollers among the plurality of vessels, and a conveyor comprising a plurality of drivers for conveying the plant holding plate along the longitudinal direction,
wherein the conveyor comprises a support belt bridging between the pulleys on both sides,
wherein the plant holding plate extends continuously from one driver, across the plurality of vessels, across the at least one support, to the other driver, and
wherein each of the plurality of vessels is configured to contain a culture solution required for a growth of the plurality of plants.

2. The hydroponic cultivation system of claim 1 further comprising the culture solution, wherein there is a space between the plant holding plate and the culture solution.

3. The hydroponic cultivation system of claim 1, wherein the system is configured such that the culture solution flows inside each of the plurality of vessels.

4. The hydroponic cultivation system of claim 3, wherein each of the plurality of vessels further has a turbulence generating section configured to generate turbulence in a flow of the culture solution.

5. The hydroponic cultivation system of claim 1, further comprising a discharge section for discharging the culture solution from each of the plurality of vessels.

6. The hydroponic cultivation system of claim 1, further comprising a supply tube configured to supply the culture solution to each of the plurality of vessels.

7. The hydroponic cultivation system of claim 1, wherein the plant holding plate holds a plurality of rows of plants, wherein a first row of plants of the plurality of rows of plants is at least partially submerged in a first vessel of the plurality of vessels.

8. The hydroponic cultivation system of claim 7, wherein the culture solution is divided between the first vessel and a second vessel of the plurality of vessels.

9. A plant factory comprising the hydroponic cultivation system of claim 1 and a foamed resin greenhouse for accommodating the hydroponic cultivation system.

10. The plant factory of claim 9, wherein a plurality of the hydroponic cultivation systems are disposed in a vertical direction.

11. The hydroponic cultivation system of claim 1, further comprising a cutter configured to cut a root of the plurality of plants.

* * * * *